United States Patent [19]
Boutaud et al.

[11] Patent Number: 5,734,927
[45] Date of Patent: Mar. 31, 1998

[54] SYSTEM HAVING REGISTERS FOR RECEIVING DATA, REGISTERS FOR TRANSMITTING DATA, BOTH AT A DIFFERENT CLOCK RATE, AND CONTROL CIRCUITRY FOR SHIFTING THE DIFFERENT CLOCK RATES

[75] Inventors: Frederic Boutaud, Roquefort Les Pins; Marc Couvrat, St. Laurent du Var; Yves Masse, Biot, all of France; Mansoor A. Chishtie, Houston, Tex.; Alain Vallauri, Colomars, France; Ajay Padgaonkar, Sugarland; Jason Jones, Houston, both of Tex.

[73] Assignee: Texas Instruments Incorporated, Dallas, Tex.

[21] Appl. No.: 489,463

[22] Filed: Jun. 8, 1995

[51] Int. Cl.⁶ .................................................. G06F 13/00
[52] U.S. Cl. .................. 395/880; 395/800; 395/821; 395/825; 395/855; 365/189.01; 365/189.05; 365/221; 365/233
[58] Field of Search ............................ 365/189.05, 189.01, 365/221, 233; 371/22.3; 395/309, 405, 421.03, 800, 825, 556, 821, 855, 880

[56] References Cited

U.S. PATENT DOCUMENTS

| | | | |
|---|---|---|---|
| 4,231,084 | 10/1980 | Yoshizaki et al. | 395/825 |
| 4,628,478 | 12/1986 | Henderson, Jr. | 395/309 |
| 5,051,890 | 9/1991 | Nagasaki et al. | 395/421.03 |
| 5,134,703 | 7/1992 | Bumbarger | 395/556 |
| 5,179,734 | 1/1993 | Candy et al. | 395/800 |
| 5,206,942 | 4/1993 | Ibi | 395/405 |
| 5,210,759 | 5/1993 | DeWitt et al. | 371/22.3 |
| 5,422,849 | 6/1995 | Chung | 365/189.05 |
| 5,564,042 | 10/1996 | Ventrone et al. | 395/556 |
| 5,584,032 | 12/1996 | Hyatt | 395/800 |

OTHER PUBLICATIONS

*TMS320C56/C57 Electrical Specifications*, Preliminary Data, SPRS029, Texas Instruments, Jul. 14, 1994, pp. 1–13.

*Primary Examiner*—Thomas C. Lee
*Assistant Examiner*—Po C. Huang
*Attorney, Agent, or Firm*—C. Alan McClure; James C. Kesterson; Richard L. Donaldson

[57] ABSTRACT

An electronic device for transferring data between a serial port and a memory of a CPU is provided having a plurality of data registers for transferring data between said serial port and said memory in response to a first set of control signals, a data bus connected to said registers and said memory for passing data to and from said memory in response to a portion of said first set of control signals, first control circuitry for generating said first set of control signals and for generating at least one interrupt to said CPU, at least one control register connected to said first control circuitry for providing mode control information to said first control circuitry, a plurality of address registers for storing data address, at least one address generator connected to said address registers for automatically generating addresses in response to a second set of control signals, an address bus connected to said address registers, and second control circuitry connected to said address generator, a portion of said control register and said first control circuitry for generating said second set of control signals.

8 Claims, 35 Drawing Sheets

| 7 | 6 | 5 | 4 | 3 | 2 | 1 | 0 |
|---|---|---|---|---|---|---|---|
| RRST | XRST | TXM | MCM | FSM | FO | DLB | RES |
| R/W | R/W | R/W | R/W | R/W | R/W | R/W | R |

| 15 | 14 | 13 | 12 | 11 | 10 | 9 | 8 |
|---|---|---|---|---|---|---|---|
| FREE | SOFT | RSRFULL | XSREMPTY_ | XRDY | RRDY | IN1 | IN0 |
| R/W | R/W | R | R | R | R | R | R |

| 9 | 8 | 7 | 6 | 5 | 0-4 |
|---|---|---|---|---|---|
| PCM | FIG | FE | CLKP | FSP | CLKDV |
| R/W | R/W | R/W | R/W | R/W | R/W |

| 15 | 14 | 13 | 12 | 11 | 10 |
|---|---|---|---|---|---|
| HALTR | RH | BRE | HALTX | XH | BXE |
| R/W | R | R/W | R/W | R | R/W |

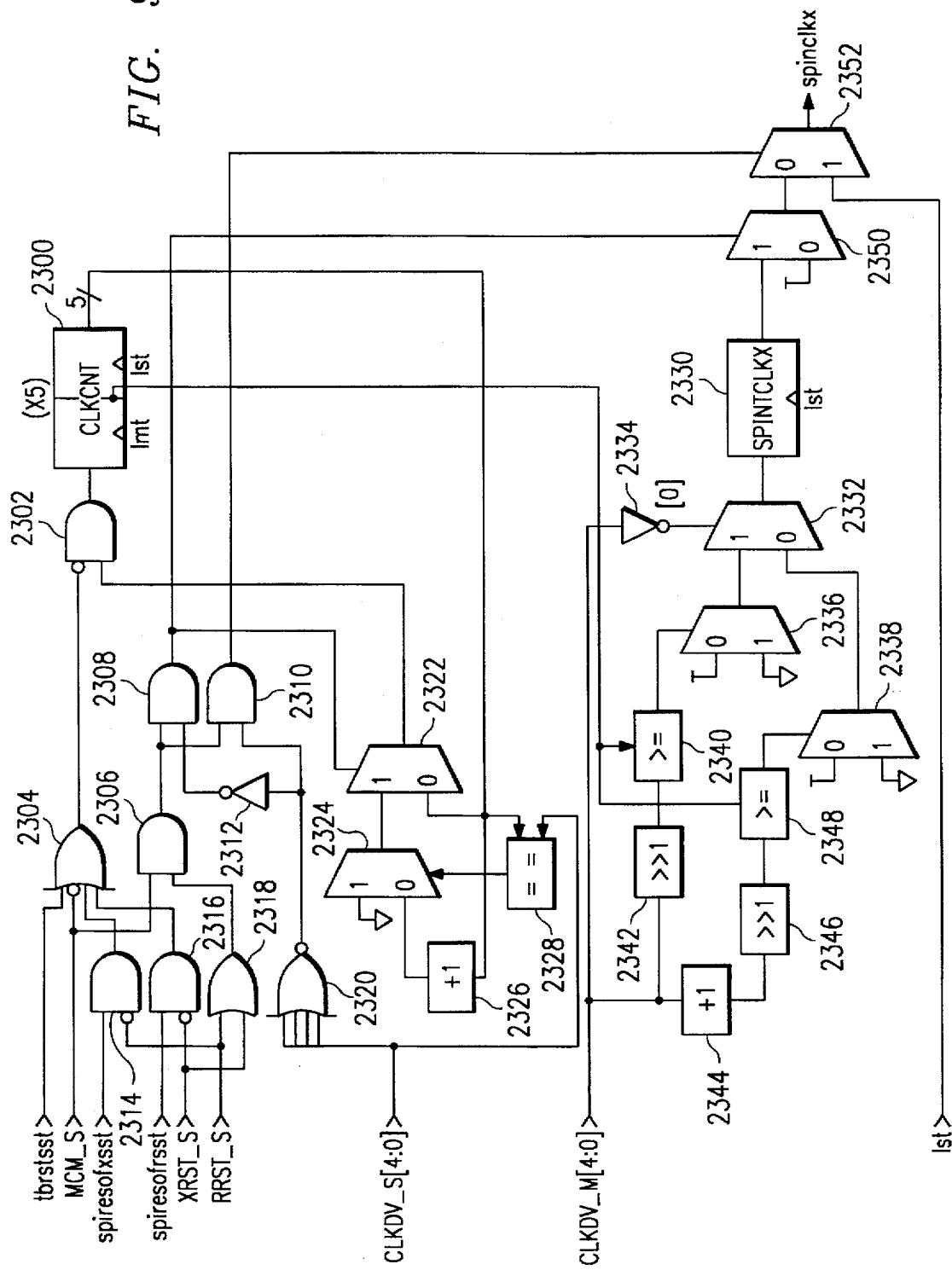

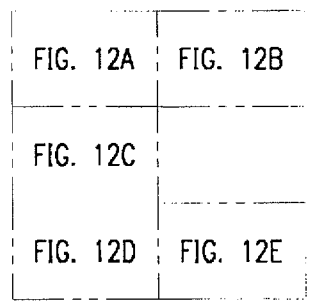
FIG. 11
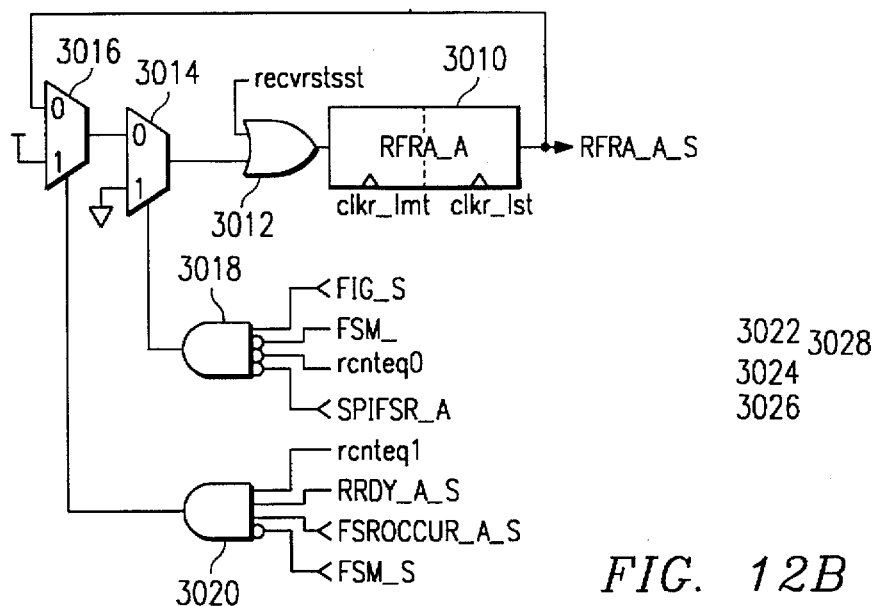
FIG. 12B
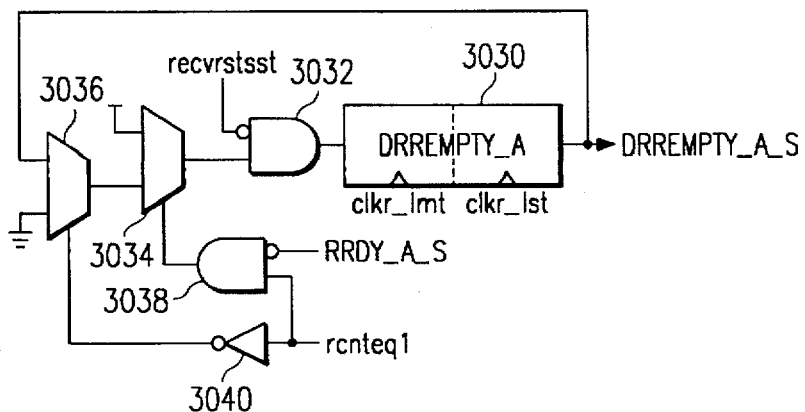

SYSTEM HAVING REGISTERS FOR RECEIVING DATA, REGISTERS FOR TRANSMITTING DATA, BOTH AT A DIFFERENT CLOCK RATE, AND CONTROL CIRCUITRY FOR SHIFTING THE DIFFERENT CLOCK RATES

TECHNICAL FIELD OF THE INVENTION

The present invention relates to the field of electronic circuitry, and more particularly, to electronic circuitry for automatically buffering data for a serial port of a processor.

BACKGROUND OF THE INVENTION

Typical processors are required to execute programs for specific applications while at the same time providing control and direction for the transfer of data to and from external or peripheral devices. This is typically accomplished by interrupting the processor's processing of the application program with an interrupt line or signal. After it saves sufficient information for it to resume the processing once it has taken care of the interrupt, the processor then stops the application program. After the application program has been exited, the processor services the interrupt. An interrupt may be as simple as a buffer for receiving data being full; for this example, the processor must move the data from the buffer to an appropriate memory location. This involves determining the address for the data in the memory associated with the processor. After the data has been moved to the memory and the buffer reset or cleared, the processor may resume executing the application program.

An example of such an application is the decompression of a compressed data stream or the decryption of an encrypted data stream that is being input to the processor at a high rate of speed. Typically, the processor is required to be very fast in order to perform the application program, receive the dam, and output "restored" data, after it has been manipulated or transformed by the application program. To help support the processor in these types of activities various types of special off-chip circuits have been devised and used with the processor.

However, there are still unmet needs for circuitry capable of automatically buffering data for a serial port of a processor, especially circuitry that may be placed on-chip with a processor.

SUMMARY OF THE INVENTION

According to one aspect of the present invention, an on-chip automatic buffered serial port for a processor is provided. In a presently preferred embodiment, the present invention provides an electronic device for transferring data between a serial port and a memory of a processor having a plurality of data registers for transferring data between said serial port and said memory in response to a first set of control signals, a data bus connected to said registers and said memory for passing data to and from said memory in response to a portion of said first set of control signals, first control circuitry for generating said first set of control signals and for generating at least one interrupt to said processor, at least one control register connected to said first control circuitry for providing mode control information to said first control circuitry, a plurality of address registers for storing data address, at least one address generator connected to said address registers for automatically generating addresses in response to a second set of control signals, an address bus connected to said address registers, and second control circuitry connected to said address generator, a portion of said control register and said first control circuitry for generating said second set of control signals.

In a presently preferred embodiment, the present invention provides a serial port circuit for a processor, comprising, a memory associated with said processor that is selectively accessible by said processor and by said serial port circuit, a plurality of storage devices selectively interconnectable with serial port input signals and with serial port output signals, and a logic circuit interconnected with said storage devices and processor for generating control signals for transferring data between said storage devices, said input signals, said output signals and said memory.

In a presently preferred embodiment, the present invention provides an integrated circuit, comprising, a microprocessor, a memory associated with said processor that is selectively accessible by said microprocessor, a plurality of storage devices selectively interconnectable with said memory and external signals, and a logic circuit interconnected with said storage devices and interconnectable with said processor for interconnecting at least a portion of said storage devices to said memory in response to signals from said processor or said logic circuit.

The present invention provides circuitry for automatically buffering data for a serial port of a processor independently of the processor clocks.

The present invention also provides a system for automatically buffering data for a serial port of a processor.

BRIEF DESCRIPTION OF THE DRAWINGS

For a more complete understanding of the present invention, and the advantages thereof, reference is now made to the following description taken in conjunction with the accompanying drawings, in which:

FIGS. 8A–8E depict the detailed circuitry for the asynchronous transmit portion of the serial port interface portion of the present invention.

FIGS. 9A–9B depict the detailed circuitry for the synchronous transmit portion of the serial port interface portion of the present invention.

FIG. 11 depicts a block diagram illustrating how FIGS. 12A–12E are generally arranged to provide the detailed circuitry for the asynchronous receive portion of the serial port interface portion of the present invention.

FIGS. 12A–12E depict the detailed circuitry for the asynchronous receive portion of the serial port interface portion of the present invention.

FIGS. 17A–17E are generally arranged to provide the detailed circuitry for the automatic buffering unit portion of the present invention.

FIGS. 17A–17E depict the detailed circuitry for the automatic buffering unit portion of the present invention.

DETAILED DESCRIPTION OF THE INVENTION

The present invention provides circuitry capable of automatically buffering data for a serial port of a processor.

Figure 1:
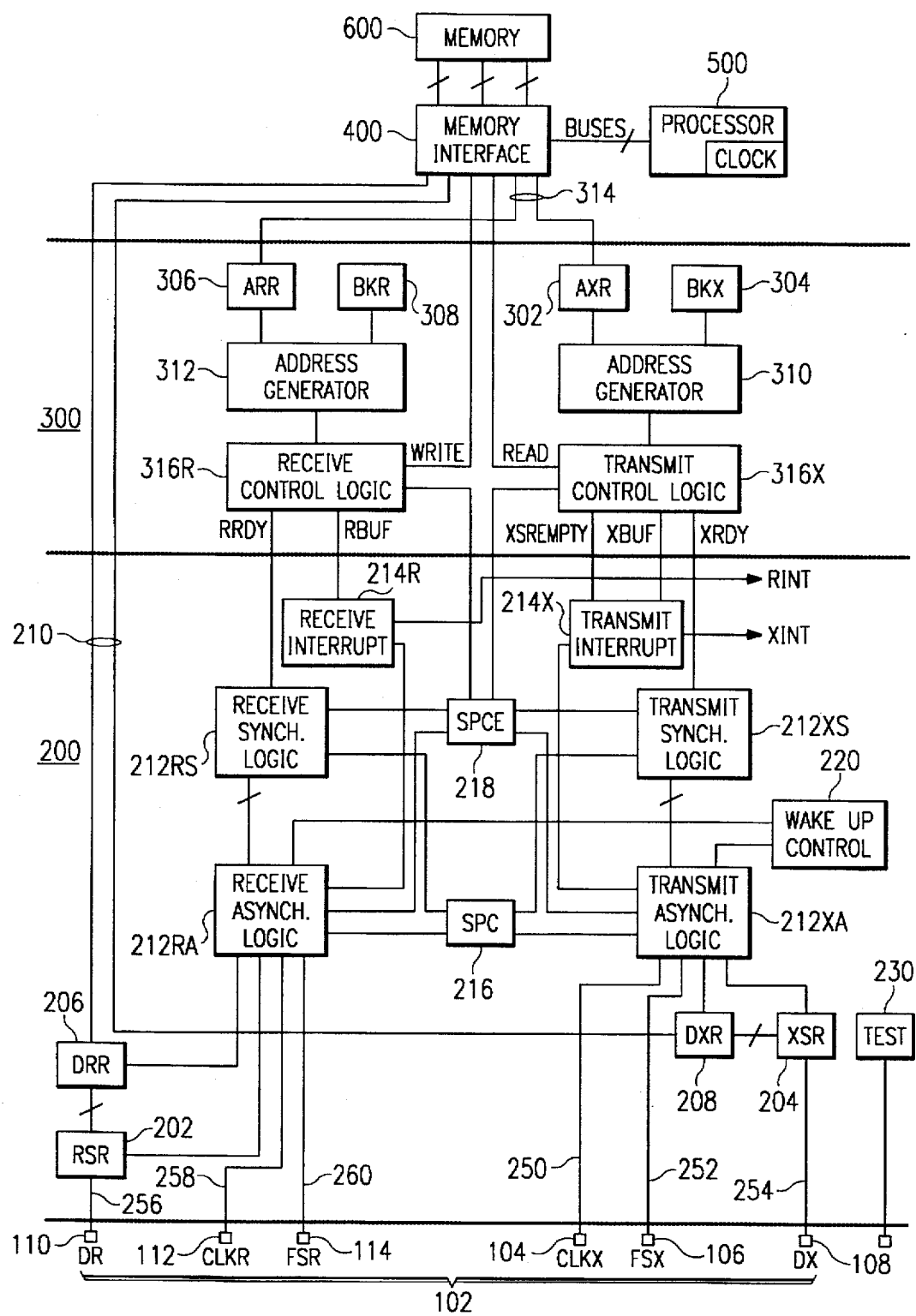
FIG. 1 depicts a functional block diagram of a buffered serial port for a processor.

Referring now to FIG. 1 there may be seen a functional block diagram of a circuit for automatically buffering data for a serial port 102 of a processor 500. For ease of illustration purposes many of the interconnections between the depicted functional blocks have been omitted. Continuing to refer to FIG. 1, there may be seen a buffered serial port circuit 100 consisting of two functional blocks or portions, a full duplex double buffered serial port interface portion 200 and an automatic buffering unit portion 300.

The circuit 100 may operate in a normal ("standard") mode in which the automatic buffering unit 300 is disabled (and transparent) and data transfers are done under user control via software; that is, interrupts to the processor 500 are provided when one of the data transfers is completed and additional instructions are needed. When the automatic buffering unit 300 is enabled or being utilized, data transfers occur between the port interface portion 200 and a memory 600, via a memory interface circuit 400, without the need for any control by the processor 500. Preferably, the processor 500 is a digital signal processor, and most preferably a Texas Instruments TMS320C5x digital signal processor.

Continuing to refer to FIG. 1, it rosy be seen that the serial port interface 200 includes an input register (RSR) 202 and an output register (XSR) 204 that provide full duplex transmission and reception. The RSR register 202 is connected to a second input register (DRR) 206 and the XSR register is connected to a second output register (DXR) 208. The second set of registers 206, 208 are connected to a dedicated data bus 210 which serves to move data between the registers 206, 208 and a memory 600 associated with the processor 500. The data bus 210 may be appropriately connected to a memory interface circuit 400. Preferably, the memory 600 is on-chip with the processor 500, or it may optionally be off-chip. This plurality of data registers allows for data transfer between the serial port and the memory. Preferably each of these four registers are sixteen bits in length, but other lengths may be so employed. Preferably, the second registers DRR 206, DXR 208 are memory mapped registers.

Data to be transmitted is written to the DXR register 208 which transfers the data to the XSR register 204. The XSR register 204 outputs the stored data in response to a received frame synchronization pulse (FSX) and a clock signal (CLKX) provides the clock pulses to clock the data out of register 204 via line 254. This allows new data to be written to the DXR register 208. Similarly, data is clocked into the RSR register 202, which transfers it to the DRR register 206. The received data is then read from the DRR register 206 and transferred to memory 600. This allows the input register RSR to receive new data.

The full duplex serial port interface 200 provides direct communication with serial devices such as, for example, but not limited to, codecs, serial analog-to-digital converters, and other serial devices with a minimum of external hardware. The serial port interface also includes a pulse coded modulation (PCM) mode that easily interfaces with a PCM line. The double buffered serial port interface 200 allows transfers of data either in a continuous stream or in bursts, and in one of four different data packet sizes, as noted more fully later herein.

In burst mode, each packet is controlled by its frame synchronization pulse. In continuous mode, once a data transfer operation is initiated no further frame synchronization pulses are required. The polarity of the frame and clock strobes may be programmably (or software) selected. For transmissions, the serial port generates a frame signal and a selectable frequency for the internal serial clock. The serial port is preferably fully static which allows it to function at arbitrarily low clock frequencies and it may clocked at the maximum clock rate of its associated processor 500.

As may be seen from FIG. 1, the serial port interface 200 receives from and/or provides to the serial port 102 a number of control and data signals. For example, the CLKX signal rosy be provided as an output signal or received as an input on line 250, which is connected to an external pin 104. The CLKX signal is the clock signal for clocking data from the XSR register 204 via line 254 and its associated external pin 108 as output data, DX. Such data may be programmably selected to be clocked out on either the rising or falling edge of the clock signal CLKX. Further, the CLKX signal may either be generated internally based on the clock signal from (or for) the processor 500, or supplied by an external source or device (not depicted).

The FSX signal is either an input or output signal on line 252, which is also connected to an external pin 106. This signal is for frame synchronization and in a burst transmit mode the FSX signal initiates the data transmit process. A continuous transmit mode may also be selected. The FSX signal may be programmably selected to be either active high or active low. Preferably upon reset of device 100, it is an input and is active high.

The DX signal is an output on line 254, which is connected to an external pin 108. The DX signal is the serial data transmitted by the XSR register 204, at the CLKX rate. The DX line 254 may be placed in a high impedance state when it is not used for transmitting.

The CLKR signal is an input signal received from an external pin 112 via line 258. This signal is the external clock signal for clocking data into the RSR register 202, via line 256 and its associated external pin 110. Data may be clocked in on either the rising or falling edge of the clock signal CLKR.

The DR signal is the input data signal received from an external pin 110 via line 256. Again, the DR signal is the serial data to be received by the serial port interface 200 and will initially be stored in the RSR register 202.

The FSR signal is an input signal received from an external pin 114 via line 260. The FSR signal is the frame synchronization signal that initiates the data receive process when in a burst receive mode. A continuous receive mode may also be selected.

FIG. 1 also depicts a control circuit 212 which is made up of four functional subblocks 212XS, 212XA, 212RS, 212RA and which provides appropriate control signals to the registers based upon clock signals and information stored in control registers 216, 218. These control signals control data transfers between the two sets of data registers 204 and 208 or 202 and 206, and their respective inputs and outputs; the automatic buffering unit provides control signals that transfer data to/from the memory 600 via the data bus 210. A transmit cycle is performed by writing data in parallel to the DXR register 208 which transfers the data in parallel to the XSR register 204, where it is clocked out or shifted out as data (DX) on line 254; this may be, for example, in response to the receipt of a frame synchronization pulse, FSX. A receive cycle involves data being clocked into the RSR register 202 and this register 202 transferring the data in parallel to the DRR register 206 from which it may be read and written to memory 600 in parallel.

The serial port 102 is thus double buffered as data may be transferred to the DXR register 208 or from the DRR register 206 while another transmission or reception is being performed. It is also full duplex since the transmission and reception may occur independently of each other.

Control circuit 212 includes four functional blocks of circuitry for performing four distinct functions. The asynchronous transmit portion 212XA of the control circuit 212 is for control of the two data registers XSR 204 and DXR 208, and other control and operational registers that operate using external clock signals. The synchronous transmit portion 212XS is for control of the remainder of circuit 100 that operates using internal or processor clock signals. The asynchronous receive portion 212RA of the control circuit 212 is for control of the two data registers RSR 202 and DRR 206, and other control and operational registers that operate using external clock signals. The synchronous receive portion 212RS of the control circuit 212 is for control of the remainder of circuit 100 that operates using internal or processor clock signals. The remaining portion of control circuit 212 (not depicted) serves to generate the various clock signals used throughout circuit 100.

An interrupt control circuit 214, which is made up of a receive portion 214R and a transmit portion 212X, provides the processor interrupts for a receive or transmit completion or problem. When the automatic buffering unit is disabled these interrupts are generated when the RSR register 202 is full or the XSR register 204 is loaded. The interrupt control circuits 214R, 212X are connected to their respective asynchronous portions of the control circuit 212.

The two control registers 216 and 218 are registers that store information or data that selects or determines the modes of operation of the circuit 100. The information in the registers is generally accessible by the processor 500, but some selected bit positions may be read only. Preferably, control registers 216, 218 are sixteen bit registers. Control register 216 includes information about operations of the serial port interface portion 200 and control register 218 includes information about operations of the serial port interface 200 and automatic buffering unit 300. Preferably, both control registers 216, 218 are memory mapped registers.

In summary, for transmissions, the transmit frame synchronization pulse (FSX) is the control signal on pin 106 that initiates the data transfer. The data is sent out on line 254 as serial data (DX) at the transmit clock rate (CLKX). For reception, the receive frame synchronization pulse (FSR) initiates the data transfer which is received as serial data (DR) at the receive clock rate (CLKR).

As also shown in FIG. 1, the automatic buffering unit portion 300 includes a transmit address register AXR 302, a block size transmit register BKX 304, a receive address register ARE 306 and a block size receive register BKR 308. The transmit address register 302 and block size transmit register 304 also have address generator circuitry 310 associated therewith for circular address generation to allow for reading data from the memory 600 to the DXR register 208 for transmission via the serial port 102. In a similar manner, the receive address register 306 and block size receive register 308 also have address generator circuitry 312 associated therewith for circular address generation to allow for reading data from the DRR register 206 (received via the serial port 102) and writing it to the memory 600. Although preferably configured to perform circular addressing, the address generators 310, 312 may also be configured to provide other types of addressing schemes. Preferably, the registers 302, 304, 306, 308 are memory mapped registers.

The two address registers 302, 306 are connected to a dedicated address bus 314 which sends addresses to the memory interface circuit 400. In this manner the address registers provide the address in memory 600 from which data is retrieved to be transmitted or provide the address in memory 600 to which data is written or stored for later use by the processor 500.

The automatic buffering unit 300 also includes an automatic buffering unit control circuit 316. This control circuit 316 provides appropriate control signals to the registers 302, 304, 306, 308, the generators 310, 312 and portions of the serial port interface circuit 200. As noted earlier herein, this circuit 316 generates the control signals to transfer data to the data bus 210 and memory interface 400 from the DRR register 206. This circuit 316 also generates an interrupt of the processor 500 when the transmit or receive buffer in memory 600 has been halfway or entirely emptied or filled, respectively. The interrupt portion of circuit 316 also automatically disables the automatic buffering unit 300 upon certain occurrences.

The output (transmit) and input (receive) portions of circuit 300 may be separately enabled or disabled independently of the enabling or disabling of the other portion of the automatic buffering unit 300. When the automatic buffering unit 300 is not enabled or used, its registers may be used as general purpose registers by the processor 500. The input and output portions may also be separately run in a burst mode of operation or a continuous mode of operation. When both portions of circuit 300 are enabled, preferably an output or transmit request has priority over an input or receive request.

The memory 600 used by the buffered serial port unit 100 may be any type or size of memory; preferably it is on-chip processor memory and preferably it is a single block of memory of at least 2K words of single access memory. Preferably, the block of memory used as a buffer is mapped to the processor memory. The buffer in memory 600 may be programmably selected to be data, program, or a combination of both data and program. Even when the automatic buffering unit 300 is enabled, the processor 500 may still access the block of memory. Since the memory 600 may also be accessed by the processor 500 at the same time that the automatic buffering unit 300 is accessing the memory 600, a conflict may occur; if such a conflict occurs the memory interface circuit 400 gives the automatic buffering unit 300 priority and the processor waits a cycle.

The automatic buffering unit 300 allows the serial port 200 to directly interface with the memory 600 of the processor 500 for reading data out of the transmit buffer of memory 600 for output (transmitting) and for storing input (received) data in the receive buffer of memory 600. The unit 300 has its own set of circular addressing registers 302, 304, 306, 308 and associated address generators 310, 312 that allow it to address buffers residing in a block of memory in memory 600; the length of the buffers and their starting addresses are selectable via programming. Then processor resources (registers) are not needed for data management, which results in minimum overhead for serial port transactions. The processor 500 is interrupted when the transmit or receive buffer is half empty or half full, respectively, and when these buffers are empty or full, respectively. The unit 300 may also automatically disable itself if certain actions occur, such as, for example, the receive buffer is full, as described more fully later herein.

Figures 2, 3, 19:
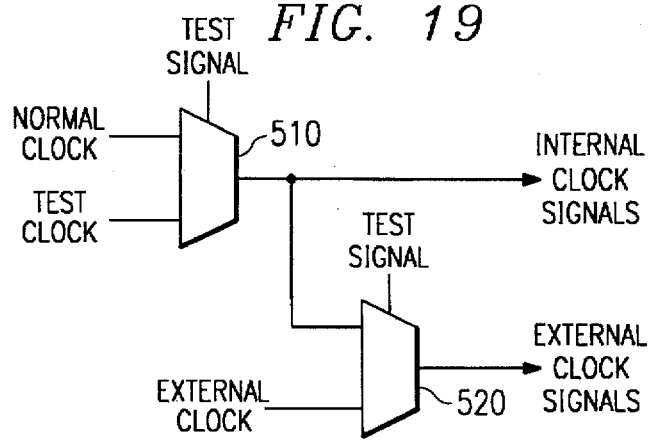
FIG. 2 depicts a block diagram of the bit positions and associated signals of a first control register used in FIG. 1.
FIG. 3 depicts a block diagram of the bit positions and associated signals of a second control register used in FIG. 1.
FIG. 19 depicts a summary circuit for test circuitry employed the present invention.

Referring now to FIG. 2 there may be seen a block diagram of the bit positions and associated signals of a first control register, SPC, used in FIG. 1. More particularly, there may be seen the presently preferred arrangement of control bits in control register 216 for the control of circuit 100. As may be seen from FIG. 2, the individual bit position is numerically depicted with the signal name below the bit position and with the read/write or read only information below the signal being indicated by the R, for read access only, or R/W for read and write access. Each bit position and its associated control signal will now be discussed.

Bit position zero is a reserved bit position and is always read as a zero.

Bit position one is a digital loop back (DLB) mode bit that connects FSR to FSX and DR to DX when set to one, i.e. the DLB mode. That is, the DR line 256 and DX line 254 are inputs to a multiplexer with the output signal being determined by the DLB bit value and the output of the multiplexer supplied as the internal DR signal; in a similar manner the FSR and FSX signals are inputs to a multiplexer with the output signal being determined by the DLB bit value and the output of the multiplexer supplied as the internal FSR signal. Thus, the FSX and DX signals appear on the device pins in the DLB mode, but FSR and DR do not. In addition, the CLKR signal is driven by the CLKX signal when the MCM bit of bit position four is a logic high or a one, or is taken from the CLKR pin if MCM is a logic low or a zero, which allows CLKX and CLKR to be tied together externally and supplied by a common external clock. The TXM bit in bit position five should be set to one for proper operation of the digital loop back mode.

Bit position two, FO, is the first half of a format bit pair; the other half is in control register 218 at bit position seven (FE), and will be discussed later herein with regard to FIG. 3. The format bit pair FO FE selects the word length of the words processed by the circuit 100. When FO FE is 00, then sixteen bit words are selected; when FO FE is 01, then ten bit words are selected. When FO FE is 10, then eight bit words are selected; when FO FE is 11, then twelve bit words are selected. For eight, ten and twelve bit words the received words are right justified and the sign bit is extended to form a sixteen bit word. Transmitted words are also right justified. FO is reset to zero upon device reset. Clearly, other word lengths may be so employed.

Bit position three, FSM, is the frame synchronization bit that specifies whether frame synchronization pulses are required for the serial port's operation. When set to one, a frame pulse is required on FSX/FSR for the transmission/reception of each word; this is the burst mode of operation. When set to zero, the circuit 100 is in the continuous mode of operation, which is described more fully later herein.

Bit position four, MCM, is the clock mode bit that specifies the clock source for CLKX. When set to zero, CLKX is taken from the CLKX pin. When set to one, CLKX is driven by an on-chip source having a variable frequency determined by other bits (CLKDV) in register 218, which is described later herein with regard to FIG. 3. When MCM is set to one and DLB is set to one, the CLKR signal is also supplied by the internal source. The variable frequency is determined by a fractional multiplier times the output clock signal, CLKOUT, from the processor 500. The fractional multiplier is equal to one divided by the value of CLKDV plus one.

Bit position five, TXM, is the transmit mode bit that specifies whether FSX is an input or an output. When set to zero, FSX is an input and when set to one, FSX is an output. When TXM is one, frame synchronization pulses are internally generated when data is transferred from the DXR register 208 to the XSR register 204. The internally generated frame synchronization pulse is synchronous with respect to CLKX. When TXM is zero, FSX is supplied on the FSX pin 106 by an external device.

As may be seen from FIG. 2, bit positions six, XRST, and seven, RRST, are reset signals for the transmitter and receiver portions of circuit 100, respectively. When a zero is written to either one of these bit positions, the activity in its corresponding section of circuit 100 halts. When both are zero the internal clocks to the serial port are shut off, allowing the circuit to run in a low power mode. To reconfigure the circuit 100, two writes should be made to the control register 216, the first write places zeroes in these two bit positions and the desired configuration in bits one to five, while the second write places ones in these two bit positions to take the circuit 100 out of reset. In addition, writing a zero to XRST clears the XSREMPTY bit position to zero and sets the XRDY bit position to one, as noted later herein; writing a zero to RRST clears the RSRFULL bit position to zero and clears the RRDY bit position to zero, as noted later herein.

As may also be seen from FIG. 2, bit positions eight, IN0, and nine, IN1, allow the CLKR and CLKX pins to be used as bit level inputs; that is, the logic or voltage level values of IN0 and IN1 reflect the real time logic or voltage level values on the CLKR and CLKX pins, so that the values on these pins may be read by reading these two bit positions, or tested using various processor test instructions.

Bit positions ten, RRDY, and eleven, XRDY, are the receive ready and transmit ready bits. A transition from zero to one of the RRDY bit position indicates that the received data in the RSR register 202 has been copied into the DRR register 206 and that the new data may be read from register 206. In the standard mode, a receive interrupt is generated to the processor 500 by this transition. When the data in the DRR register 206 is read, either by software in the standard mode or by the automatic buffering unit 300 in the auto-buffering mode, RRDY is reset to zero. RRDY is set to zero upon device reset and upon serial port receive reset (e.g. RRST is set to zero).

Similarly, a transition from zero to one of the XRDY bit indicates that the new contents of the DXR register 208 have been copied to XSR register 204, and that the DXR register 208 is ready to be reloaded with a new data word from memory 400. In the standard mode, a transmission interrupt is generated by this transition. When the DXR register 208 is written to, either by software in the standard mode or by the automatic buffering unit 300 in the auto-buffering mode, the XRDY bit is reset to zero. XRDY is set to one upon device reset and upon serial port transmit reset (e.g. XRST is set to zero).

In FIG. 2, bit position twelve, XSREMPTY, is the transmit shift register empty flag. XSREMPTY is reset to zero upon device reset and upon serial port transmit reset (e.g. XRST is set to zero). The transmit shift register empty (XSREMPTY) bit is employed to monitor the state of the XSR register 204; when a new word (e.g. XRDY is zero) has been transferred from DXR register 208 to the XSR register 204, this bit is set to one while at the same time XRDY is set to one.

Bit position thirteen, RSRFULL, is the receive shift register full flag. This bit position is set to one when a word has been shifted into the RSR register 202 and the current data in the DRR register 206 has not been read yet (e.g. RRDY is one). When RSRFULL is one, the receive portion of circuit 100 halts and waits for the DRR register 206 to be read; the data in the RSR register 202 is preserved but any new data sent on DR line 110 is lost.

As shown in FIG. 2, bit position fourteen, SOFT, is the soft bit and is used in the emulation mode. This bit is enabled when the FREE bit is zero. If the FREE bit is zero, the SOFT bit selects an immediate stop when zero and a stop after a word transmit completion when one. SOFT is set to zero upon reset.

Bit position fifteen, FREE, is the free bit and is also used in the emulation mode. When FREE is set to one, free run is selected regardless of the value of SOFT. When FREE is set to zero, the SOFT bit selects the emulation mode as described above. FREE is set to zero upon reset.

In more detail, SOFT and FREE are special emulation bits that determine the state of the serial port clock when a breakpoint is encountered in a high level language debugger. If the FREE bit is set to one, then upon a software breakpoint, the clock continues to run and data is shifted out or in. For this case SOFT is not relevant. If FREE is zero, the SOFT bit takes effect and if SOFT is zero then the clocks stop immediately, but if SOFT is one the current transmission continues until the word is transmitted and then the transmit clock halts, but the receiver is not affected for this case.

Referring now to FIG. 3 there may be seen a block diagram of the bit positions and associated signals of a second control register, SPCE, used in FIG. 1. More particularly, there may be seen the presently preferred arrangement of control bits in control register SPCE 218 for the control of circuit 100. As may be seen from FIG. 3, the individual bit position is numerically depicted with the signal name below the bit position and with the read/write or read only information below the signal being indicated by the R, for read access only, or R/W for read and write access.

Bit positions one through four, CLKDV, are the internal clock division factor bits. When the MCM bit is set to one, CLKX is driven by an on-chip clock source having a frequency equal to the CLKOUT signal of the processor 500 multiplied by a variable factor; the variable factor is equal to one divided by the value of CLKDV plus one. CLKDX's range is from zero to thirty-one. When CLKDV is odd or equal to zero, the CLKX duty cycle is half (50/50); when CLKDV is even (e.g. CLKDV is 2 p), then the CLKX high state duration is (p+1) or (p) cycles and the low state duration is (p) or (p+1) cycles when the polarity (CLKP) is zero or one, respectively. CLKDV is reset to three upon device reset.

Bit position five, FSP, is the frame synchronization polarity bit. When FSP is one, then the frame synchronization pulses (FSX and FSR) are active low; when FSP is zero, then the frame synchronization pulses (FSX and FSR) are active high. FSP is reset to zero upon device reset.

Bit position six, CLKP, is the polarity bit for clock signals. When CLKP is one, then data is sampled by the RSR register 202 on the CLKR rising edge and sent by the XSR register 204 on CLKX's falling edge; when CLKP is zero, then the input data is sampled on CLKR's falling edge and sent on the rising edge of CLKX. CLKP is reset to zero upon device reset.

Bit position seven, FE, is the other half of the format bit pair; the other half is in control register 216 at bit position two (FO), and has been previously discussed earlier herein with regard to FIG. 2. The format bit pair FO FE selects the word length of the words processed by the circuit 100. When FO FE is 00, then sixteen bit words are selected; when FO FE is 01, then ten bit words are selected. When FO FE is 10, then eight bit words are selected; when FO FE is 11, then twelve bit words are selected. For eight, ten and twelve bit words the received words are right justified and the sign bit is extended to form a sixteen bit word. Transmitted words are also right justified. FE is reset to zero upon device reset. Clearly, other word lengths may be so employed in the present invention.

Bit position eight, FIG, is the frame ignore bit. This bit only operates in the transmit continuous mode with an external frame and in the receive continuous mode. When set to one, frame pulses following the first frame pulse that initiates the serial port operation are ignored. When set to zero, frame pulses following the first frame pulse restart the serial port. FIG is reset to zero upon device reset.

Bit position nine, PCM, is the pulse coded modulation mode bit. This mode is active when PCM is one and only affects the output (transmitter) portion of circuit 100. In the PCM mode, the DXR register 208 contents are only transmitted if its sixteenth bit is set to zero; if this sixteenth bit is set to one, then the data in the DXR register 208 is not transmitted and the output driver for line 254 or signal DX is placed in a high impedance state during the transmission period. The transfer of data from the DXR register 208 to the XSR register 204 is not affected by the PCM bit.

Bit position ten, BXE, is the transmit auto-buffering enable bit. When BXE is one, auto-buffering is enabled for the output (transmit) portions of circuit 100; when BXE is zero, auto-buffering is disabled for the output (transmit) portions of circuit 100 and that portion of the serial port is in the standard mode of operation. BXE is reset to zero upon device reset.

Bit position eleven, XH, indicates which half of the output (transmit) buffer in memory 600 has been transmitted. When set to zero, it indicates that the first half has been sent; when set to one, it indicates that the second half has been sent. XH is reset to zero upon device reset.

Bit position twelve, HALTX, halts auto-buffering when the current half of the output (transmit) buffer has been transmitted. Also, when this occurs, the BXE bit is set to zero and operation continues in the standard mode of operation. HALTX is reset to zero upon device reset. Thus, this bit position disables the transmit portion of the auto buffering unit 300 upon the occurrence of a preselected event.

Bit position thirteen, BRE, is the receive auto-buffering enable bit. When BRE is one, auto-buffering is enabled for the input (receive) portions of circuit 100; when BRE is zero, auto-buffering is disabled for the input (receive) portions of circuit 100 and that portion of the serial port is in the standard mode of operation. BRE is reset to zero upon device reset.

Bit position fourteen, RH, indicates which half of the input (receive) buffer in memory 600 has been received. When set to zero, it indicates that the first half has been received; when set to one, it indicates that the second half has been received. RH is reset to zero upon device reset.

Bit position fifteen, HALTR, halts auto-buffering when the current half of the input (receive) buffer has been received. Also, when this occurs, the BRE bit is set to zero and operation continues in the standard mode of operation. HALTR is reset to zero upon device reset. Thus, this bit position disables the receive portion of the auto buffering unit 300 upon the occurrence of a preselected event.

Turning now to the overall transmit operation of circuit 100, the serial port employs two processes to perform a transmission. One process is the filling of the DXR register 208 with data in parallel under software control (in the standard mode) or under control of the automatic buffering unit 300 (in the auto-buffering mode). The second process is the transferring or copying of the data from the DXR register 208 to the XSR register 204 in parallel under the control of the serial port control circuit 212. In order to synchronize and monitor these two processes, two signals are used and their values are stored in the first control register 216. These two signals are transmit ready (XRDY) and transmit shift register empty (XSREMPTY); thus, the need for the XRDY signal to be provided to the auto buffering unit 300 by the serial port interface unit 200, as depicted in FIG. 1.

When the DXR register 208 has data written into it, the XRDY signal is cleared (to zero) so that the control circuits know that a new value is ready to be transmitted. When that data is transferred to the XSR register 204, the XRDY bit is set to one. The way this data transfer between registers occurs depends upon the transmission mode selected. As the transfer occurs, a transmit request is sent to the processor 500 as an interrupt (XINT), when in the standard mode of operation, or to the automatic buffering unit 300 as signal "xrdy", when in the auto-buffering mode. In the standard mode, the DXR register 208 is only written to if XRDY is one, which is guaranteed if the write to register 208 is made in response to a transmit interrupt or a polling of the XRDY bit position's value.

The transmit shift register empty (XSREMPTY) bit may be employed to monitor the state of the XSR register 204. This bit can only be written to by the control circuit 212. When a new word (e.g. XRDY is zero) has been transferred from DXR register 208 to the XSR register 204, this bit is set to one while at the same time XRDY is set to one. When a new word has been shifted out on line 254 as serial data DX, XSREMPTY is set to zero if the DXR register 208 has not been updated, e.g. another transmission with a new word will not follow the current transmission.

The control circuit 212 generates several internal control signals. One is a transmit frame acknowledge internal signal (XFRA) that is based upon the FIG bit and is used to control the synchronization pulse acceptance or nonacceptance during continuous mode; this signal is set to one upon reset of the device. An internal transmit counter (XCOUNT) signal is used for counting the number of data bits to be shifted. A number of bits to transmit (XBITS) signal is used to indicate the word length in bits. An internal signal for FSX state (FSXLOW) is used to monitor the value of the FSX signal. An internal signal for transmission high impedance is used in the PCM mode when the word is not transmitted. A transmission request is used to request transmission and becomes an xint in standard mode and a request to the buffering unit 300 in the auto-buffering mode.

The serial port interface transmits in either burst mode or continuous mode. Either mode may use an external clock (e.g. MCM is zero) or an internal clock (e.g. MCM is one); the internal clock has a selectable frequency based upon the processor's clock reduced by a fraction determined by CLKDV, as noted earlier herein. Either mode may operate in the PCM mode.

Turning initially to burst mode operations, for this mode of operation with an external frame pulse (e.g. TXM is zero), the packet is marked by the frame synchronization pulse (FSX). There may be some periods of inactivity between packets. The serial port's 100 operation starts when the frame signal becomes active, such as when sampled on the falling edge of the transmit clock. On the next rising edge of the transmit clock (clkx), data is copied in parallel from the DXR register 208 to the XSR register 204 and if the contents are new (XRDY is zero) then XRDY and XSREMPTY are set to one and a request for the next word to transmit is sent to the processor as xint in standard mode or by the automatic buffering unit 300 in the auto-buffering mode. If the DXR register's data is not new (XRDY is one) then the same value will transmitted and no request for transmit will be generated. At this some time the first bit is sent out on line 254. Line 254 will be driven by this bit for as long as the frame synch pulse is high. The following bits are shifted out on the next rising edge of the transmit clock after the frame synch pulse goes low and with that event (frame synch low) being detected on the falling edge of the transmit clock. After all the bits have been shifted out, line 254 is placed in a high impedance state and XSREMPTY is set to zero. A new frame synch pulse may prevent the setting of XSREMPTY to zero. If a frame synch pulse occurs during a transmission, the transmission is restarted, with the transmitted word being the same or different depending upon whether the DXR register 208 has a new word written into it.

Continuing with burst mode operations with an internal frame synchronization pulse (e.g. TXM is one), the frame synchronization pulse (FSX) is generated internally at the transmit serial clock rate on the rising edge following a write to the DXR register 208 (e.g. XRDY going to zero). The frame synchronization pulse is active during one full clock period. The remaining steps are as described above for the external synchronization pulse. Because of the double buffering, continuous transmission may be performed if the DXR register 208 is updated as part of the transmit interrupt (xint) service routine. In standard mode an external event may initiate transmission. In the auto-buffering mode, this mode of operation results in a continuous transmission with flames generated at each transmission start by the control circuit 212.

In the continuous mode with an external frame synchronization, only the first frame synch pulse is necessary to start and transmit consecutive packets of data. As long as the DXR register 208 is updated once every transmission, the continuous mode will continue. Missing an update will halt the next transmission and requires a new frame synch pulse to restart the transmissions. While in the continuous transmission sequence, the next and subsequent frame synchs after the first will be ignored, if the frame ignore (FIG) bit is set to one, or will restart the transmission if the frame ignore bit is set to zero. Setting the frame ignore bit to one allows for continuous transmission in a sixteen bit format, while the frame synch signal may be based on 8, 10, or 12 bit formats; this may result in a significant gain for buffer size in both the auto-buffering and standard modes and a significant gain in processor cycles in the standard mode.

In the continuous mode with an internal frame synch, the frame synch pulse is generated internally at the transmit clock rising edge following a write to the DXR register 208. The frame synch pulse is active during one full clock period. The remaining steps are similar to those described above for the external synch pulse. Because of the double buffering, continuous transmission may be performed if the DXR register 208 is updated once every transmission. Missing an update will halt the next transmission and requires a new write to the DXR register 208 to restart the transmissions.

Turning now to the overall receive operation of circuit 100, the serial port also employs two processes to receive data. One process is the copying of the data in parallel from the RSR register 202 to the DRR register 206 under the control of the serial port control circuit 212. The second process is the reading of the data in parallel from the DRR register 206 under software control (in the standard mode), or under control of the automatic buffering unit (in the auto-buffering mode), and the writing to memory 600 of this read data. In order to synchronize and monitor these two processes, two signals are used in the first control register 216. These two signals are receive ready (RRDY) and receive shift register full (RSRFULL).

When the DRR register 206 has data read from it, the RRDY signal is cleared (to zero) and the RSRFULL signal is cleared (to zero) so that the control circuits know that a new word may be received. When data is transferred from the RSR register 202 to the DRR register 206, the RRDY bit is set to one. This transfer only occurs if the RSRFULL bit is zero. If the RSRFULL bit is still one, then the control circuit 212 cannot receive data until the DRR register 206 is read. RSRFULL set to one may in this event be considered an overflow event. As the transfer between registers occurs, a receive request is sent to the processor 500 as an interrupt (tint), when in the standard mode of operation, or to the automatic buffering unit 300 as signal "rrdy", when in the auto-buffering mode. In the standard mode, the DRR register 206 is only read if RRDY is one, which is guaranteed if the read of register 206 is made in response to a receive interrupt or polling of RRDY.

The serial port interface receives in either burst mode or continuous mode. The control circuit 212 generates several internal control signals. One is a receive frame acknowledge internal signal (RFRA) that is based upon the FIG bit and is used to control the synchronization pulse acceptance or nonacceptance during continuous mode; this signal is set to one upon reset of the device. An internal receive counter (RCOUNT) signal is used for counting the number of data bits to be shifted. A number of bits to receive signal is used to indicate the word length in bits. A receive request is used to request reception and becomes an rint in the standard mode and a request to the buffering unit 300 in the auto-buffering mode.

Turning initially to burst mode operations, for this mode of operation the packet is marked by the frame synchronization pulse (FSR). There may be some periods of inactivity between packets. The port's operation starts when the frame synchronization signal becomes active, such as when sampled on the falling edge of the receive clock. After sampling the frame synch pulse (FSR) low, the first bit is shifted into the RSR register 202 from line 256 at the falling edge of the receive clock. After all the bits have been received, if RRDY is zero (the last word in the DRR register 206 has been read), then RRDY is set to one and the receive interrupt is sent to the processor in the standard mode or a request for emptying the DRR register 206 is sent to the automatic buffering unit 300 in the auto-buffering mode. If RRDY is still one, RSRFULL is set to one and reception halted. Reception is restarted on the next frame synch signal if RSRFULL is zero. Because of the double buffering reception may be continuously maintained. If a frame synch occurs during a reception, reception is restarted and any bits shifted into the RSR register 202 are lost.

In the continuous mode with an external frame synch, only the first frame synch pulse is necessary to start and receive consecutive packets of data. As long as the DRR register 206 is read every reception, the continuous mode will continue. Missing a read will halt the next reception and requires a new frame synch pulse and a read of the DRR register 206 to restart the receptions. While in the continuous reception sequence, the next and subsequent frame synchs after the first will be ignored, if the frame ignore (FIG) bit is set to one, or will restart the reception if the frame ignore bit is set to zero. Setting the frame ignore bit to one allows for continuous reception in a sixteen bit format while the frame synch signal may be based on 8, 10, or 12 bit formats; this may result in a significant gain for buffer size in both the auto-buffering and standard modes and a significant gain in processor cycles in the standard mode.

The transmit and receive buffers used for automatic buffering reside in memory 600. Preferably, the buffers reside in the same block of memory and the memory is internal memory for the processor 500. The end address and size of the buffers is selectable by using the address registers 302, 306 and block size registers 304, 308. The transmit and receive buffers may reside in the same area of memory, which allows for transmitting from a buffer while receiving in the same buffer, in an overlapping area or in different areas.

The auto-buffering mode relies upon circular addressing when a limited memory block size is allocated for the buffers. The circular addressing scheme is the same for either the receive or transmit portions of the automatic buffering unit 300. An address register 302, 306 stores the current address while the block size register 304, 308 stores the block size.

The automatic buffering unit's control circuit 316 serves to initially perform any memory access and then update the address register. This is followed by deciding whether or not to generate an interrupt and then deciding if the auto-buffering should be disabled. An interrupt is generated when the first half of a buffer or the second half of a buffer is processed. The RH and XH flags are used to determine which half of a buffer has been processed. When the HALTR bit is set, then auto disabling is enacted when the next buffer boundary is found and BXE or BRE are cleared so auto-buffering is halted. When transmit auto-buffering is stopped some data may remain to be sent (the current word in the XSR register and last loaded data in the DXR register); for this case this data should be transmitted and end of transmission verified by checking XRDY is one and XSREMPTY is zero.

The automatic buffered serial port 100 of the present invention may operate in a stand-alone mode when the processor and other peripherals have been shut-down to conserve power. This feature is particularly useful for systems that are battery operated, where minimizing power consumption is very important, such as when the system in which circuit 100 is employed must operate in a stand-by mode for extended periods of time. More particularly, when used with a TMS320C5x digital signal processor which has an IDLE2 instruction which puts the processor and peripherals into a "sleep" mode, the port 100 of the present invention may keep sending and/or receiving data via the serial data port 102. When the circuit 100 is ready to read a word from or write a word to memory, it will automatically turn on the clocks for the memory and drive the address and data buses to access a memory location; wakeup logic 220 in FIG. 1 accomplishes these activities. During this time the processor and other peripherals will not be awakened. After the memory access the clocks are turned off again. However, when the transmit buffer is half empty or completely empty, the circuit 100 will wake up the processor via an interrupt. Similarly, when the receive buffer is half full or completely full, the circuit 100 will wake up the processor. The processor may then process the received data and/or fill the transmit buffer, and then go back to sleep. This sequence of operations occurs when the circuit 100 is in the auto-buffering mode. However, the same sequence may still be employed in the standard mode but the interrupts will be at a word level, i.e. for each packet of data, rather than for half a buffer.

The wakeup circuitry uses an external clock signal or preferably the frame synch signal to activate the internal clocks needed for accessing the memory. After the access is completed the internal clocks are again shut down using the normal internal shutdown logic that is executed when the processor shuts down the processor and supporting memory or peripherals.

Figure 4:
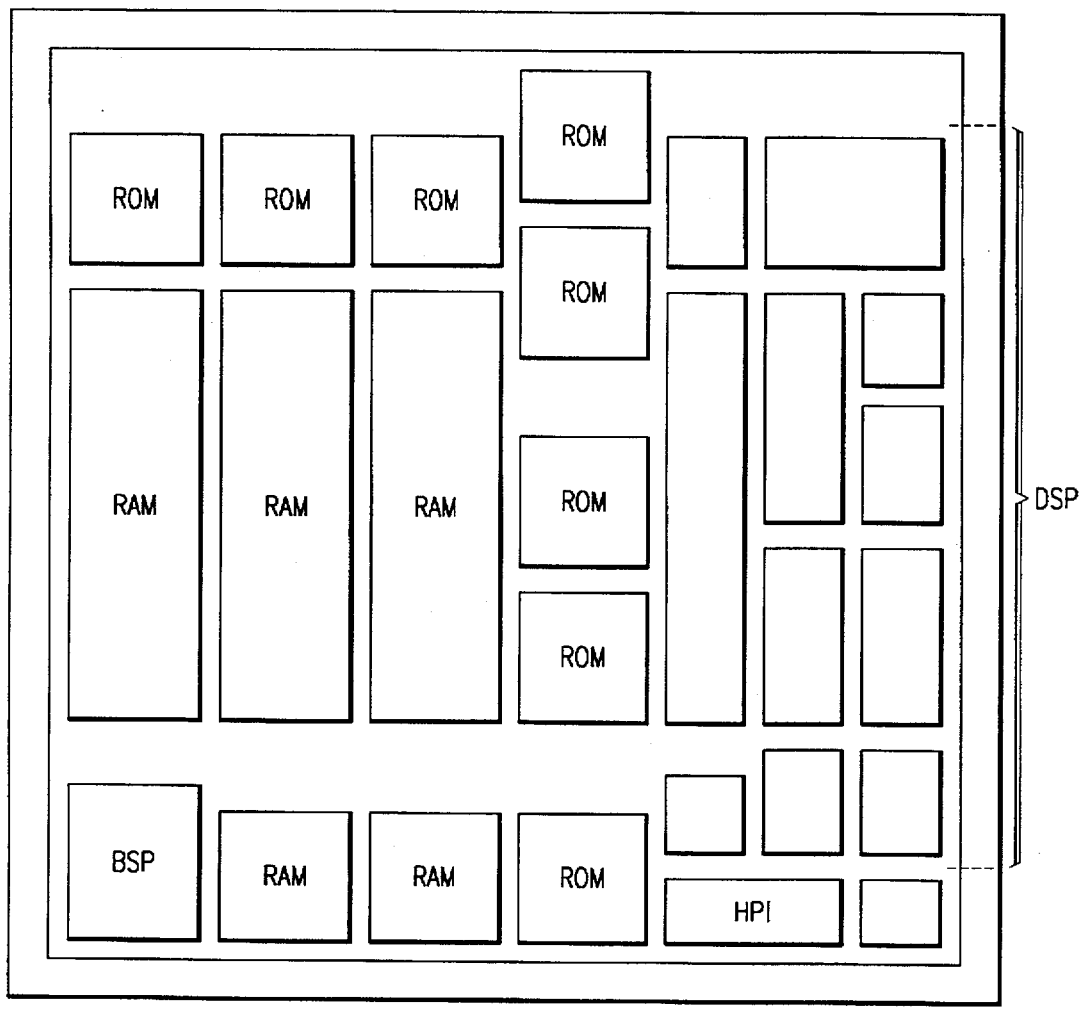
FIG. 4 depicts a top view of a CMOS/VLSI chip that includes a digital signal processor (DSP), the circuit 100 and memory associated with the DSP.

Referring now to FIG. 4, there may be seen a top view of a CMOS/VLSI chip that includes a C5x DSP, the BSP circuit 100 and several blocks of memory associated with the DSP. More particularly, there may be seen several blocks of ROM and several blocks of single ported RAM, one of which may serve as memory 600. In addition, there are two blocks of dual ported RAM. There may also be seen the portion of the chip that corresponds to circuit 100 (labeled BSP) and generally the remainder of the chip is the DSP. Note that the DSP depicted may include other serial or parallel ports (not identified in FIG. 4) for interfacing with other external devices. Thus, the circuit 100 may be integrated on a single chip with memory 600 and a DSP 500. FIG. 4 is one example of such an integration. Clearly, different types and sizes of memory may be present on the chip (of which a portion is used for memory 600), and different types of DSPs or processors 500 may be on the chip with circuit 100 and the memory.

Figure 5A:
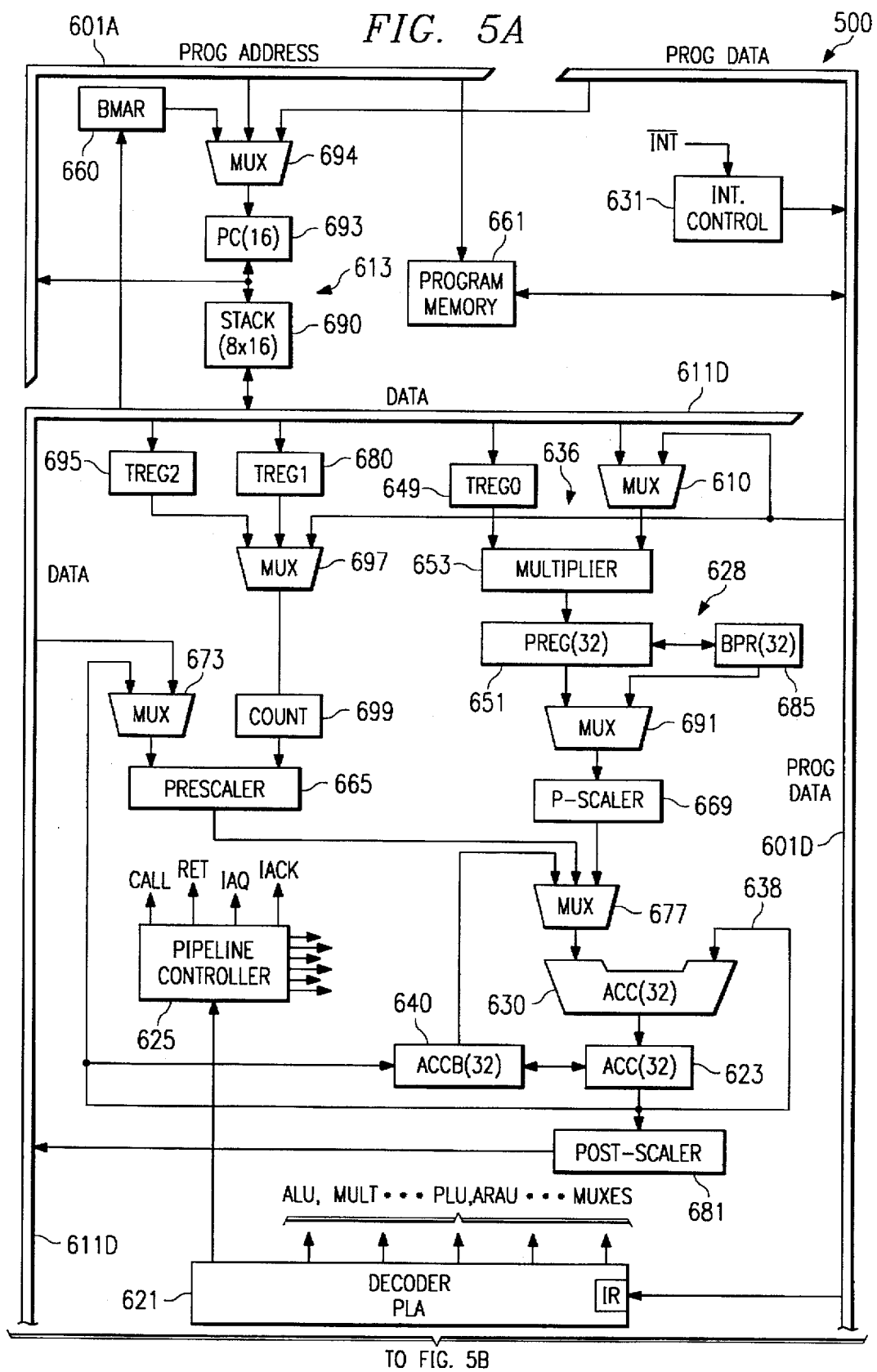
FIGS. 5A and 5B depict a simplified functional block diagram of a DSP depicted in FIG. 4.
Figure 5B:
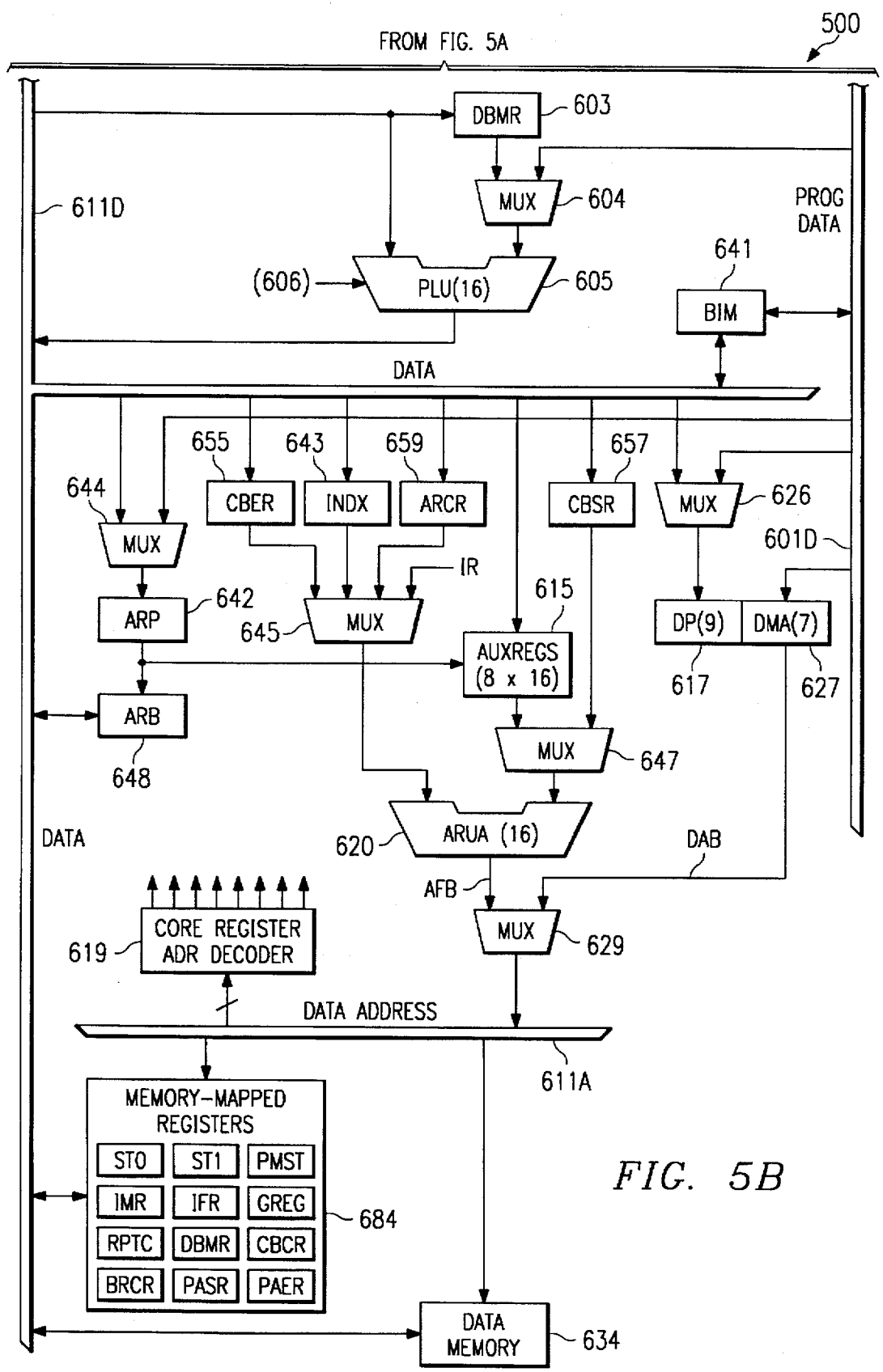

Referring now to FIGS. 5A and 5B, there may be seen a simplified functional block diagram of a presently TMS320C5x DSP, which is exemplary of a DSP that may be employed with the circuit 100 of the present invention. The functional block diagram shown in FIGS. 5A and 5B depicts the principal blocks and data paths within a presently preferred TMS320C5x digital signal processor. The presently preferred DSP device 500 of FIGS. 5A and 5B implements a Harvard-type architecture that employs two separate bus structures, one for program and one for data, to allow for full-speed execution that maximizes processing power. The processor 500 internal hardware includes a single-cycle 16×16-bit multiplier 636, data shifters 665, 669, 681 and address generators/manipulators 620.

Again, the C5x processor architecture is built around two major buses: a program bus, 601A and 601D, and a data bus, 611A and 611D. The program bus 601 carries instruction code and immediate operands from a program memory 661 on program data bus 601D, while addresses are supplied to program memory 661 on program address bus 601A. That is, program memory 661 is connected at its addressing inputs to program address bus 601A and at its read/write input/output to program data bus 601D.

The data bus includes a data address bus 611A and a data data bus 611D, which interconnects various elements, such as the Central Arithmetic Logic Unit (CALU) 628, an auxiliary register file 615, registers 684 and data memory 634. Data memory 634 and registers 684 are addressed via data address bus 611A. A core register address decoder 619 is connected to data address bus 611A for addressing registers 684 and other addressable CPU core registers.

Together, the program and data buses 601 and 611 can carry data from on-chip data memory 634 and internal or external program memory 661 to the multiplier 636 in a single cycle for multiply/accumulate operations.

The device 500 has a program addressing circuit 613 and a central computation circuit 628. Computation circuit 628 performs two's-complement arithmetic using a 32 bit ALU 630 and accumulator 623. The ALU 630 is a general-purpose arithmetic logic unit that operates using 16-bit words taken from data memory 634 of FIG. 5B or derived from immediate instructions or using the 32-bit result of multiplier 636. In addition to executing arithmetic instructions, the ALU 630 can perform Boolean operations. The accumulator 623 stores the output from the ALU 630 and provides a second input to the ALU 630 via a path 638. The accumulator 623 is illustratively 32 bits in length and is divided into a high-order word (bits 31 through 16) and a low-order word (bits 15 through 0). Instructions are provided for storing the high and low order accumulator words in data memory 634. For fast, temporary storage of the accumulator 623 there is a 32-bit accumulator buffer ACCB 640.

A processor scaling shifter 665 has a 16-bit input connected to data bus 611D via a multiplexer (MUX) 673, and a 32-bit output connected to the ALU 630 via a multiplexer 677. The scaling shifter 665 produces a left-shift of 0 to 16 bits on the input data, as programmed by instruction or defined in a shift count register (TREG1) 680. The LSBs (least significant bits) of the output are filled with zeros, and the MSBs (most significant bits) may be either filled with zeros or sign-extended, depending upon the state of the sign-extension mode bit SXM of the status register ST1 in the set of registers 684 of FIG. 5B. Additional shift capabilities enable the processor 500 to perform numerical scaling, bit extraction, extended arithmetic, and overflow prevention.

The multiplier 636 of FIG. 5A performs a 16×16 bit two's complement multiplication with a 32-bit result in a single instruction cycle. The multiplier consists of three elements: a temporary TREG0 register 649, product register PREG 651 and multiplier array 653. The 16-bit TREG0 register 649 temporarily stores the multiplicand; the PREG register 651 stores the 32-bit product. Multiplier values come from data memory 634, from a program memory 661 when using the MAC/MACD instructions, or are derived immediately from the MPYK (multiply immediate) instruction word. The fast on-chip multiplier 636 allows the device 500 to efficiently perform fundamental DSP operations such as convolution, correlation, and filtering.

Up to eight levels of a hardware stack 690 are provided for saving the contents of a program counter 693 during interrupts and subroutine calls. Program counter 693 is selectively loaded upon a context change via a MUX 694 from program address bus 601A or program data bus 601D. The program counter 693 is written to address bus 6101A or pushed onto stack 690. On interrupts, certain strategic registers are pushed onto a one deep stack and popped upon interrupt return; thus providing a zero-overhead, interrupt context switch. The interrupts operative to save the contents of these registers are maskable.

The program counter 693 addresses program memory 661, either on-chip or off-chip, via the program address bus 601A. Through the address bus 601A, an instruction is addressed in program memory 661 and loaded via program data bus 601D into the Instruction Register (IR) for a decoder PLA 621. When the IR is loaded, the PC 693 is ready to start the next instruction fetch cycle. Decoder PLA (programmable logic array) 621 has numerous outputs for controlling the MUXes and processor elements needed to execute the instructions in the processor instruction set. For example, decoder PLA 621 feeds command signals to a pipeline controller 625 which also has various outputs for implementing the pipelined processing operations so that the processor elements are coordinated in time. The outputs of pipeline controller 625 also include CALL, RET (RETURN), IAQ (interrupt acquisition) and IACK (interrupt acknowledge).

In addition to the main ALU 630 there is a Peripheral Logic Unit (PLU) 605 in FIG. 5B that provides logic operations on memory locations without affecting the contents of the accumulator 623. The PLU 605 provides extensive bit manipulation ability for high-speed control purposes and simplifies bit setting, clearing, and testing associated with control and status register operations.

Eight auxiliary registers (AR0–AR7) in the axiliary register file 615 may be connected to the Auxiliary Register Arithmetic Unit (ARAU) 620 shown in FIG. 5B. Although the ARAU 620 is useful for address manipulation in parallel with other operations by CALU 628, it also serves as an additional general-purpose arithmetic unit since the auxiliary register file can directly communicate with data memory. The ARAU implements 16-bit unsigned arithmetic.

In FIG. 5B, a Bus Interface Module (BIM) 641 is connected between data bus 611D and program data bus 601D. BIM 641 permits data transfers between buses 601D and 611D and increases the architectural flexibility of the processor compared to either classic Harvard or Von Neumann architecture.

In response to a powerdown instruction and when operating in a powerdown mode, the processor core enters a dormant state and dissipates considerably less power than the power normally dissipated by the device. The powerdown mode is invoked either by executing an IDLE instruction or by driving the HOLD- input low while the HM status bit is set to one.

While in powerdown mode, all of the internal contents of processor 613, 628 are maintained to allow operation to continue unaltered when the powerdown mode is terminated. Powerdown mode, when initiated by an IDLE instruction, is terminated upon receipt of an interrupt. When powerdown mode is initiated via the HOLD- signal it is terminated when the HOLD- goes inactive.

The power requirements can be further lowered to the sub-milliamp range by slowing down or even stopping the input clock. Reset, RS-, is suitably activated before stopping the clock and held active until the clock is stabilized when restarting the system. This brings the device back to a known state. The contents of most registers and all on-chip RAM remain unchanged; the exceptions include the registers modified by a device reset.

Figure 6:
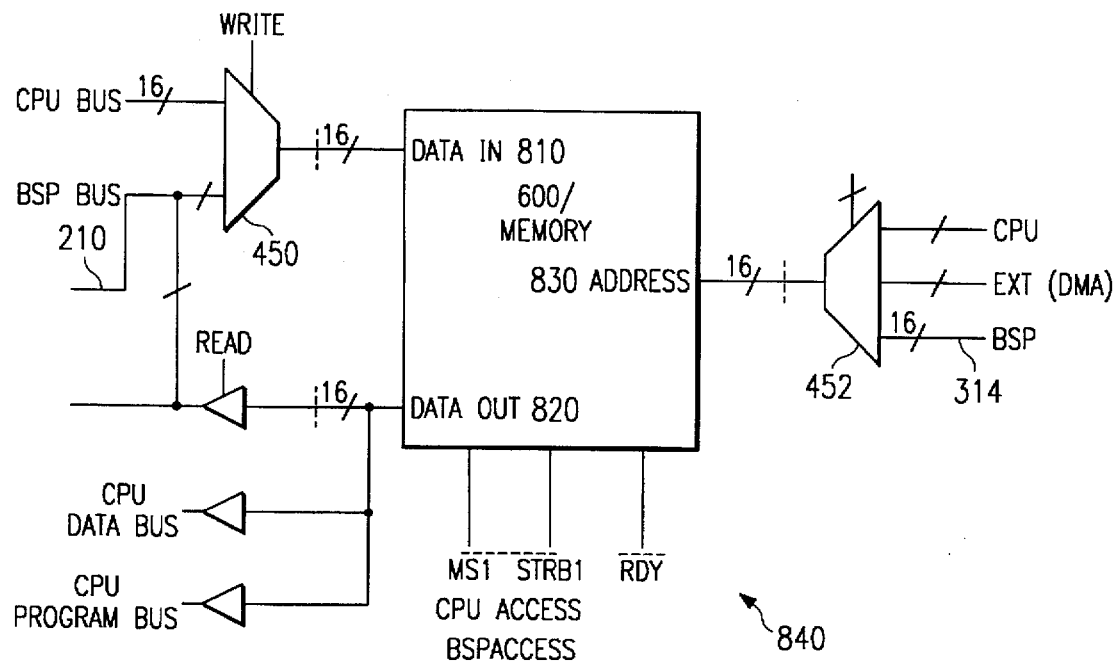
FIG. 6 depicts a schematic block diagram of a portion of the circuitry employed in FIG. 1 for a memory interface.

Referring now to FIG. 6 there may be seen a functional block diagram of a portion of the circuitry of FIG. 1 that is used for the memory interface 400. More particularly, it may be seen in more detail that memory 600 has a data in 810 and a data out 820 port, an address port 830 and a series of control lines 840 associated with its control port.

As may be seen from FIG. 6, the data from the processor 500 (FIG. 1) on its data bus is supplied to an internal data bus, which supplies the data as an input to multiplexer 450. The other input to multiplexer 450 is data from the circuit 100 (FIG. 1) via line 210, as described earlier herein. An appropriate control signal is generated by control logic 212 or memory control logic (not shown) to allow data from processor 500 or data latches to be provided through mux 450 to the input port (DATA IN) of memory 600.

In a similar manner, the address supplied to memory 600 on its address bus is one of three selected by multiplexer 452 again based upon control signals from control logic 212 or memory control logic (not shown). One input address signal is generated by the processor 500 (FIG. 1) and is supplied on its address bus. A second input address signal may be generated by an external device, such as an external direct memory access (DMA) device. A third input address signal is generated by the address generators 312, 310 (FIG. 1) and supplied on line 314.

The data output by memory 600 on its data bus may be supplied to the processor 500, to the data latches 208, or to an external device.

The processor 500 and BSP 100 control access to the memory 600 using the MS1 and STRB1 signals. The processor 500 and BSP 100 access memory 600 using the MS1 and STRB1 signals; effectively, each set of control signals corresponding to MS1 (and STRB1) from the processor and BSP are inputs to a mux (not shown) whose control signals are generated by control logic 212 or memory control logic(not shown). This allows the BSP to access the memory independently of the processor, or its clocks, e.g. when the processor is in a sleep or idle mode.

In addition, an RDY signal is supplied to the processor 500 when it may access the memory 600; that is, if the processor attempts to access the memory during a BSP access, the RDY signal will delay the processor access until the BSP access is completed. Again, the BSP has access priority over the processor and the processor waits for the BSP accesses to be completed.

Figure 7:
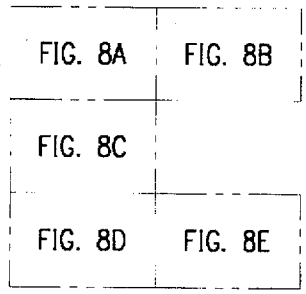
FIG. 7 depicts a block diagram illustrating how

Referring now to FIG. 7, there may be seen a block diagram illustrating how FIGS. 8A–8E are generally arranged to provide the detailed circuitry for the asynchronous transmission portion of the buffered serial port.

Figure 8A:
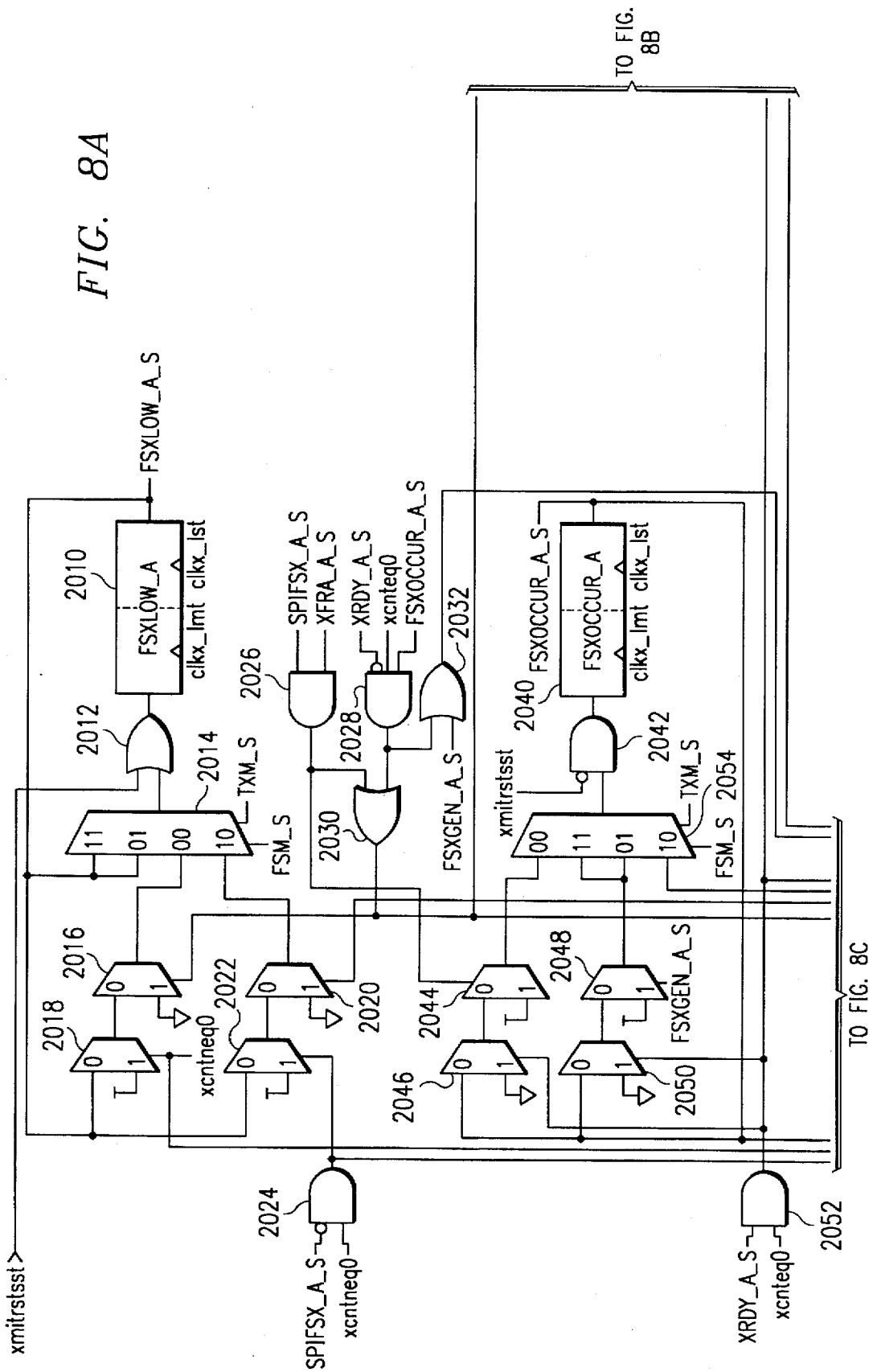
FIGS. 8A–8E are generally arranged to provide the detailed circuitry for the asynchronous transmit portion of the serial port interface portion of the present invention.

Referring now to FIGS. 8A–8E, there may be seen the presently preferred circuitry for the asynchronous transmission portion of the buffered serial port of the present invention. Referring now to FIG. 8A, there may be seen the FSXLOW_A latch 2010 which has as its output signal FSXLOW_A_S. This represents the value stored in the slave portion of this latch. This latch is clocked by the clkx_mt and clkx_$_{lst}$. As may be seen, the input to the FSXLOW latch 2010 is the output of a two input OR-gate 2012. One input to the OR-gate 2012 is the signal xmitrstsst. The other signal to the OR-gate 2012 is the output of a four input multiplexer 2014. The control signals for the mux 2014 are FSM_S and TXM_S. Again, these signals are from the control register portion of the circuit and are a signal (FSM) representing whether transmissions are in a continuous or burst mode and a signal representing whether the frame synchronization pulse is supplied from an external source (TXM is zero) or generated internally (TXM is one). The 11 and 01 inputs to the multiplexer 2014 are the FSXLOW latch 2010 output signal. The input for the 00 position is the output of a two input multiplexer 2016. One input for this multiplexer 2016 is ground (or logic zero) and the other input is the output of another two input mux 2018. The inputs for the second mux 2018 are the FSXLOW latch output signal and VDD. The control signal for the first mux 2016 in this chain of two muxes comes from an OR-gate 2030. One input to the OR-gate 2030 comes from an AND-gate 2026 whose inputs are SPIFSX and XFRA. The other input to the OR-gate 2030 comes from an AND-gate 2028 whose three inputs are XRDY inverted, xcnteq0 and FSXOCCUR. The control signal for the second mux 2018 is xcnteq0. The input for the 10 position is the output of a two input multiplexer 2020. One input for this multiplexer 2020 is ground (or logic zero) and the other input is the output of another two input mux 2022. The inputs for the second mux 2022 are the FSXLOW latch output signal and VDD. The control signal for the first mux 2020 in this chain of two muxes comes from an AND-gate 2162. One input to the AND-gate 2162 is SPIFSX and the other is FSXLOW. The control signal for the second mux 2022 is the output of AND-gate 2024, whose inputs are SPIFSX and xcnteq0.

Again, the FSX signal is the transmit frame synchronization signal and this signal may be generated internally or externally. The FSXLOW latch 2010 goes low while FSX is high and is used to prevent shifting data out while FSX is high for multiple clkx cycles; that is, this latch's signal freezes the output at the first bit until FSX goes low.

Continuing to refer to FIG. 8A, but now referring to the FSXOCCUR_A latch 2040, it may be seen that this latch is also clocked by the same two signals clkx__lmt and clkx__lst. It may also be seen that the FSXOCCUR latch 2040 has as its output the signal FSXOCCUR_A_S. The input to the master portion of the FSXOCCUR latch is the output of an AND-gate 2042. One input to this AND-gate is the xmitrstsst signal inverted. The other input to the AND-gate 2042 is the output of a four input mux 2054. This mux 2054 is again controlled by the same two signals, FSM_S and TXM_S, referred to previously for the previous four input mux 2014. The 00 input for this mux 2054 is the output of a series of chained two input muxes 2044, 2046. More particularly, the 00 input is the output of a first two input mux 2044 whose two inputs are VDD and the output of the second mux 2046. The control signal for the first mux 2044 is the output of an AND-gate 2026, whose inputs are SPIFSX_A_S and XFRA_A_S. The inputs to the second mux are ground and the output from the slave portion of the FSXOCCUR latch 2040. The control signal for the second mux is the output of an AND-gate 2052 whose inputs are XRDY_A_S and xcnteq0. The 11 and 01 inputs are the output of a second chain of two input muxes 2048, 2050. More particularly, the 11 and 01 inputs are the output of a mux 2048 whose inputs are VDD and the output of a second mux 2050. The first mux 2048 is controlled by the FSXGEN_A_S signal. The inputs to the second mux 2050 are ground (or logic zero) and the output of the slave portion of the FSXOCCUR latch 2040. The control signal for the second mux 2050 is also provided from AND-gate 2052. The 10 input is the output of another series of chained muxes 2124, 2122. More particularly, the input for the 10 position is the output of a mux 2124 whose two inputs are VDD and the output of a second mux 2122. The control signal for the first mux 2124 is the output of an AND-gate 2162 whose inputs are SPIFSX_A_S and FSXLOW_A_S. The inputs for the second mux 2122 are the output from the slave portion of the FSXOCCUR latch 2040 and ground. The control signal for the second mux 2122 is the output of an AND-gate 2126 whose inputs are the SPIFSX_A_S signal, inverted, and xcnteq0. The FSXOCCUR latch 2040 is used to store the signal representing that the first frame synchronization signal has occurred.

Figure 8B:
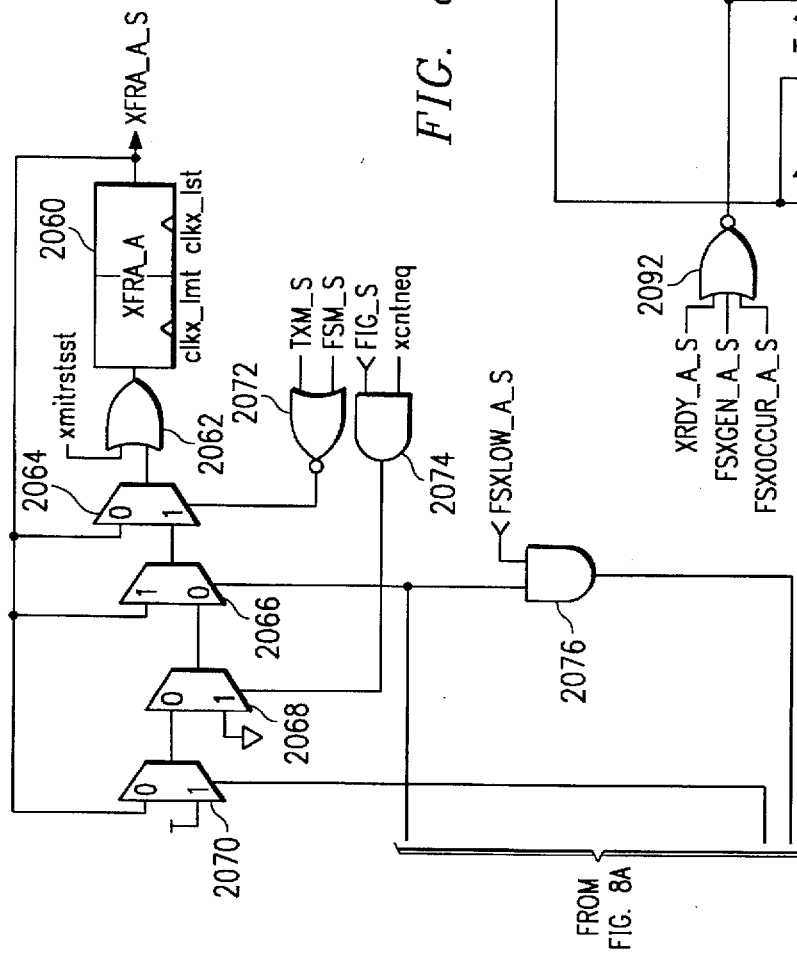
Figure 8B:
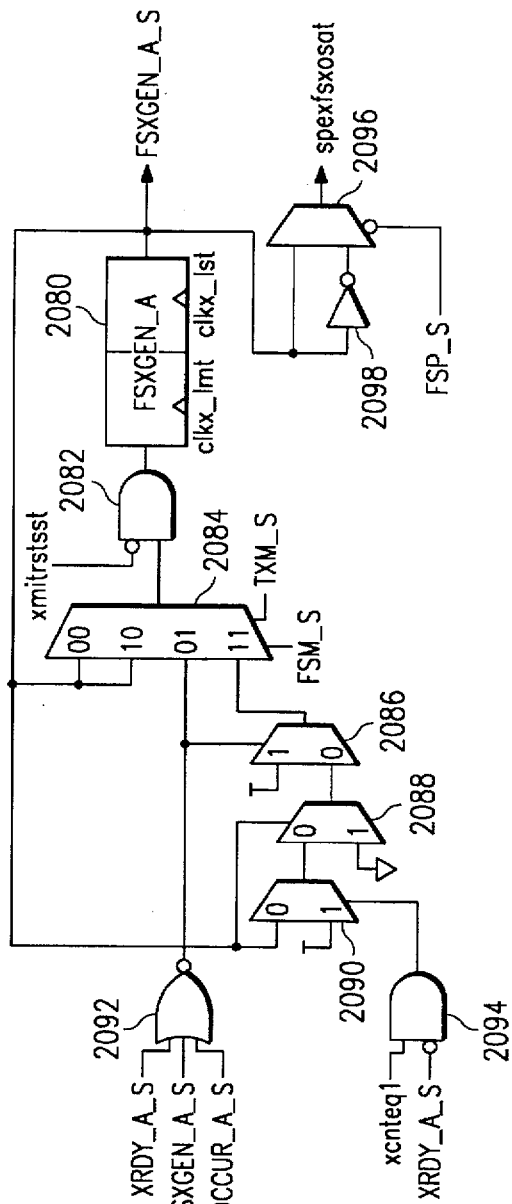

Referring now to FIG. 8B, there may be seen the XFRA_A latch 2060. This latch is also clocked by clkx__lmt and clkx__lst. The input for the XFR latch 2060 is the output of an OR-gate 2062. One input to that OR-gate 2062 is the xmitrstsst signal. The other input to the OR-gate is the output of a two input mux 2064. One input for this mux 2064 is the output from the slave portion of the XFRA latch 2060. The other input is the output of a second two input mux 2066. One input for the second mux 2066 is the output from the slave portion of the XFRA latch 2060 and the other input is the output of a third mux 2068. The two inputs for the third mux 2068 are the output of a fourth mux 2070 and ground. The inputs for the fourth mux 2070 are the output from the slave portion of the XFRA latch 2060 and VDD (a logic one). The control signal for the first mux 2064 is a NOR-gate 2072 whose inputs are TXM_S and FSM_S. The control signal for the second mux 2066 is the output of an OR-gate 2030 whose inputs have been previously described. The control signal for the third mux 2068 is the output of an AND-gate 2074 whose two inputs are FIG_S and xcnteq0. The control signal for the fourth mux 2070 is the output of the AND-gate 2052, whose inputs are XRDY_A_S and xcnteq0. The output from the slave portion of the XFRA latch 2060 is the XFRA_A_S signal. This latch 2060 stores a signal which is representative of the transmit frame acknowledge signal.

The other latch depicted in FIG. 8B is the FSXGEN_A latch 2080. This latch internally generates the FSX signal. This latch is also clocked by clkx__lmt and clkx__lst. The input to this latch is the output of an AND-gate 2082 whose two inputs are the inverted xmitrstsst signal and the output of a four input mux 2084. The control signals for the four input mux are TXM_S and FSM_S. The inputs for the 00 and 10 inputs are the output of the slave portion of the FSXGEN latch 2080. The input for the 01 input of the mux is the output of a NOR-gate 2092 whose inputs are XRDY_A_S, FSXGEN_A_S and FSXOCCUR_A_S. The 11 input is the output of a series of two input muxes 2086, 2088, 2090. The 11 input is the output of a first mux 2086 whose inputs are VDD and the output of a second mux 2088. The control signal for the first mux 2086 is the output of the NOR-gate 2092 described previously. The two inputs for the second mux 2088 are the output of the third mux 2090 and ground. The control signal for the second mux 2088 is the output of the slave portion of the FSXGEN latch 2080. The inputs for the third mux 2090 are the output of the slave portion of the FSXGEN latch 2080 and VDD. The control signal for this mux 2090 is the output of an AND-gate 2094 whose inputs are xcnteq1 and XRDY_A_S, inverted.

Figure 8C:
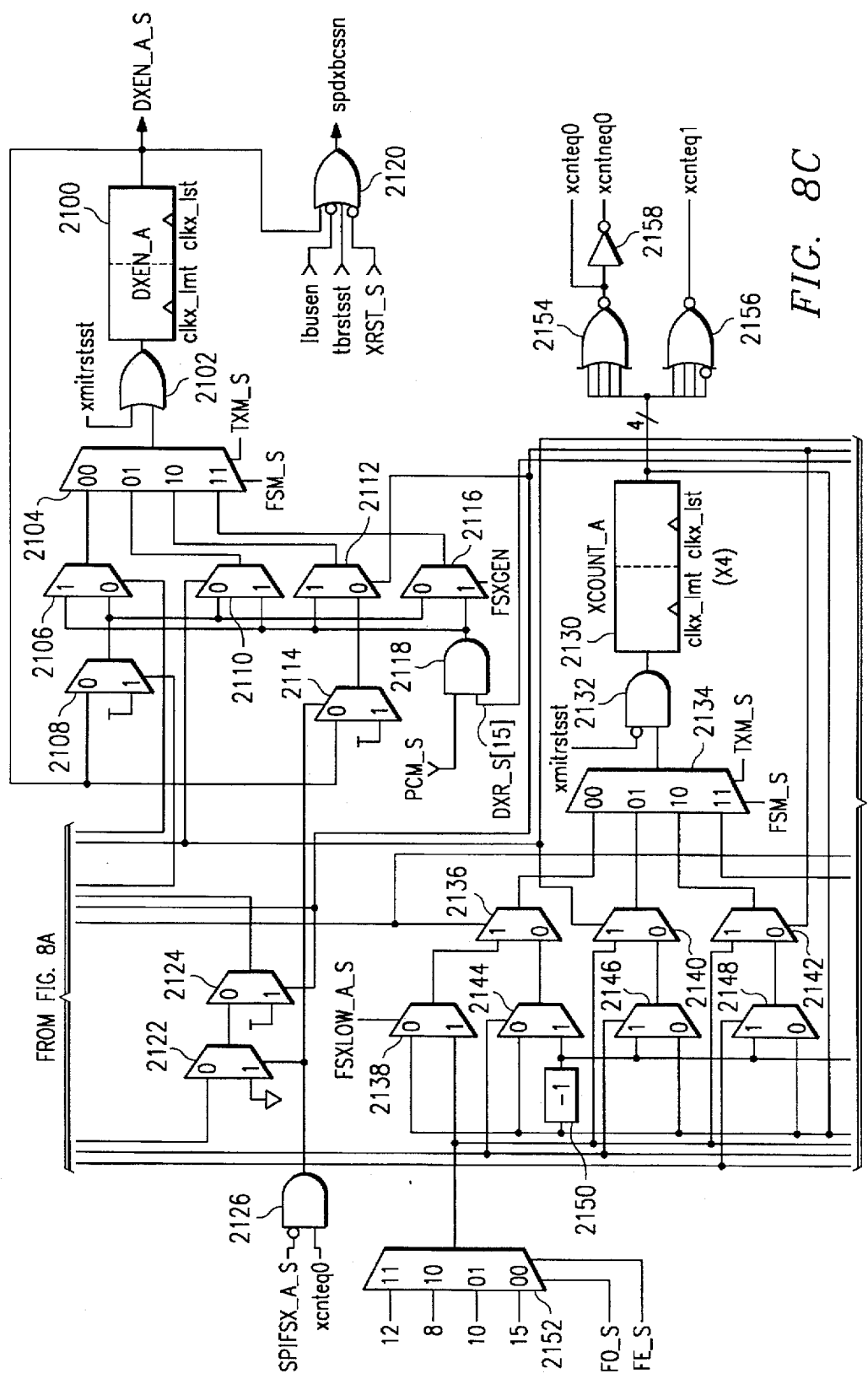

Referring now to FIG. 8C, there may be seen the DXEN_A latch 2100. This latch is also clocked by the clkx__lmt and clkx__lst signals. The input to this latch is the output of an OR-gate 2102 whose inputs are xmitrstsst and the output of a four input mux 2104. The control signals for the four input mux 2104 are FSM_S and TXM_S. The 00 input for this mux 2104 is the output of a first two input mux 2106. The two inputs for the first mux 2104 are the output of an AND-gate 2118 whose inputs are PCM_S and DXR_S[15]. The other input is the output of a second mux 2108, whose two inputs are VDD and the output from the slave portion of the DXEN latch 2100. The control signal for the first mux 2106 is the output of an AND-gate 2076, whose input is FSXLOW and the output of OR-gate 2030. The control signal for the second mux 2108 is the output of the AND-gate 2052 whose inputs are XRDY and xcnteq0. The 01 input for the four input mux is the output of a two input mux 2110. One input for this mux 2110 is the output of the second mux 2108 described previously. The control signal for this mux 2110 is the output of an OR-gate 2032 whose inputs are FSXGEN_A_S and the output of an AND-gate 2028 whose inputs have been previously described. The other input for this mux 2110 is the output of the AND-gate 2118, whose inputs are PCM and DXR[15]. The 10 input is the output of a mux 2112 whose inputs are the output of the AND-gate 2118 and the output of a second mux 2114. The control signal for this first mux 2112 is the output of an AND-gate 2162 whose inputs are SPIFSX_A_S and FSXLOW_A_S. The inputs to the second mux 2114 are the output from the slave portion of the DXEN latch 2100 and VDD. The control signal for the second mux 2114 is the output of an AND-gate 2126 whose inputs are SPIFSX_A_S, inverted, and xcntneq0. The 11 input is the output of a two input mux 2116 whose inputs are the output of a second mux 2108 previously described and the output of the AND-gate 2118. The control signal for this mux 2116 is FSXGEN. The DXEN latch 2100 stores the DX enable signal. The output from the DXEN latch is provided as the DXEN_A_S signal and as an input to OR-gate 2120 whose output is the spdxbcssn signal. The other inputs for OR-gate 2120 are lbusen, tbrstsst, and XRST_S.

Referring now to the XCOUNT_A latch 2130, it may be seen that it is in fact four latches and each of them are clocked by the clkx_lmt and clkx_lst signals. The input for the XCOUNT latch 2130 is the output of an AND-gate 2132 whose two inputs are xmitrstsst, inverted, and the output of a four input mux 2134. The control signals for the four input mux are FSM_S and TXM_S. The 00 input is the output of a two input mux 2136 whose two inputs are the outputs of two other two input muxes 2138, 2144. The control signal for the first mux 2136 is the output of an OR-gate 2030 whose inputs have been previously described. The second mux 2138 has as its inputs the spinbit signal from mux 2152 and the output from the slave portion of the XCOUNT latch 2130. The control signal for this second mux 2138 is the FSXLOW_A_S signal. The third mux 2144 has two inputs, one of which is the output from the slave portion of the XCOUNT latch 2130 and the other is the output from the slave portion of the XCOUNT latch 2130 decremented by one by decrementer 2150. The control signal for the third mux 2144 is xcntneq0. The input for the 01 position is the output of a mux 2140 whose two inputs are the spinbit signal and the output of a second mux 2146. The control signal for this first mux 2140 is the output of an OR-gate 2032 whose inputs have been previously described. The inputs for the second mux 2146 are the decremented signal from the slave portion of the XCOUNT latch by decrementer 2150 and the output from the slave portion of the XCOUNT latch 2130. The control signal for the second mux 2146 is xcnmeq0. The input for the 10 position is the output of a two input mux 2142. One input for this first mux 2142 is the spinbit signal and the other input is the output of a second mux 2148. The inputs for the second mux 2148 are the decremented by one output of the slave portion of the XCOUNT register and the output of the slave portion of the XCOUNT register. The control signal for the first mux 2142 is the output of an AND-gate 2162. The control signal for the second mux 2148 is the output of an AND-gate 2024. The input for the 11 position is the output of a two input mux 2158 whose control signal is FSXGEN_A_S. The two inputs to this first mux 2158 are the spinbit signal and the output from a second mux 2160. The inputs for this second mux 2160 are the decrement by one of the slave portion of the XCOUNT latch and the output of the slave portion of the XCOUNT latch. The control signal for the second mux 2160 is the xcntneq0 signal. The four XCOUNT latches store signals representative of the number of bits to be transmitted and are decremented until the number of bits corresponding to their count are shifted out. The output from the slave portion of each of the four latches is combined in two NOR-gates 2154, 2156. In one NOR-gate 2154, all the signals are logically combined and the output of the NOR-gate is xcnteq0. After this signal has been inverted by an inverter 2158, it is xcntneq0. The other NOR-gate 2156 takes the output from three of the latches in a normal signal version, while the output from the fourth latch is inverted. The output from the NOR-gate 2156 with the one inverted input is xcnteq1.

Figure 8D:
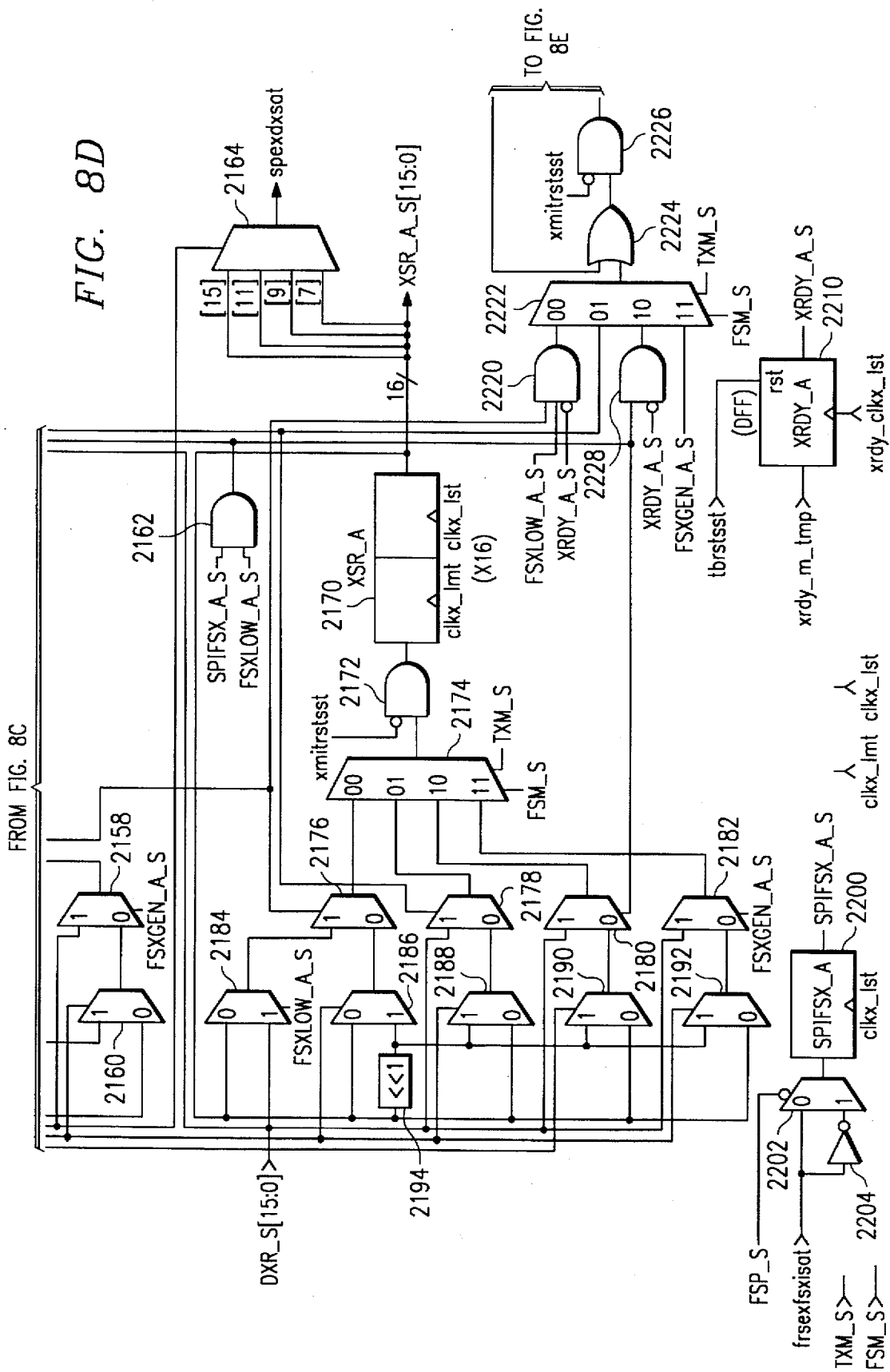

Referring now to FIG. 8D, there may be seen the XSR latches 2170; there are 16 of these latches, as indicated by the "X16" in parenthesis below the depicted latch. These latches are also clocked by the clkx_lmt and clkx_lst signals. The input for each of the latches is the output of an AND-gate 2172 whose inputs are the inverted xmitrstsst signal and the output of a four input mux 2174. The mux control signals are FSM_S and TXM_S. The 00 input is the output of a two input mux 2176, whose inputs are the outputs of other muxes 2184, 2186. The first mux 2176 is controlled by a control signal from an OR-gate 2030 whose inputs have been previously described. The second mux 2184 has, as an input, the output from the slave portion of the XSR latch 2170 and the output of the DXR latches 2410 (depicted in FIG. 9B). The control signal for this second mux 2184 is the FSXLOW signal. The third mux 2186 has, as its inputs, the output of the slave portion of the XSR latch and the output of the slave portion of the XSR latch shifted left one bit position by shifter 2194. The control signal for this third mux 2186 is the xcntneq0 signal. The input for the 01 position is the output of a two input mux 2178. The control signal for this first mux 2178 is the output of an OR-gate 2032, whose inputs have been previously described. The inputs to this first mux 2178 are the outputs of the DXR latches 2410, or register, and the output of a second mux 2188. The inputs for the second mux 2188 are the output from the slave portion of the XSR latch and the output of the XSR latch shifted left by one bit position. The control signal for the second mux 2188 is the xcntneq0 signal. The 10 input is the output of a two input mux 2180 whose control signal is the output of an AND-gate 2162. The inputs to this first mux 2180 are the output of the DXR register 2410 and the output of a second mux 2190. The inputs for the second mux 2190 are the output of the slave portion of the XSR latch or the output of the slave portion of the XSR latch shifted to the left by one bit position. The control signal for this second mux 2190 is the output of an AND-gate 2024. The 11 input position is the output of a two input mux 2182 whose control signal is FSXGEN_A_S. One input to this first mux 2182 is the output of the DXR latches and the other input is the output of a second mux 2192. The inputs for the second mux 2192 are the output of the slave portion of the XSR latch or the output of the slave portion of the XSR latch shifted left by one bit position. The control signal for the second mux 2192 is the xcntneq0 signal. The XSR latches are the data transmit shift register and their outputs are the XSR_A_S signals. The signals from the 15th, 11th, 9th and 7th of these XSR latches are supplied as individual inputs to a four input mux 2164. The control signal for this mux is the spinbit signal from mux 2152. The output of the mux 2164 is the spedxsat signal, which goes to the DX driver that drives the dx pin.

Figure 8E:
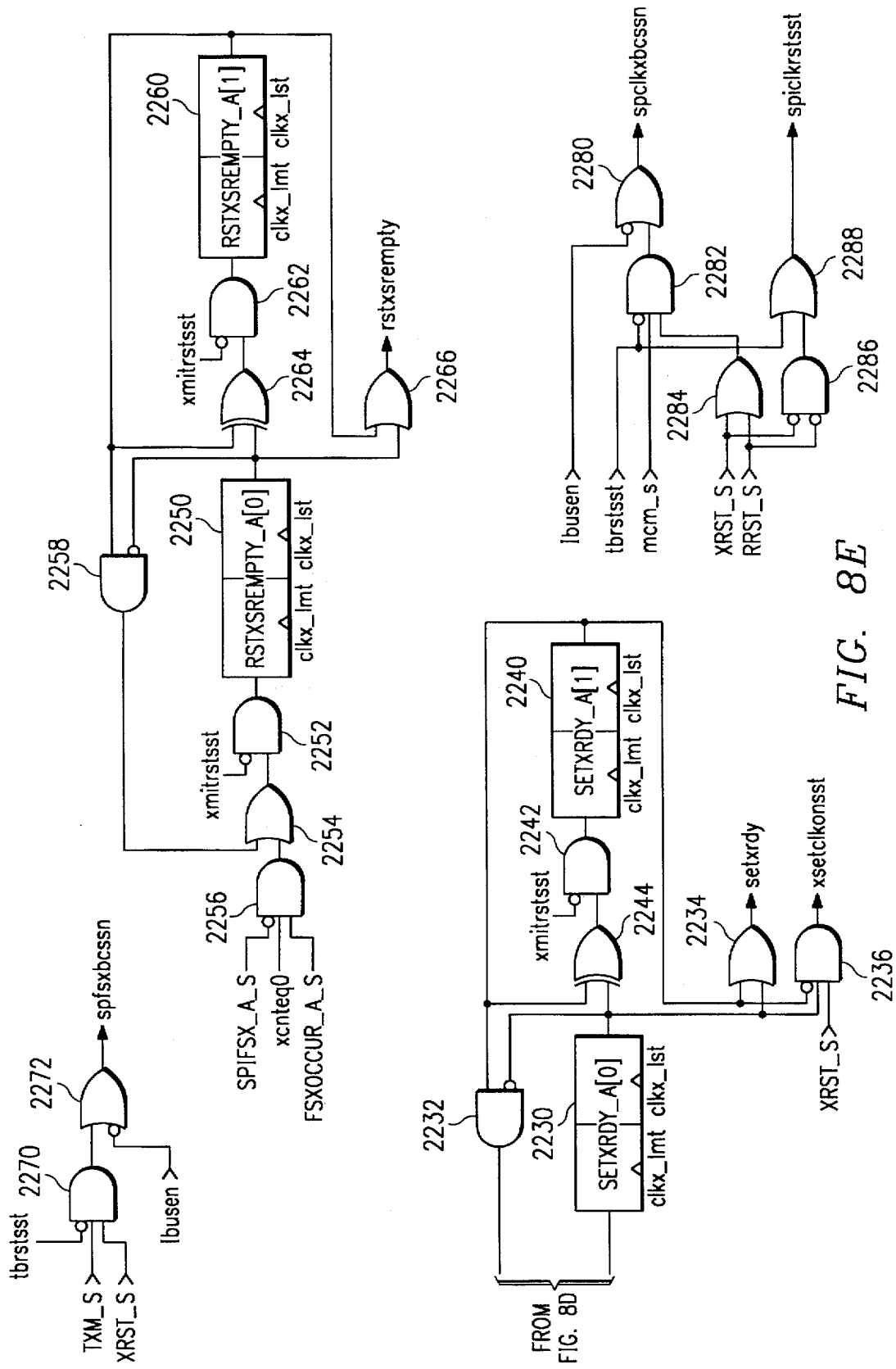

Referring now to FIG. 8E, there may be seen the SETXRDY_A[0] (hereinafter "SETXRDY0") latch 2230 and the SETXRDY_A[1] (hereinafter "SETXRDY1") latch 2240. The input for the SETXRDY0 latch 2230 is the output of AND-gate 2226, depicted on FIG. 8D. The AND-gate 2226 has as its two inputs the inverted xmitrstsst signal and the output of an OR-gate 2224. One of the inputs for the OR-gate 2224 is the output of a four input multiplexer 2222. The control signals for the four input multiplexer 2222 are FSM_S and TXM_S. The 00 input is the output of a three input AND-gate 2220 whose inputs are the output of an OR-gate 2030, whose inputs have been previously described, the FSXLOW_A_S signal and the inverted XRDY_A_S signal. The 01 input is the output of an OR-gate 2032 whose inputs have been previously described. The 10 input is the output of an AND-gate 2228 whose input is the output of an AND-gate 2162 and the other input is XRDY_A_S, inverted. The 11 input is the FSXGEN_A_S signal. The other input to the OR-gate 2224 is the output of an AND-gate 2232, depicted on FIG. 8E.

Continuing to refer to FIG. 8E, it may be seen that the SETXRDY0 latch has an output that is supplied as one input to an exclusive OR-gate 2244. It is also supplied as one input to an OR-gate 2234 and AND-gate 2232. The output from the exclusive OR-gate 2224 is supplied as one input to an AND-gate 2242 whose other input is the inverted xmitrstsst signal. The output from the AND-gate 2242 is the input to the SETXRDY1 latch 2240. The output from the SETXRDY1 latch 2240 is supplied as one input to the AND-gate 2232 and as one input to the OR-gate 2234 whose output is setxrdy, and is inverted and supplied to an AND-gate 2236 whose output is the xsetclkonsst signal. The other inputs for the AND-gate 2236 are XRST_S and the output of the SETXRDY0 latch 2230.

The RSTXSREMPTY_A[0] (hereinafter "RSTXSREMPTY0") latch 2250 and the RSTXSREMPTY_A[1] (hereinafter "RSTXSREMPTY1") latch 2260 are also depicted in FIG. 8E as being supplied or clocked by clock signals clkx_lmt and clkx_lst. The input for the RSTXSREMPTY0 latch 2250 is the output of an AND-gate 2252 whose inputs are the inverted version of xmitrstsst and the output of an OR-gate 2254. The inputs to the OR-gate 2254 are the outputs of two AND-gates 2256, 2258. One AND-gate 2256 has as its input signals SPIFSX_A_S, inverted, xcnteq0 and FSXOCCUR_A_S. The other AND-gate 2258 has as its inputs the output of the RSTXSREMTPY1 latch 2260 and the inverted output of the RSTXSREMPTY0 latch 2250. The output from the RSTXSREMPTY0 latch 2250 is also provided as one input to an exclusive OR-gate 2264. The output of the exclusive OR-gate 2264 is one input to an AND-gate 2262. The other input to the AND-gate 2262 is the inverted version of the xmitrstsst signal. The output from the AND-gate 2262 is the input to the RSTXSREMPTY1 latch 2260. The other input for the exclusive OR-gate 2264 is the output of the RSTXSREMPTY1 latch 2260. The latch 2260 output signal is also supplied to an OR-gate 2266 whose output is the rstxsrempty signal. The other input for this OR-gate 2266 is the output of the RSTXSREMPTY0 latch 2250.

Referring again to FIG. 8D, there may be seen the XRDY_A latch 2210 and the SPIFSX_A latch 2200. Both of these latches are unique. The XRDY latch 22 10 synchronizes the xrdy bit back to the external transmit clock for use in the asynchronous transmit logic and has as its input xrdy_m_tmp and as an output XRDY_A_S. This latch is a D flip flop and may be reset to zero by the tbrstsst signal. The SPIFSX latch 2200 is used to latch FSX on the falling edge of the external transmit clock signal and is clocked by the clkx_lst signal and has as it input the spifsx signal and as it output SPIFSX_A_S. The clock signal for the XRDY latch is the xrdy_clkx_lst clock signal.

Referring to FIG. 8E, there may be seen the OR-gate 2272 whose output is the spfsxbcssn signal. This signal enables the fsx driver whose input is the spexfsxosat signal from mux 2096 (FIG. 8B) and drives the frame out on line 252. The inputs to OR-gate 2272 are the lbusen signal and the output of AND-gate 2270. The inputs for AND-gate 2270 are tbrstsst, TXM_S, and XRST_S. There may also be seen OR-gate 2280 whose output is the spclkxbcssn signal; this signal is used to enable the clkx driver, which sends the clkx clock signals off chip depending upon whether the clock signals are generated internally or received from an external source. The inputs for OR-gate 2280 are the lbusen signal and the output of AND-gate 2282. The input for AND-gate 2282 are the tbrstsst signal, inverted, the MCM_S signal, and the output of OR-gate 2284. The inputs for OR-gate 2284 are XRST_S and RRST_S. These same two signals are inverted and provided as inputs to AND-gate 2286. The output on AND-gate 2286 is one input to OR-gate 2288 whose output signal is the spiclkrstsst signal. The other input for OR-gate 2288 is the tbrstsst signal.

Figure 9B:
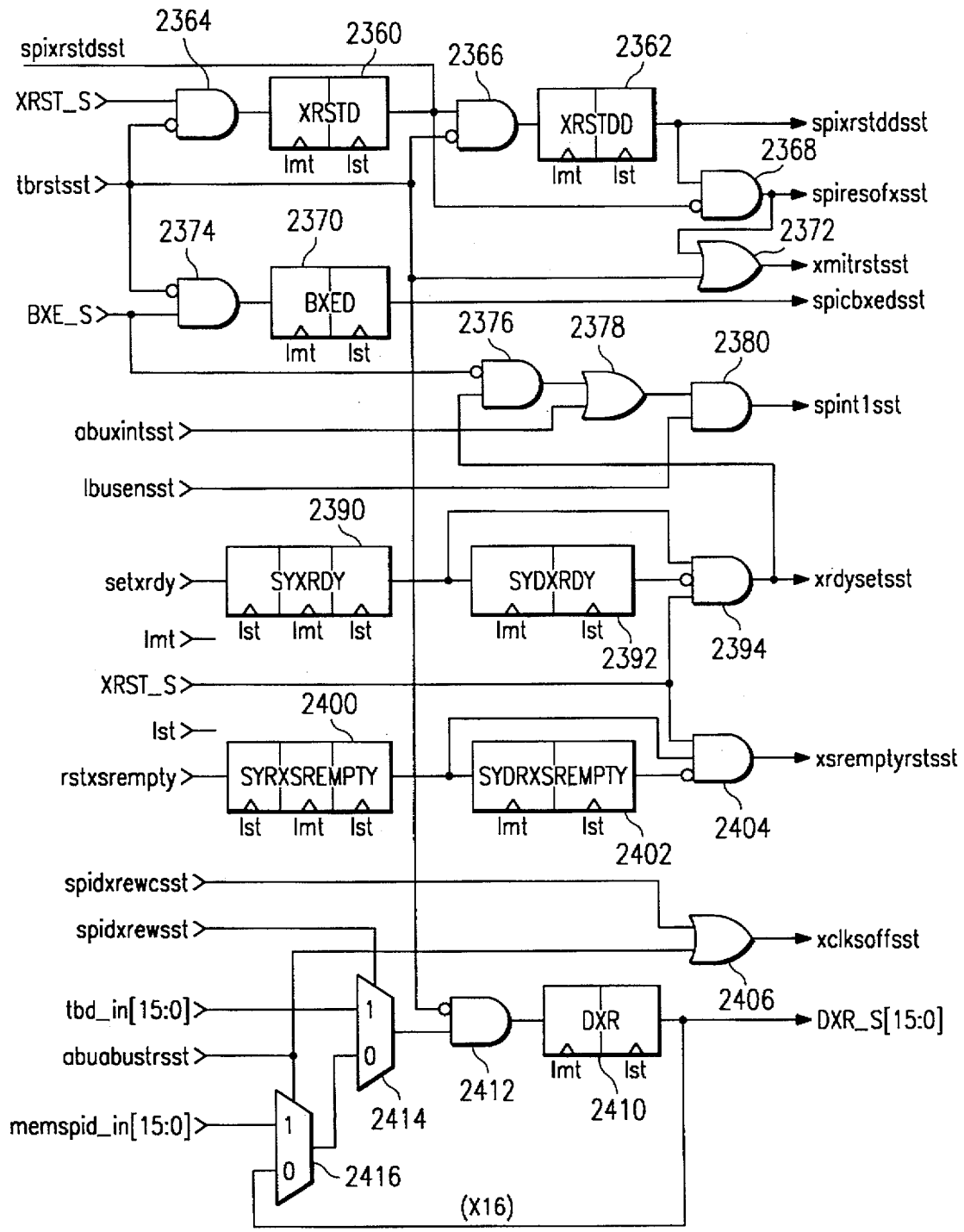

Referring now to FIGS. 9A and 9B, there may be seen the portion of the control logic that corresponds to the synchronous transmit portion. More particularly, in FIG. 9B there may be seen the XRSTD latch 2360, which is clocked by the lmt and lst clock signals. The input to this latch is the output of an AND-gate 2364 whose two inputs are XRST_S and the inverted tbrstsst signal. The output from the XRSTD latch 2360 is provided as the spixrstd signal and as the input to a two input AND-gate 2366. The other input to this AND-gate 2366 is the inverted version of tbrstsst. The output of the AND-gate 2366 is the input to the XRSTDD latch 2362 which is also clocked by lmt and lst. The output of the XRSTDD latch 2362 is the spixrstdd signal and is supplied as one input to an AND-gate 2368. The other input to the AND-gate 2368 is the inverted output of the XRSTD latch 2366. The output of this AND-gate 2368 is spiresofx, which is the software transmit reset signal. The output from this AND-gate is also supplied as one input to an OR-gate 2372. The other input for this OR-gate 2372 is the tbrstsst signal. The output from the OR-gate 2372 is the xmitrstsst signal. The XRSTD and XRSTDD latches are used in combination to create a signal used to reset other latches and are generally used to detect the falling edge of a reset signal.

The BXED latch 2370 is used to detect the falling edge of the BXE signal to reset ABU latches and is also clocked by the lmt and lst clocks. It has as its input the output of an AND-gate 2374 whose two inputs are the inverted tbrstsst signal and the BXE_S signal. The output of the BXED latch 2370 is the spicbxed signal. The BXE_S signal is also supplied in an inverted form to an AND-gate 2376. The output of the AND-gate 2376 is one input for an OR-gate 2378 whose output is one input to an AND-gate 2380 whose output is the spint1sst signal, which is the transmit interrupt signal. The other input for the OR-gate 2378 is the abuxint signal. The other signal for the AND-gate 2380 is the lbusen signal.

The SYXRDY synchronizer 2390 is used to synchronize the xrdy signal to the processor clocks so the XRDY bit may be reset and has as its input the setxrdy signal and is clocked by the lst and lmt signals. The output from the SYXRDY latch 2390 is then provided as an input to the SYDRXDY latch 2392, which is also clocked by lmt and lst. The output of the SYDXRDY latch 2392 is inverted and supplied as one input to an AND-gate 2394 whose output is xrdyset. The other inputs for the AND-gate 2394 are the output of the SYXRDY synchronizer 2390 and XRST_S. The SYRXS-REMPTY synchronizer 2400 is used to synchronize the rstxsrempty signal to the processor clocks so the XSREMPTY bit may be reset and has as its input rstxs-rempty signal and is clocked by the lst and lmt clock signals. The output from this latch 2400 is provided as the input to the SYDRXSREMTY latch 2402, which is also clocked by the lmt and lst clock signals. The output of the SYDRXS-REMTY latch 2402 is inverted and provided as one input to an AND-gate 2404 whose output is the xsremptyrstsst signal. The other inputs for the AND-gate 2404 are the output from the SYRXSREMTY latch 2400 and XRST_S.

The inputs to the sixteen DXR latches 2410, which are clocked by lmt and lst, are the output of an AND-gate 2412. The inputs to this AND-gate 2412 are the inverted tbrstsst signal and the output of a two input mux 2414. The control signal for the mux 2414 is spidxrewsst. The inputs for the mux 2414 are the tbd_in[15:0] signals and the other input is the output of a second mux 2416. The input for the second mux 2416 is the memspid_in[15:0] signals and the output from the DXR latches 2410; there are 16 DXR latches. The memspid_in bus is the bus for transferring data from memory to the serial port portion of the circuit 100. The control signal for the second mux 2416 is the abuabustrsst signal, which is the abu memory access strobe signal. The output from the DXR latches are the DXR_S[15:0] signals.

Referring now to FIG. 9A, there may be seen the CLKCNT latches 2300 used for generating an internal cllex signal at different frequencies. More particularly, there are five of these clock count latches that are clocked by the lmt and lst clock signals. The input for each one of these latches is the output of an AND-gate 2302. One input for this AND-gate 2302 is the inverted signal from an OR-gate 2304. The other input is the output of a mux 2322. The OR-gate 2304 has as its input signals the tbrstsst signal, the MCM_S (inverted) signal, and the output of an AND-gate 2314 whose inputs are RRST_S, inverted, and spiresofxsst. The remaining input for the OR-gate 2304 is the output of an AND-gate 2316 whose two inputs are the spiresofrsst signal and the inverted version of XRST_S. The inputs for the first mux 2322 are the output of a second mux 2324 and the output of the CLKCNT latch 2300. The inputs to the second mux 2324 are ground and the output of the CLKCNT latch 2300 incremented by one by incrementer 2326. The control signal for the first mux 2322 is the output of the AND-gate 2308 and the control signal for the second mux 2324 is the output of a comparator 2328, which compares the output of the CLKCNT latches 2300 with the CLKDV_S[4:0] signals.

The SPINTCLKX latch 2330 is a signal smoothing latch for internal clkx signals and is clocked by the lst signal. The output of this latch is supplied as one input to a mux 2350 and the other input is VDD. The output of this mux 2350 is the input to a second mux 2352 whose output is the spintclkx signal. The other input for this second mux 2352 is the lst clock signal. The second mux 2352 is controlled by a control signal which is the output of an AND-gate 2310. The inputs for the AND-gate 2310 are the NOR'd 2320 signals from the CLKDV_S[4:0] and the output of an AND-gate 2306. The inputs for the AND-gate 2306 are the MCM_S signal and the output of an OR-gate 2318 whose inputs are the XRST_S signal and the RRST_S signal. The first mux 2350 is controlled by the output of an AND-gate 2308 which has two inputs. The first input is the inverted (by inverter 2312) version of the NOR-gate 2320 that NORs the CLKDV_S signals and the second signal is the output of the AND-gate 2306 previously described.

The input to the SPINTCLKX latch 2330 is the output of a mux 2332. The mux 2332 has two inputs, both of which are the output of a second 2336 and third 2338 two input mux. The control signal for the first mux 2332 is the inverted zeroth bit CLKDV_M signal. The first input is the output of a second mux 2336 whose two inputs are VDD and ground. The control signal for the second mux 2336 is the result of the comparison by comparator 2340 that the CLKCNT master latch signals are greater than or equal to the CLKDV_M signals shifted to the right one bit position by shifter 2342. The inputs for the thrid mux 2338 are VDD and ground also. The control signal for the third mux 2338 is the result of the comparison by comparator 2348 that the CLKCNT master latch 2300 signals are greater than or equal to the CLKDV_M master signals incremented one by incrementer 2344 and shifted right one bit position by shifter 2346.

Referring now to FIGS. 10A–10F, there may be seen the clock circuitry that is employed to generate clock signals for the circuits of the present invention; these Figures use abbreviated signal names, e.g. for example, the "sst", or "lmt" portions of the signal names normally found at the end of a name have been omitted. More particularly, referring to FIG. 10A, there may be seen the MSENB latch 4010, which is enabled during testing to select its module (the BSP circuit 100) for scanning, and the MBENB latch 4012, which is used during testing to disable the buses. Both the MSENB latch and the MBENB latches have as their input scin, which is the scan in data path. The MSENB 4010 is clocked by the cltt clock. The master portion of the MBENB latch 4012 is also clocked by the cltt clock and by the output of an AND-gate 4018. The slave portion of the MBENB latch 4012 is clocked by the gtst clock signal. The output of the MSENB latch 4010 is provided as an input to AND-gate 4018. The other input to AND-gate 4018 is the dltt signal. The output of the MSENB latch 4010 is also provided to an inverter 4022 after which the inverted signal is provided to AND-gate 4020 and AND-gate 4024. The down arrow at the end of the line of the output of the MSENB latch 4010 indicates that this signal is used in other portions of the circuitry as well.

The output of the MBENB latch 4012 is provided as input to AND-gate 4014. The other input for AND-gate 4014 is the busen signal. The output of AND-gate 4014 is one input to OR-gate 4016. The output of the OR-gate 4016 is the lbusen signal. The other input to OR-gate 4016 is the buson signal. The dltt signal is provided as an input to AND-gate 4018 and also as an input to AND-gate 4020. The output of AND-gate 4020 is the ltt signal. The sftj signal, in addition to being used in other portions of the circuitry, is provided as one input to OR-gate 4026 whose output is provided as the other input to AND-gate 4024. The output of AND-gate 4024 is the test signal and the down arrow indicates that it is used in other portions of the circuitry as well.

The fclken signal is provided to inverter 4030 and then provided as an input to AND-gate 4034 whose output is a control signal for muxes 4050 and 4060, discussed later herein. The inverted output of fclken is also provided as an output to other portions of the circuitry as indicated at the bottom portion of the FIG. 10A. OR-gate 4032 has a plurality of inputs. One input is the tbrst signal, the second input is the spimsel signal, the third input is the xrst signal, the fourth input is the output of AND-gate 4038, the fifth signal is the rrst signal and the final input is the output of AND-gate 4042. The two inputs for AND-gate 4038 are the inverted output, via inverter 4036, of xrst and xrstdd. The two inputs for the AND-gate 4042 are the inverted, via inverter 4040, signal rrst and rrstdd. As noted previously, the output of OR-gate 4032 is provided as one input to AND-gate 4034.

The input of mux 4050 is the processor clock mt, which is the master clock. The output of the mux 4050 is the spi local master clock signal, spilmt. As noted previously, the output of AND-gate 4034 is the control signal for mux 4050 and 4060. The input for mux 4060 is the processor slave clock st and the output of mux 4060 is the spilst signal. The spilst is the spi local slave clock. The other input for mux 4050 is the output of mux 4052. The two inputs for mux 4052 are both ground for logic zero. The control signal for mux 4052 is the inverted output (by inverter 4044) of control signal busen. In addition, this inverted signal serves as the control signal for mux 4062. The other input for mux 4060 is the output of mux 4062. The inputs for the mux 4062 are the gsts signal and vdd. In this manner, the spilmt and spilst clocks may be the master and slave processor clock signals under normal functional conditions and during selected test conditions, they may alternately be ground or turned on or in certain test conditions clocked by the signal gtst. The spilmt and spilst clock signals are normally used in the synchronous portions of the serial port portion of the circuit 100.

Figure 10A:
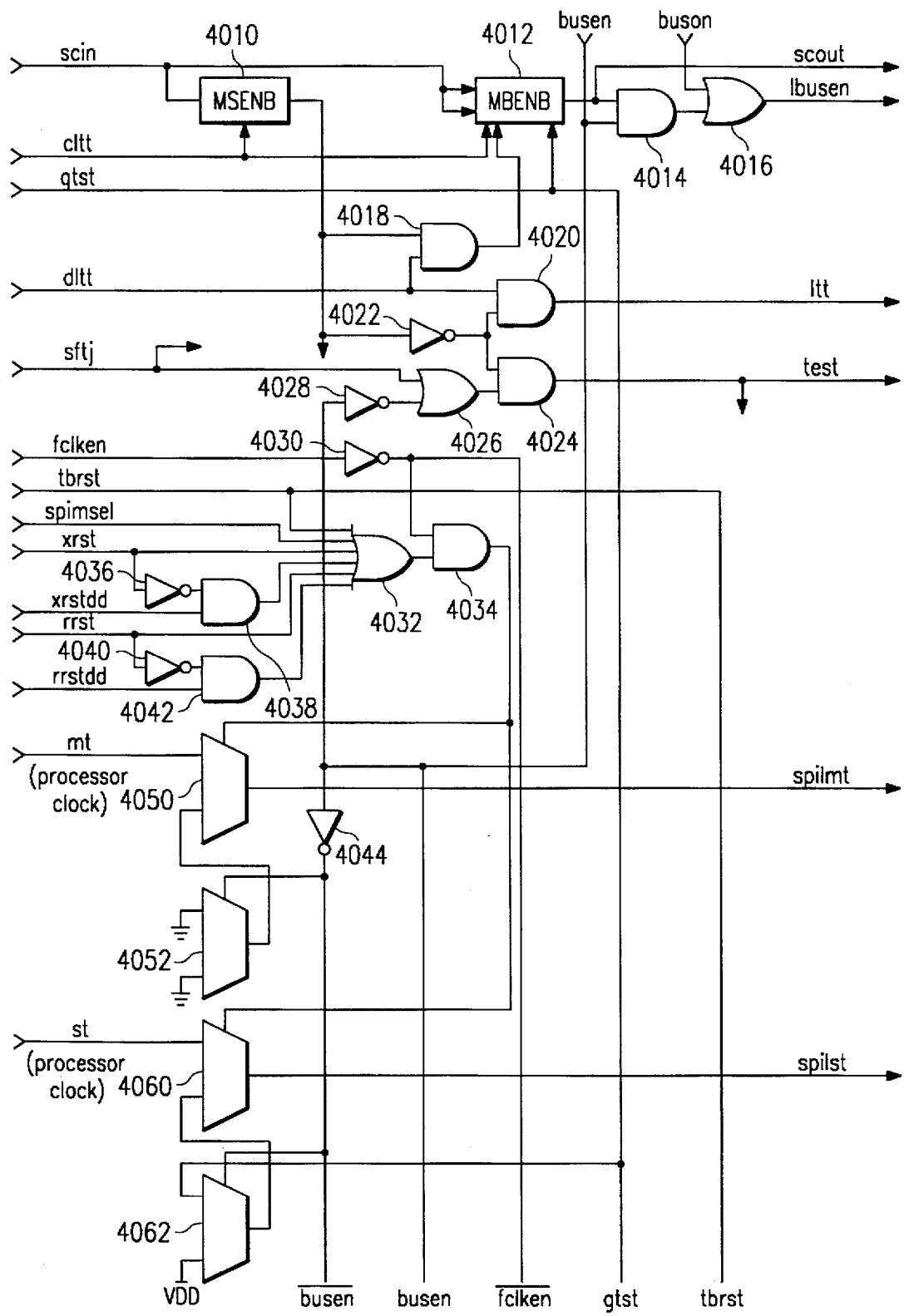
FIGS. 10A–10F depict the detailed circuitry for the clocks portion of the serial port interface of the present invention.

As noted from the bottom portion of FIG. 10A, several signals are passed to other portions of the clock circuitry.

Figure 10B:
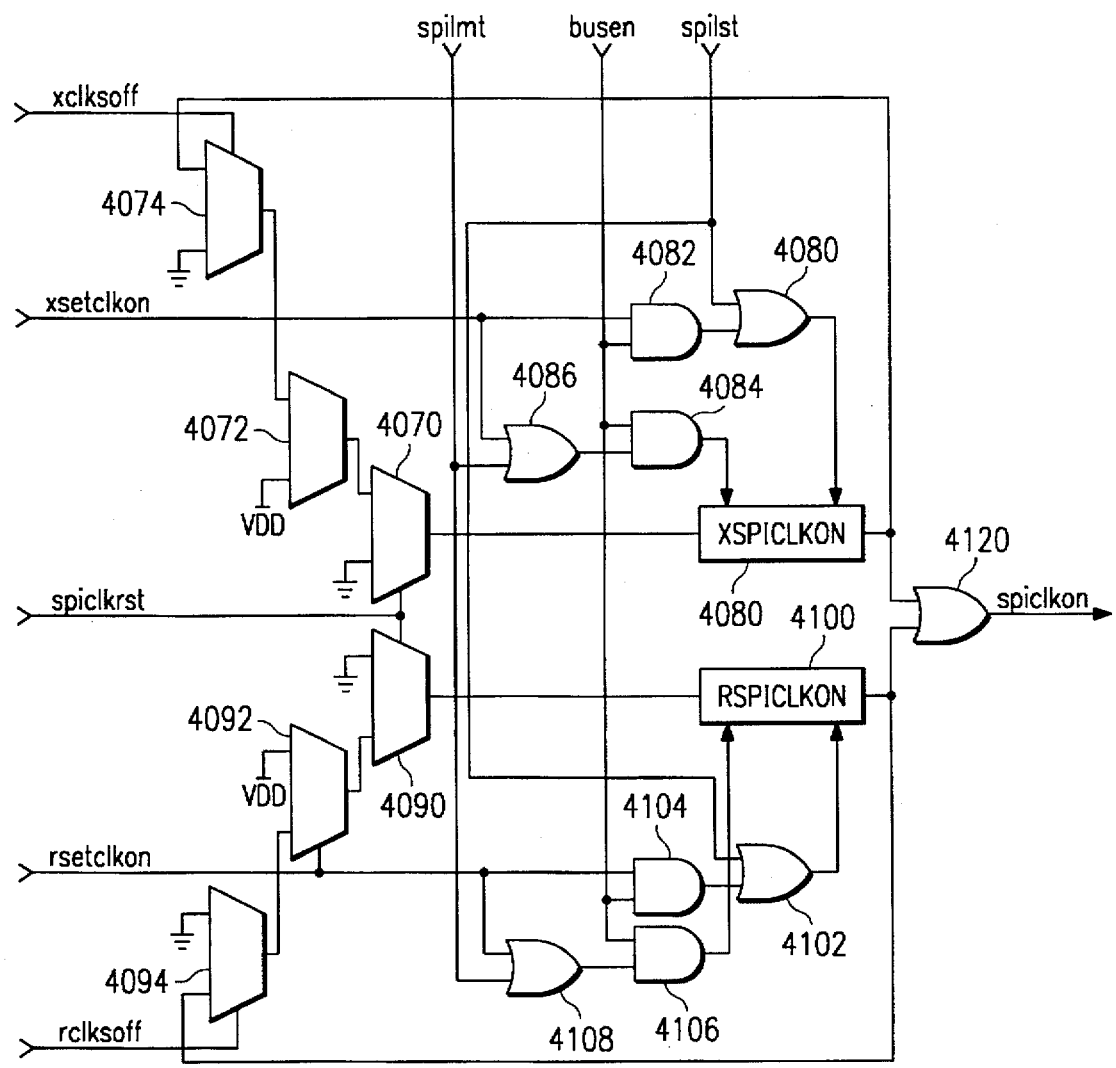

Referring now to FIG. 10B, there may be seen another portion of the clock circuitry of the present invention. This portion of the clock circuitry allows the receive and transmit portions of the serial port interface to turn on the clocks for moving data into or out of memory 600; both have inputs so one portion will not turn off the clocks after a memory access, when the other portion still needs the clocks on to complete its memory access operation. That is, this portion of the clock circuitry is used to wake up the processor clocks for memory accesses when the processor is in its sleep mode. More particularly, it may be seen that there are two sets of chained muxes which provide the input to two latches. Mux 4070 provides its output as the input to a latch XSPICLKON 4080. The output of mux 4090 is the input to a RSPICLKON latch 4100. The output from latch 4080 and latch 4100 are provided as the two inputs to an OR-gate 4120 whose output signal is spiclkon signal. The control signal for both mux 4070 and 4090 is spidkrst. One input for both mux 4070 and 4090 are ground. The other inputs are the outputs of other muxes. The output of mux 4072 serves as the other input to mux 4070. The two inputs for mux 4072 are vdd and the output of mux 4074. The two inputs for mux 4074 are the output of the XSPICLKON latch 4080 or ground. The control signal for the mux 4074 is xclksoff and the control signal for mux 4072 is xsetclkon.

The signal xsetclkon is also provided as the input to several logic gates. More particularly, it is the input to OR-gate 4086 and AND-gate 4082. The other input to AND-gate 4082 is busen and similarly is also an input to AND-gate 4084. The other input for OR-gate 4086 is spilmt. The output of OR-gate 4086 is the other input to AND-gate 4084. The output of AND-gate 4084 clocks the master portion of the XSPICLKON latch 4080. The output of AND-gate 4082 is one input for OR-gate 4080 and the other input is the spilst signal. The output of OR-gate 4080 is supplied as the slave clock signal for the XSPICLKON latch 4080.

The rsetclkon signal is also provided to a series of logic gates in addition to being the control signal for the mux 4092. The two inputs for the mux 4090 are ground and the output of mux 4092. The two inputs for mux 4092 are vdd and the output of mux 4094. The two inputs for mux 4094 are ground and the output of the RSPICLKON latch 4100. The control signal for the mux 4094 is rclksoff. The rsetclkon signal is provided as one input to OR-gate 4108 and AND-gate 4104. The other input for OR-gate 4108 is the spilmt signal. The output of OR-gate 4108 is provided as the other input for AND-gate 4106 whose other input is the busen signal. The output of AND-gate 4106 is supplied as the master clock signal to the RSPILCLKON latch 4100. The other input for AND-gate 4104 is the busen signal and its output is provided as one input to OR-gate 4102. The other input to OR-gate 4102 is the spilst signal. The output of the 4102 latch is the slave clock signal for the RSPILCLKON latch 4100.

Figure 10C:
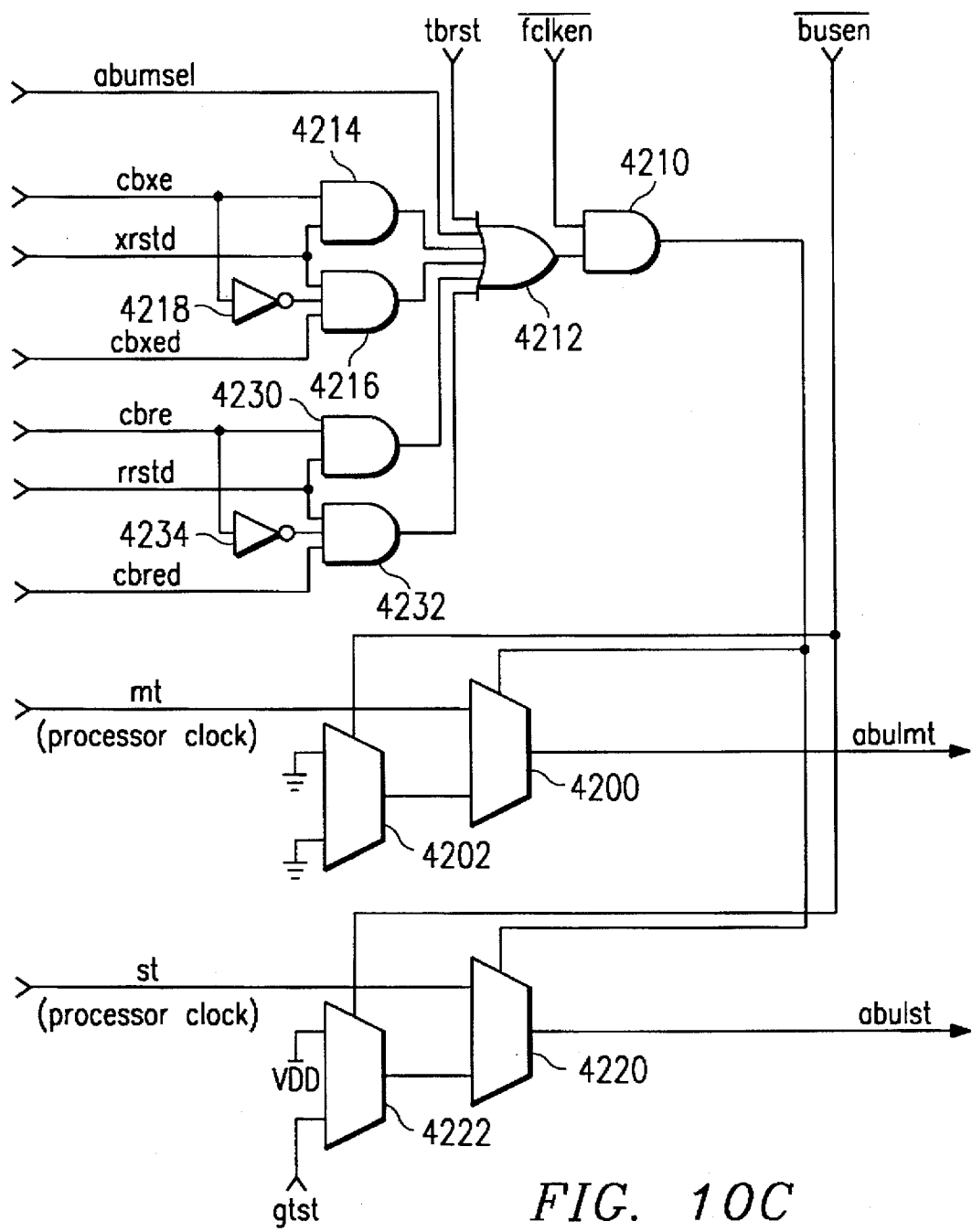

Referring now to FIG. 10C, there may be seen another portion of the clock circuitry of the present invention. More particularly, there may be seen an AND-gate 42 10 whose inputs are the inverted fclken signal and the output of an OR-gate 4212. The inputs for the OR-gate 4212 are the signals tbrst, abumsel, the output of AND-gate 4214, the output of AND-gate 4216, the output of AND-gate 4230 and the output of AND-gate 4232. The inputs for AND-gate 4214 are cbxe and xrstd. The three inputs for AND-gate 4216 are the signals xrstd, cbxe inverted by inverter 4218 and cbxed. The two inputs for AND-gate 4230 are cbre and rrstd. The three inputs for AND-gate 4232 are rrstd, cbre inverted by inverter 4234 and cbred. The output of AND-gate 4210 is the control signal for muxes 4200 and 4220.

One input for mux 4200 is the processor clock mt, which is again the processor master clock. The output of mux 4200 is the abulmt signal, the other input for mux 4200 is the output of mux 4202 whose two inputs are both ground. The control signal for mux 4202 is the inverted busen signal. The mux 4220 has as one input the slave portion of the processor clock st and the other input is the output of mux 4222 whose two inputs are vdd and gtst. The control signal for mux 4222 is the inverted signal busen. The control signal for the 4220 mux is again the output of AND-gate 4210. The output of mux 4220 is the clock signal abulst. That is, abulmt and abulst are the processor clocks mt and st that are routed to the abu portion of the present invention. Thus, abulmt is the abu local master clock and abulst is the abu local slave clock.

Figure 10D:
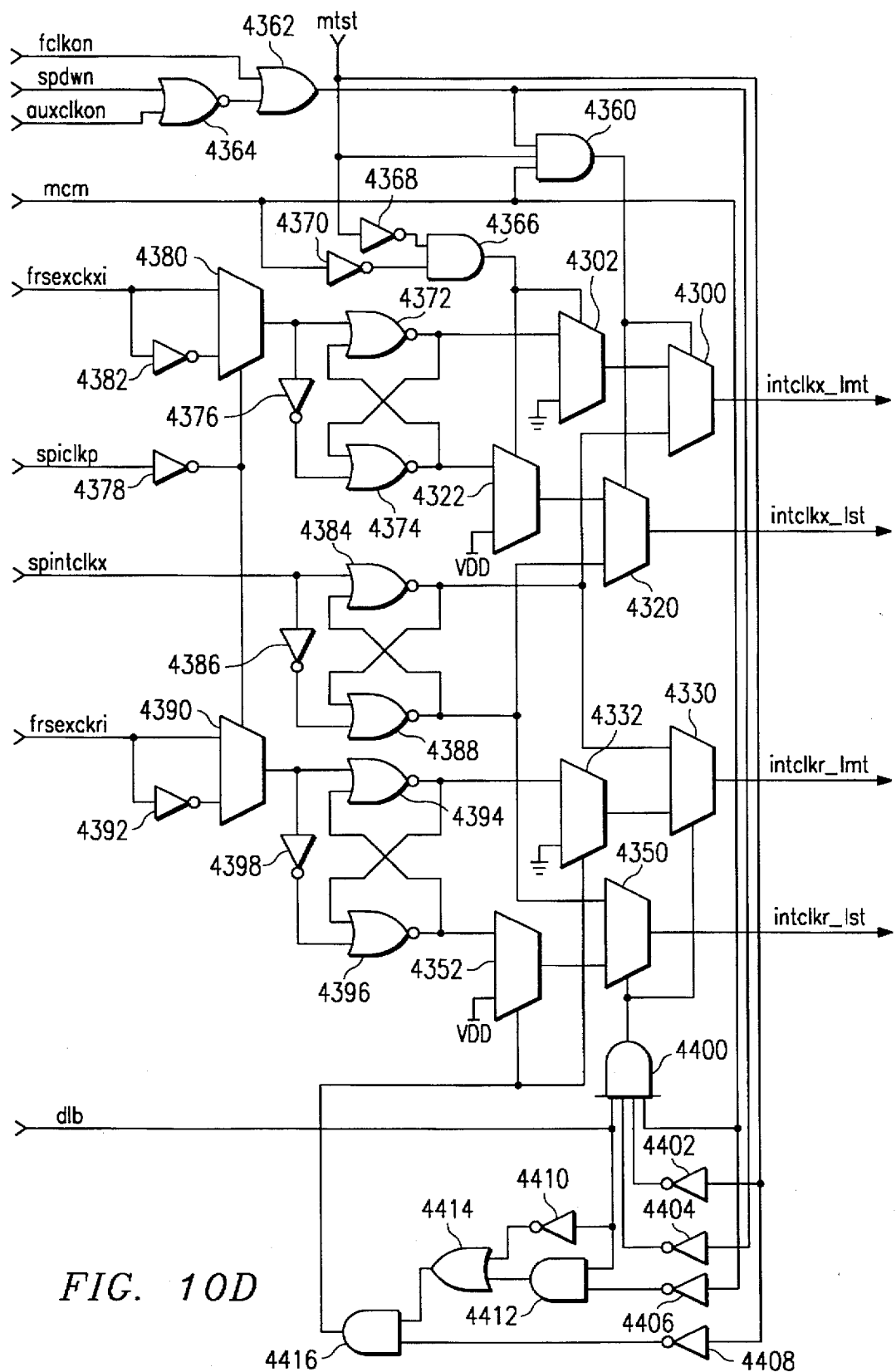

Referring now to FIG. 10D, there may be seen yet another portion of the clock circuitry of the present invention. More particularly, there may be seen an AND-gate 4360 that has three inputs. One input to AND-gate 4360 is the output of OR-gate 4362. The second input to AND-gate 4360 is the mtst signal and the third input to AND-gate 4360 is the mcm signal. The two inputs for OR-gate 4362 are the output of a NOR-gate 4364 and the fclkon signal. The two inputs for the NOR-gate 4364 are spdwn and auxclkon. The output of AND-gate 4360 is used as the control signal for mux 4300 and mux 4320.

The output from mux 4300 is intclkx_lmt, which is the internal clock x local master. The output of mux 4320 is intclkx_lst, which is the internal clock x local slave. The two inputs for mux 4300 are the output of mux 4302 and the output of a NOR-gate 4384. The two inputs for mux 4302 are the output of a NOR-gate 4372 and ground. The control signal for mux 4302 is the output of AND-gate 4366. The two inputs for AND-gate 4366 are the mtst signal, inverted by inverter 4368, and the mcm signal, inverted by inverter 4370.

Mux 4380 has as one input the signal frsexckri and that same signal inverted by inverter 4382. The output from mux 4380 is supplied to the input of NOR-gate 4372 and inverter 4376. The output of inverter 4376 is supplied as one input to NOR-gate 4374. The other input for NOR-gate 4374 is the output of NOR-gate 4372. Similarly, the other input for NOR-gate 4372 is the output of NOR-gate 4374. In this manner, the signal from mux 4380 is turned into two non-overlapping clock signals which are output from NOR-gate 4372 and NOR-gate 4374. As mentioned earlier herein, the output of NOR-gate 4372 is one input to mux 4302. In this manner, the output of the NOR-gate 4372 may be provided through mux 4302 and mux 4300 to be the intcklx__lmt clock signal. In a siroilar manner, the output of NOR-gate 4374 is provided as one input to mux 4322. The other input to mux 4322 is vdd. The control signal for mux 4322 is the output of AND-gate 4366. The output of mux 4322 is supplied as one input to mux 4320 and under appropriate circumstances the output of NOR-gate 4374 becomes the intclkxlst clock signal. The spiclkp signal is provided to an inverter 4378 and then the inverted signal is provided as a control signal for mux 4380. In a similar manner, the inverted spiclkp signal is provided as the control signal for mux 4390.

The two inputs for mux 4390 are the frsexckri signal and the inverted version of that signal, which is inverted by inverter 4392. In a similar manner, the output of mux 4390 is fed to two parallel NOR-gates 4394 and 4396 to provide two non-overlapping clock signals as the output of NOR-gate 4394 and NOR-gate 4396. Again, the signal from mux 4390 is inverted by inverter 4398 before being supplied as one input to NOR-gate 4396. The output of NOR-gate 4396 is supplied as the other input to NOR-gate 4394 and the output of NOR-gate 4394 is supplied as the other input to NOR-gate 4396. The output of NOR-gate 4394 is provided as one input to mux 4332 and the other input for this mux is ground. The output of NOR-gate 4396 is provided as one input to mux 4352 and the other input is vdd. The output of mux 4332 is provided as one input to mux 4330 whose output is intclkr__lmt. In a similar manner, the output of mux 4352 is provided as one input to mux 4350 whose output is intclkr__lst. The control signals for muxes 4330 and 4350 are the output of AND-gate 4400. The control signals for muxes 4332 and 4352 are the output of AND-gate 4416.

The spintclkx signal is also supplied to a parallel series of NOR-gates 4384 and 4388 to generate two non-overlapping clock signals from this spintclkx signal. The spintclkx signal is inverted by inverter 4386 before being provided as an input to NOR-gate 4388. It is provided in its uninverted form to NOR-gate 4384. The output of NOR-gate 4388 is the other input for NOR-gate 4384 and the output of NOR-gate 4384 is the other input for NOR-gate 4388. The output of NOR-gate 4384 is provided as an input to mux 4300. It is also provided as an input to mux 4330. The output of NOR-gate 4388 is provided as an input to mux 4320 and mux 4350. In this manner, the intclkr__lmt signal may be a non-overlapping clock signal which is generated by the frsexckri signal or the spintclkx signal. The spintclkx signal corresponds to the internally generated clock x signal. In a similar manner, the intclkr__lst signal from mux 4350 may either be the non-overlapping slave clock signal from spintclkx or from frsexckri. In this restruer, the muxes may switch between an externally generated clock signal which is supplied to the circuit or an internally generated clock signal.

In a similar manner, the frsexckxi signal and the spintclkx signal are used to generate non-overlapping clock signals which my be selected by mux 4300 or mux 4320 to be the internal clock x master clock signal intclkx__lmt or the internal clock x slave clock signal, intclkx__lst. The inputs for AND-gate 4400 are the mcm signal, the inverted (by inverter 4402) mtst signal and the inverted (by inverter 4404) output of OR-gate 4362. The remaining input for AND-gate 4400 is the dlb signal. The dlb signal is also supplied to an inverter 4410 whose output is supplied to an OR-gate 4414. The other input for OR-gate 4414 is the output of an AND-gate 4412 whose input is the dlb signal and the inverted mcm signal, which is inverted by inverter 4406. The output of OR-gate 4414 is one input to AND-gate 4416. The other input for AND-gate 4416 is the mtst signal, inverted by inverter 4408. Again, the output of AND-gate 4416 is used to control muxes 4332, 4352.

Figure 10E:
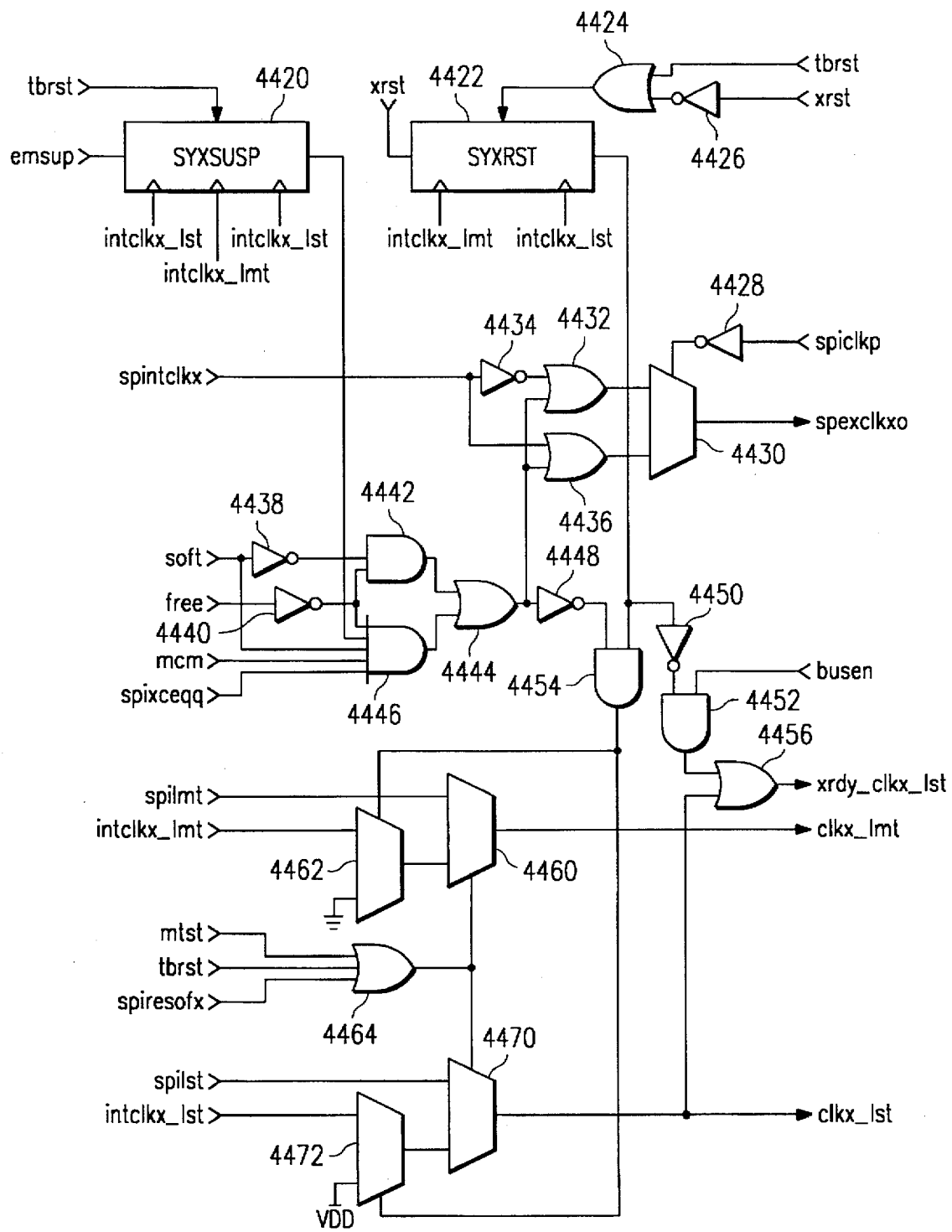

Referring now to FIG. 10E, there may be seen yet another portion of the clock circuitry of the present invention. More particularly, there may be seen the SYXSUSP latch 4420, which synchronizes the emulation suspense signal from the processor to the external transmit clocks, and the SYXRST latch 4422, which synchronizes the xrst signal from the control register to the external transmit clocks to avoid spurious logic operations. The SYXSUSP latch 4420 is reset by the tbrst signal and its input is the emsup signal. The latch 4420 has three latch portions, two of which are a slave portion and one of which is a master portion. The two slave portions are clocked by the intclkx__lst clock signal and the master portion is clocked by the intclkx__lmt clock signal. The SYXRST latch 4422 is reset by the signal from OR-gate 4424 whose two input signals are the tbrst signal and the inverted xrst signal, which is inverted by inverter 4426. The SYXRST signal is also clocked by the intclkx__lmt and intclkx__lst clock signals. The output of the SYXSUSP latch 4420 is provided as one input to AND-gate 4446. The other inputs to AND-gate 4446 are the soft signal, the free signal, inverted by inverter 4440, the mcm signal and the spixceqq signal. The output of AND-gate 4446 is one input to OR-gate 4444. The other input to OR-gate 4444 is the output of AND-gate 4442. The two inputs for AND-gate 4442 are the inverted soft signal, which is inverted by inverter 4438, and the inverted free signal. The output of OR-gate 4444 is inverted by inverter 4448 and provided as one input to AND-gate 4454. The other input to AND-gate 4454 is the output of the SYXRST latch 4422. The output of the OR-gate 4444 is also provided as the input to two OR-gates 4432 and 4436. The other input to AND-gates 4432 and 4436 are the spintclkx signal and this same signal inverted by inverter 4434. The outputs of OR-gates 4432 and 4436 are provided as the two inputs to mux 430. The output of mux 4430 is the spexclkxo signal and the control signal for this mux is the inverted version, via inverter 4428, of the spiclkp signal. The output of latch of SYXRST is also inverted by inverter 4450 and provided as one input to AND-gate 4452. The other input to AND-gate 4452 is the busen signal. The output of AND-gate 4452 is provided as one input for OR-gate 4456, whose output is xrdy__clkx__lst. This output signal is the xrdy clock x slave signal, which is a special signal supplied for the XRDY latches. The other input for OR-gate 456 is the clkx__lst signal which is the output of mux 4470.

The output of AND-gate 4454 is used as the control signal for mux 4462 and mux 4472. The input signals for mux 4462 are the intclkx__lmt signal and ground. The input signals for the mux 4472 are the intclkx__lst signal and vdd. The output signal from mux 4462 is provided as one input to mux 4460. The other input to mux 4460 is the spilmt signal. In a similar manner, the output of mux 4472 is one input to mux 4470, whose other input is the spilst signal. Mux 4460 and mux 4470 are controlled by a control signal that is output by OR-gate 4464. The OR-gate has as its inputs the mtst signal, the tbrst signal and the spixesofx signal. In this manner, the clock xlmt and the clock xlst signals which are the clock x local master and clock x local slave are generated by muxes 4460 and 4470. The clock x master and clock x slave clock signals may either be the spilmt signal or the internal clock x signals. For testing purposes, the clock xlmt and clock xlst signals may be appropriately shifted to ground or vdd.

Figure 10F:
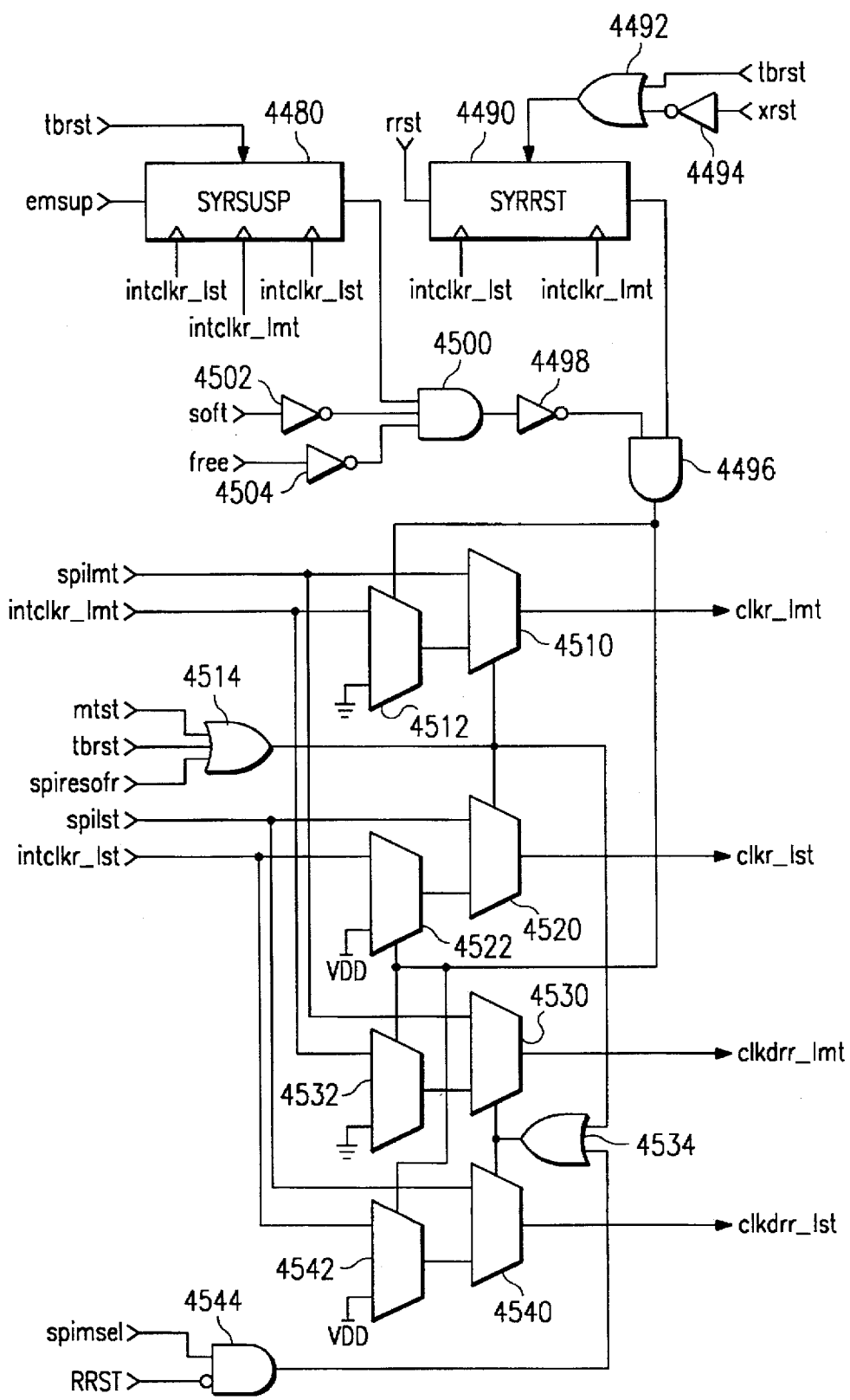

Referring now to FIG. 10F, there may be seen the final portion of clock circuitry for the present invention. More particularly, there may be seen two latches, the SYRSUSP latch 4480, which synchronizes the emulation suspense signal from the processor to the external receive clocks, and the SYRRST latch 4490, which synchronizes the rrst signal from the control register to the external receive clocks to avoid spurious logic operations. The SYRSUSP latch is reset by the tbrst signal and has its input to era sup signal. This latch again has two slave portions and one master portion that are clocked by the intclkr_lst or intclkr_lmt signals. The syrsst signal is reset by the output of OR-gate 4492 whose inputs are the tbrst signals and the inverted, by inverter 4494, signal of xrst. The input for the SYRRST latch 4490 is the rrst signal. The output of the SYRSUSP latch 4480 is provided as one input to AND-gate 4500. The other two inputs to AND-gate 4500 are the inverted soft signal and the inverted free signal. These two signals are inverted by inverters 4502 and 4504, respectively. The output of AND-gate 4500 is inverted by inverter 4498 and provided as one input to AND-gate 4496. The other input for AND-gate 4496 is the output of the SYRRST latch 4490. The output of the AND-gate 4496 is used as a control signal for mux 4512, mux 4522, mux 4532 and mux 4542.

The input for mux 4512 is the intclkr_lmt signal or ground. The output of mux 4512 is provided as one input to mux 4510. The other input to mux 4510 is the spilmt clock signal and its output is the clkr_lmt clock signal. In this manner, mux 4510 provides the receive clock master signal and that signal may be selected to be the spi local master or the internal clock local master signal. In a similar manner, the intclkr_lst signal is provided as one input to mux 4522 and its other input is vdd. The output of mux 4522 is one input to mux 4520 and its other input is the spilst signal. The output of the 4520 mux is the clkr_lst signal, which is the receive clock slave signal. Muxes 4510 and 4520 are controlled by the control signal generated by OR-gate 4514. OR-gate 4514 has as its input the mtst signal, the tbrst signal and the spiresofr signal. The intclkr_lmt signal is also provided as one input to mux 4532, whose other input is ground. The output of mux 4532 is provided as one input to mux 4530, whose other input is the spilmt signal.

The output of mux 4530 is the clkdrr_lmt signal, which is the clock DRR latch master clock signal. In a similar manner, the spilst signal is provided as one input to mux 4540 and the other input for that mux is the output of mux 4542. The output of mux 4540 is the clkdrr_lst clock signal, which is the DRR latch slave clock signal. The inputs for mux 4542 are the intclkr_lst signal and vdd. In this manner, the DRR latch clock signals may either be the spilmt and spilst signals or the internally generated receive clock signals. The control signals for mux 4530 and mux 4540 are the output of OR-gate 4534. The inputs for OR-gate 4534 are the output of OR-gate 4514 and the output of AND-gate 4544. The two inputs for AND-gate 4544 are the inverted version of the rrst signal and the spimsel signal. The serial port portion of the circuit uses these clock signals (ckldrr_lmt, clkdrr_lst) for RSR to DSR transfers during normal operation, but these clock signals are also used during receive reset when the RSR and DSR registers become general purpose memory mapped registers for the processor.

Referring now to FIG. 11, there may be seen a block diagram of how the FIGS. 12A–12E may be laid out to form the asynchronous receive circuitry of the present invention.

Figure 12A:
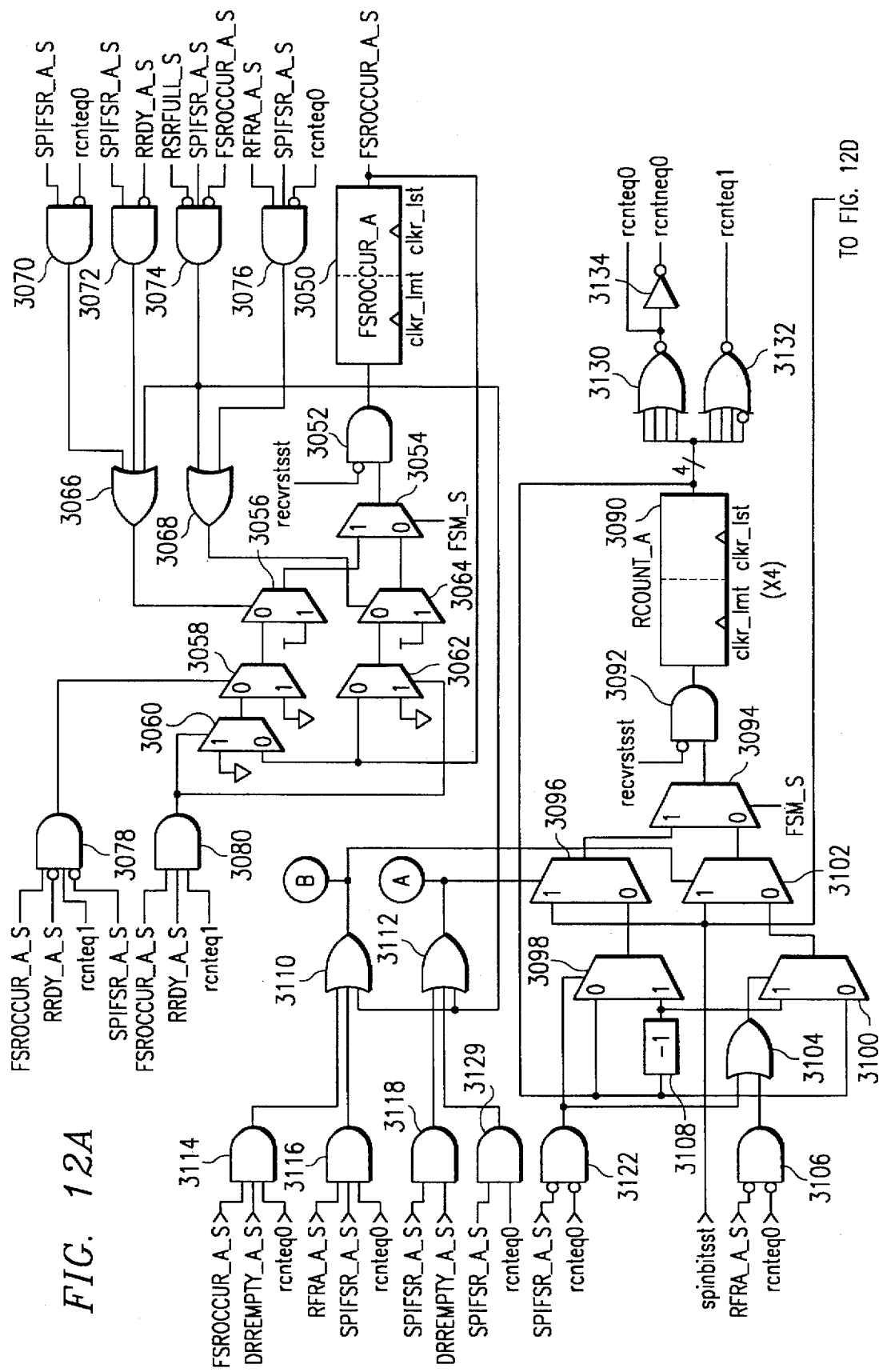

Referring now to FIG. 12A, there may be seen the FSROCCUR_A latch 3050. This latch is used to store the signal representing that the first frame synchronization signal has occurred and is clocked by the clkr_lmt and clkr_lst clock signals. The output from the slave portion of this latch is the FSROCCUR_A_S signal. The input to the FSROCCUR_A latch 3050 is the output of an AND-gate 3052. The input to AND-gate 3052 is the inverted version of the recvrstsst signal and the output of a two input mux 3054. The mux 3054 is controlled by FSM_S signal and its two inputs are the output of two other two input muxes 3056, 3064. The first mux 3056 has as its inputs the output of another two input mux 3058 and vdd. The second mux 3064 has as its inputs the output of another two input mux 3062 and vdd as well.

The control signal for mux 3056 is the output of OR-gate 3066 whose inputs are the output of AND-gate 3070, AND-gate 3072 and AND-gate 3074. The inputs for AND-gate 3070 are the SPIFSR_A_S signal and the inverted rcnteq0 signal. The SPIFSR_A_S signal from the SPIFSR latch 3200 indicates the latching of the FSR signal on the falling edge of the external receive clock signal. The inputs for the AND-gate 3072 are the SPIFSR_A_S signal and the inverted RRDY_A_S signal. The inputs for the AND-gate 3074 are the inverted version of the RSRFULL_S signal, the SPIFSR_A_S signal and the inverted FSROCCUR_A_S signal.

The control signal for mux 3064 is the output of OR-gate 3068. The inputs for OR-gate 3068 are the output of AND-gate 3074 and the output of AND-gate 3076. The inputs for AND-gate 3076 are the RFRA_A_S signal, the SPIFSR_A_S and the inverted version of rcnteq0.

The mux 3058 provides one input to mux 3056. The inputs for mux 3058 are the output of mux 3060 and ground. The control signal for mux 3058 is the output of AND-gate 3078. The inputs for AND-gate 3078 are FSROCCUR_A_S, RRDY_A_S inverted, rcnteq1 and SPIFSR_A_S inverted. The two inputs for mux 3060 are ground and the output of the FSROCCUR_A latch 3050. The control signal for mux 3060 is the output of AND-gate 3080. The inputs for AND-gate 3080 are FSROCCUR_A_S, RRDY_A_S and rcnteq1.

The mux 3062 has as its inputs the output of the latch 3050 or ground. The control signals for mux 3062 is again the output of the AND-gate 3080. Again, mux 3062 provides one input to mux 3064 whose other input is vdd.

The other latch in FIG. 12A is the RCOUNT_A latch 3090. In fact, there are four of these latches as indicated by the "X4" in parentheses underneath this latch. The four RCOUNT latches store signals representative of the number of bits to be received and are decremented until the number of bits corresponding to their count have been shifted in. These latches are also clocked by the clkr_lmt and clkr_lst signals. The input for these latches is the output of AND-gate 3092. The inputs for AND-gate 3092 are the inverted signal recvrstsst and the output of a two input mux 3094 whose control signal is FSM_S. The two inputs for mux 3094 are the outputs of two other two input muxes 3096 and 3102. Mux 3096 has as its input the signal spinbitsst and the output of another two input mux 3098. The inputs for the 3098 mux are the output of the latch 3090 for one signal and the output of the latch, decremented by one, by decrementer 3108, as the other signal.

In a similar manner, mux 3102 has as one input the spinbitsst signal and the other input is the output of mux 3100. Mux 3100 has as its input the decremented by one value of latch 3090 or the non-decremented value of latch 3090. The control signals for mux 3100 is the output of OR-gate 3104. The two inputs for OR-gate 3104 are the output of AND-gate 3106 and AND-gate 3122. The two inputs for AND-gate 3106 are RFRA_A_S signal inverted and the rcnteq0 signal inverted. The two inputs for the AND-gate 3122 are the SPIFSR_A_S signal inverted and the rcnteq0 signal inverted. The output of AND-gate 3122 also serves as the control signal for mux 3098.

The control signal for mux 3096 is the output of OR-gate 3112. This output is also labeled with a circled A, as this same signal is used to control muxes in other portions of FIG. 12. The three inputs for OR-gate 3112 are the output of AND-gate of 3118, AND-gate 3129 and the output of AND-gate 3074. The inputs to AND-gate 3118 are SPIFSR_A and DRREMPTY_A_S. The two inputs for AND-gate 3129 are SPIFSR_A_S and rcnteq0.

The control signals for mux 3102 is the output of OR-gate 3110. This signal is also used in other portions of FIG. 12 and accordingly has been labeled with a circled B. The three inputs for OR-gate 3110 are again the output of AND-gate 3074, the output of AND-gate 3116 and the output of AND-gate 3114. The three inputs for AND-gate 3114 are the FSROCCUR_A_S signal, the DRREMPTY_A_S signal and the rcnteq0 signal. The three inputs for the AND-gate 3116 are the RFRA_A_S signal, the FPIFSR_A_S signal, and the rcnteq0 signal.

The output of the RCOUNT_A latches 3090 are all combined in NOR-gates 3130 and 3132. The output of NOR-gate 3130 is the rcnteq0 signal and after inversion by inverter 3134, the rcntneq0. The NOR-gate 3132 has one input inverted and its output is the rcnteq1 signal.

Referring now to FIG. 12B, there may be seen the RFRA_A latch 3010. This latch stores a signal representative of the receive frame acknowledge signal and is clocked by the clkr_lmt and clkr_1st clock signals. The input for this latch is the output of OR-gate 3012 whose two inputs are the recvrstsst signal and the output of a two input mux 3014. Mux 3014 has as its input ground and the output of mux 3016. The inputs for mux 3016 are vdd and the output of the slave portion of the latch 3010. The output of the slave portion of the latch 3010 is the RFRA_A_S signal. The control signal for mux 3014 is the output of AND-gate 3018. The inputs for AND-gate 3018 are the FIG_S signal, the inverted version of the FSM_S signal, the inverted version of rcnteq0 and the inverted version of SPIFSR_A signal. The mux 3016 is controlled by control signal AND-gate 3020. The inputs for AND-gate 3020 are the rcnteq1 signal, the RRDY_A_S signal, the FSROCCUR_A_S signal and the inverted version of FSRM_S.

The other latch depicted in FIG. 12B is the DRREMPTY_A latch 3030, which is used to determine whether DRR has been read before the end of a receive. The output of the slave portion of this latch is the DRREMPTY_A_S signal. Again this latch is clocked by the clkr_lmt and clkr_1st clock signals. The input for this latch is the output of AND-gate 3032. AND-gate 3032 receives as its input the inverted version of recvrstsst signal and the output of two input mux 3034. The inputs for mux 3034 are vdd and the output of a second mux 3036. The inputs for mux 3036 are the output of the slave portion of latch 3030 and ground. The control signal for mux 3034 is the output of an AND-gate 3038 whose inputs are the inverted version of RRDY_A_S and rcnteq1. The control signal for mux 3036 is the inverted by inverter 3040 control signal rcnteq1.

Figure 12C:
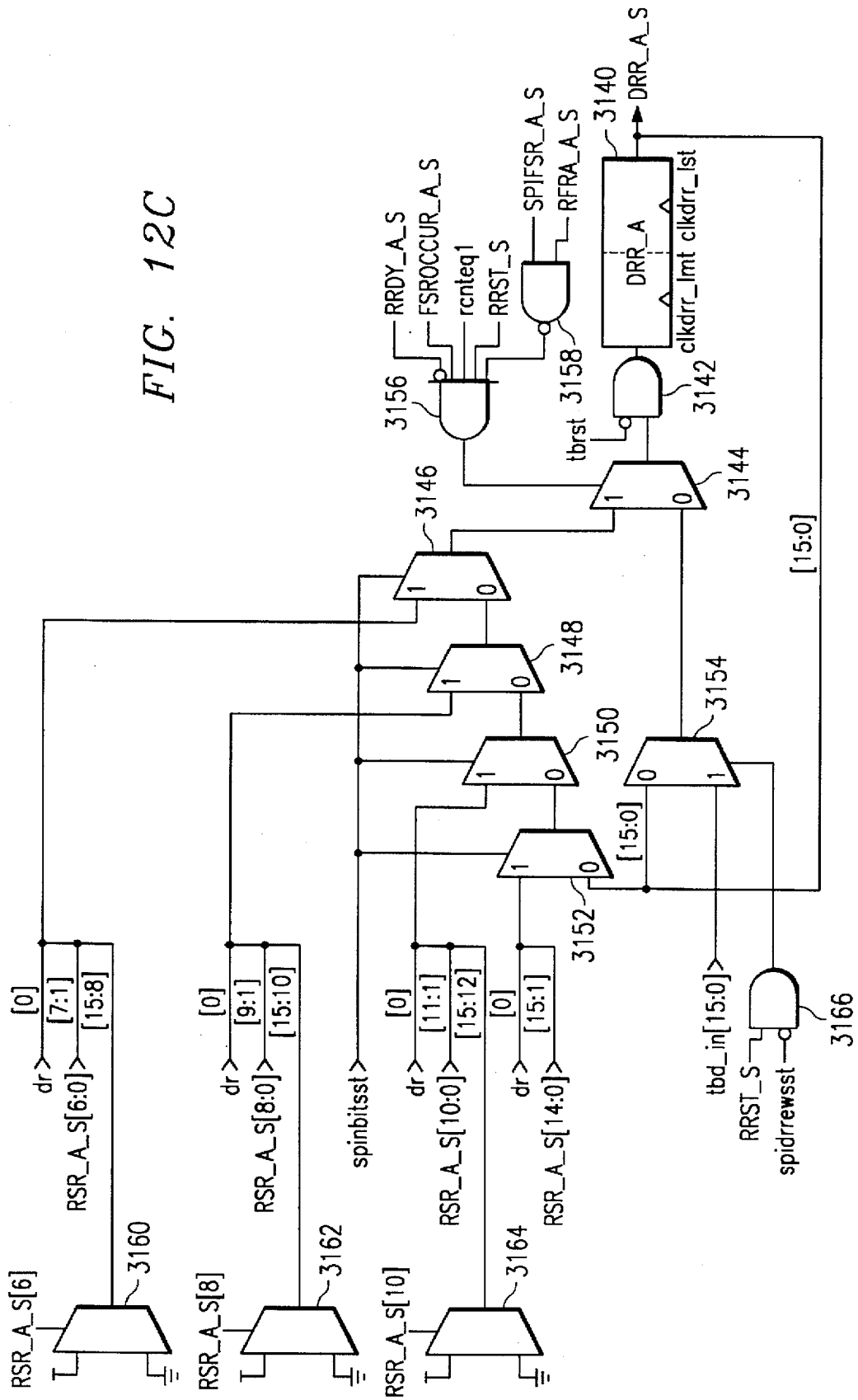

Referring now to FIG. 12C, there may be seen the sixteen DRR_A latches 3140. The DRR_A latches are clocked by the clkdrr_lmt and clkdrr_1st clock signals. The output from the DRR_A latches 3140 is the DRR_A_S signal. The input to the latch is the output of an AND-gate 3142. The two inputs to AND-gate 3142 are the inverted tbrstsst signal (which is depicted as the tbrst signal on FIGS. 12 and in the remainder of this description) and the output of a two input mux 3144. The control signal for mux 3144 is the output of an AND-gate 3156. The inputs for the AND-gate 3156 are the inverted signal RRDY_A_S, FSROCCUR_A_S, rcnteq1, RRST_S and the output of NAND-gate 3158. The two inputs for NAND-gate 3158 are SPIFSR_A_S and RFRA_A_S. The two inputs for mux 3144 are the outputs of two other two input muxes 3146, 3154.

Mux 3146 has two inputs. One input is the output of mux 3148 and mux 3148 also has two inputs, one of which is the output of mux 3150. Mux 3150 also has two inputs, one of which is the output of mux 3152. Thus, it may be seen that there are a series of chained-together two input multiplexers which allow for selecting a variety of signals as the input to the DRR_A latch 3140. The control signal for mux 3146, 3148, 3150 and 3152 are the spinbitsst signal.

The spinbitsst signal indicates the number of bits that are to be received or transmitted and is either 8, 10, 12 or 16. When the spinbitsst signal is representative of a 8-bit long packet, then mux 3146 is energized to select the one input. In this case, the input for the mux 3146 comes from three different sources. Line 0 (corresponding to the zeroth DRR latch) is the dr signal, while lines 7 through 1 (corresponding to the first through seventh DRR latches) are the RSR_A_S lines 6 through 0, and lines 15 through 8 (corresponding to latches 8 through 15), are the output of a mux 3160. Mux 3160 has as inputs vdd or ground with that choice being determined by control signal RSR_A_S[6]; this is how sign extension is performed for a receive.

In this manner, the DRR_A latch 3140 that corresponds to the 0-bit position receives the dr signal, while the DRR_A latches 3140 that correspond to bit positions 7 through 1 receive the RSR_A_S 6 through 0 bit positions and the remaining latches receive either a ground or a vdd signal (a logic 0 or a logic 1, depending upon the value of RSR_A_S [6]). This would correspond to a 8-bit long packet word. In a similar manner, when the spinbitsst is 10, then input 1 of mux 3148 is selected. For this situation, again the 0-bit line has an input of dr, while the bit lines 1 to 9 have as their inputs the RSR_A_S bit positions 8 through 0. The DRR_A latches 15 through 10 would have as their input signals the output of mux 3162. The inputs for mux 3162 are again ground or 0, corresponding to a logic 0 or a logic 1, and the control signal for mux 3162 is RSR_A_S[8].

In a similar manner, when the spinbitsst corresponds to a 12-bit word, then the 1 input position of mux 3150 is selected. For this situation, again, the 0 DRR_A latch has as its input the signal dr and the latches 3140 corresponding to bit positions 1 through 11, have as their inputs the signals RSR_A_S[10;0]. The remaining latches corresponding to bit positions 12 through 15 have as their input the output of mux 3164. The two inputs for mux 3164 are again ground and vdd and the control signal is the value of RSR_A_S [10].

When the spinbitsst corresponds to a 16-bit packet, then the 1 input of mux 3152 is selected in which case the 0 latch 3140 has as its input the dr signal and the remaining latches have as their input signals RSR_A_S[14;0]. The other input for mux 3152 is the output of the slave portion of the DRR_A latch 3140. The other input for mux 3144 is the output of mux 3154. The two inputs for mux 3154 are the output of the slave portion of DRR_A latches 3140 or the tbd_n[15]. The control signal for mux 3154 is the output of AND-gate 3166. The two inputs for AND-gate 3166 are RRST_S and the inverted version of spidrrewsst. In this manner the DRR register receives the last input bit as the dr signal while the remaining bits of the word are shifted into the DRR register from the incremented by one corresponding bit positions of the RSR register; this allows the received data packet to be in both the RSR and DRR registers, so that the clocks may be turned off, when the processor clocks are off, after the last external clock pulse which also served to shift in the last bit of data for the packet.

Figure 12D:
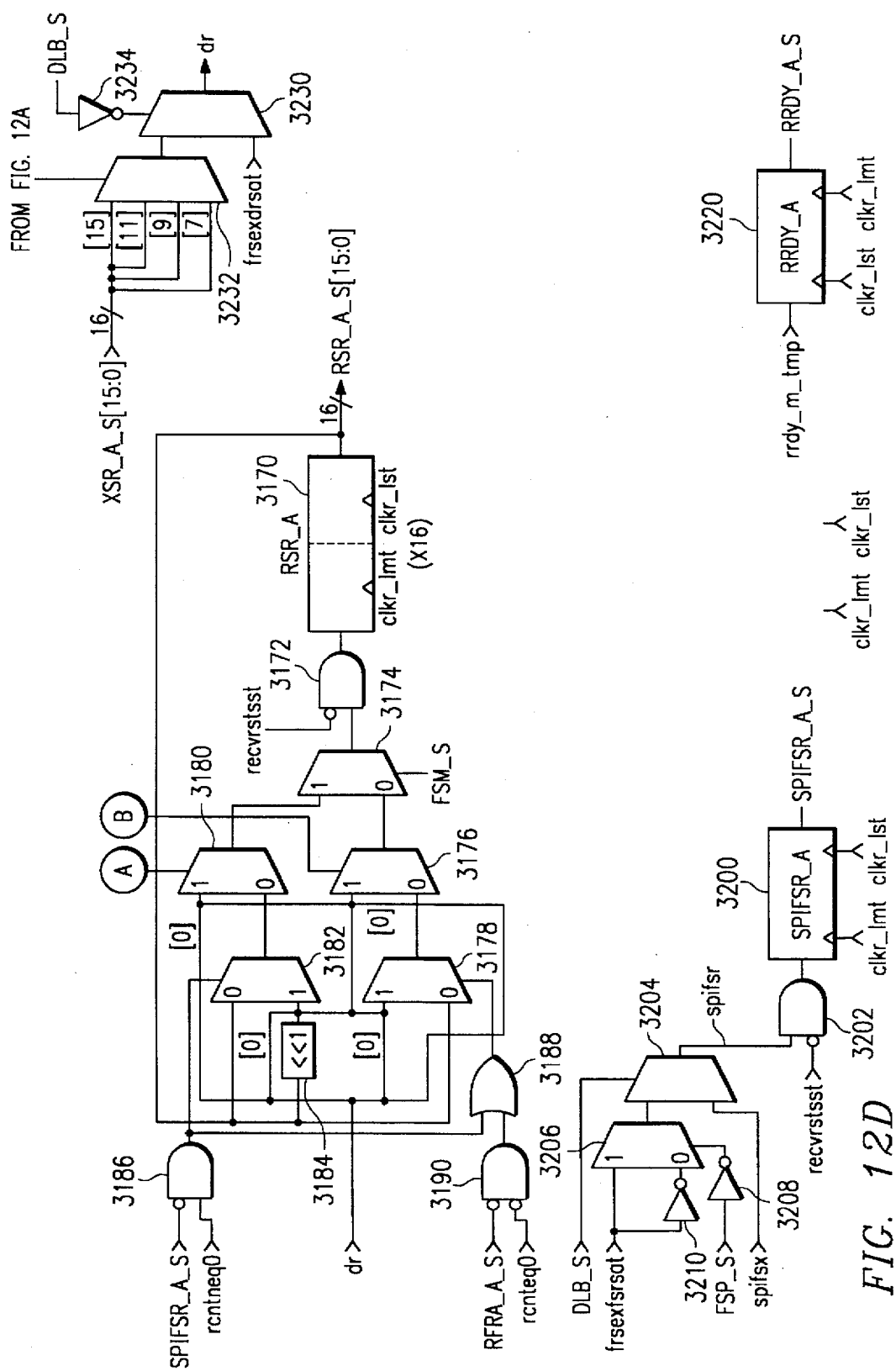

Referring now to FIG. 12D, there may be seen the RSR_A latches 3170. These latches are clocked by the clkr_lmt and dkr_lst clock signals. The output from the slave portion of these latches is the RSR_A_S signals. Since there are 16 of these latches, they correspond to bit positions 15 through 0 as represented by [15:0]. The input to the RSR_A latch 3170 is the output of AND-gate 3172. The inputs to AND-gate 3172 are the inverted recvrstsst signal and the output of a two input mux 3174, whose control signal is FSM_S. The RSR_A_S signals from the RSR_A latches 3170 are the same signals that were provided as inputs to the various multiplexers associated with the inputs to DRR_A latches 3140. The inputs to mux 3174 are the outputs of two muxes 3180, 3176. The control signal for mux 3176 is the signal B, which was described in FIG. 12A. The control signal for mux 3180 is the control signal A, which was described earlier.

Mux 3180 has two inputs. One input is the output of mux 3182 and the other input has two portions. More particularly, for the 0th bit line, the input is the dr signal and the remaining bit positions (corresponding to bit positions 1 through 15), have as an input signal the output of the RSR_A latches 3170 shifted to the left 1 bit position by shifter 3184, whose input is output of the RSR_A latches 3170. The two inputs for mux 3182 are the outputs of the RSR_A latches 3170 or, again, the outputs of the RSR_A latches 3170 shifted to the left by shifter 3184. The control signal for mux 3182 is the output of AND-gate 3186. The inputs for AND-gate 3186 are SPIFSR_A_S inverted and rcntneq0.

One input for mux 3176 is similar to that for mux 3180 in that the 0-bit position is the dr signal, while the remaining bit positions are the output of the RSR_A latches 3170 shifted to the left 1 bit position by shifter 3184. The other input for mux 3176 is the output of mux 3178. In a similar manner the inputs for mux 3178 are the outputs of the RSR_A latches 3170 or those outputs shifted to the left 1-bit position by shifter 3184. The control signal for mux 3178 is the output or OR-gate 3188 whose two inputs are the output of AND-gate 3186 and AND-gate 3190. The two inputs for AND-gate 3190 are RSR_A_S inverted and rcnteq0.

The SPIFSR_A latch 3200 is also clocked by the clkr_lmt and clkr_lst clock signals and latches the FSR signal on the falling edge of the external receive clock signal. The output of this latch SPIFSR_A_S. The input to this latch is the output of AND-gate 3202. The two inputs for AND-gate 3202 are reevrstsst inverted and the output of mux 3204. Mux 3204 has as its inputs the SPIFSX signal and the output of a two input mux 3206. The control signal for mux 3204 is the DLB_S signal. The two inputs for mux 3206 are the signal frsexfsrsat or that same signal inverted by inverter 3210. The control signal for mux 3206 is the FSP_S signal inverted by inverter 3208.

The RRDY_A latch 3220 synchronizes the rrdy bit back to the external receive clock signal for use in the asynchronous receive logic and is also clocked by the clkr_lst and clkx_lmt clock signals. The input for this latch is the RRDY_M_TMP signal and the output is the RRDY_A_S signal. The remaining two muxes 3230 and 3232 illustrate how the dr signal is created. More particularly, the mux 3230 has as its output the dr signal and has as its inputs the frsexdrsat signal and the output of a four input mux. The control signal for mux 3230 is the DLB_S signal inverted by inverter 3234. The inputs for mux 3232 are the XSR_A_S signals partitioned depending upon the bit size. One input is all 16 bits, one input corresponds to 12 bits, one input corresponds to 10 bits and one input corresponds to 8 bits. The control signal for selecting among these various bits is the spinbitsst signal described earlier herein with regard to FIG. 12A.

Figure 12E:
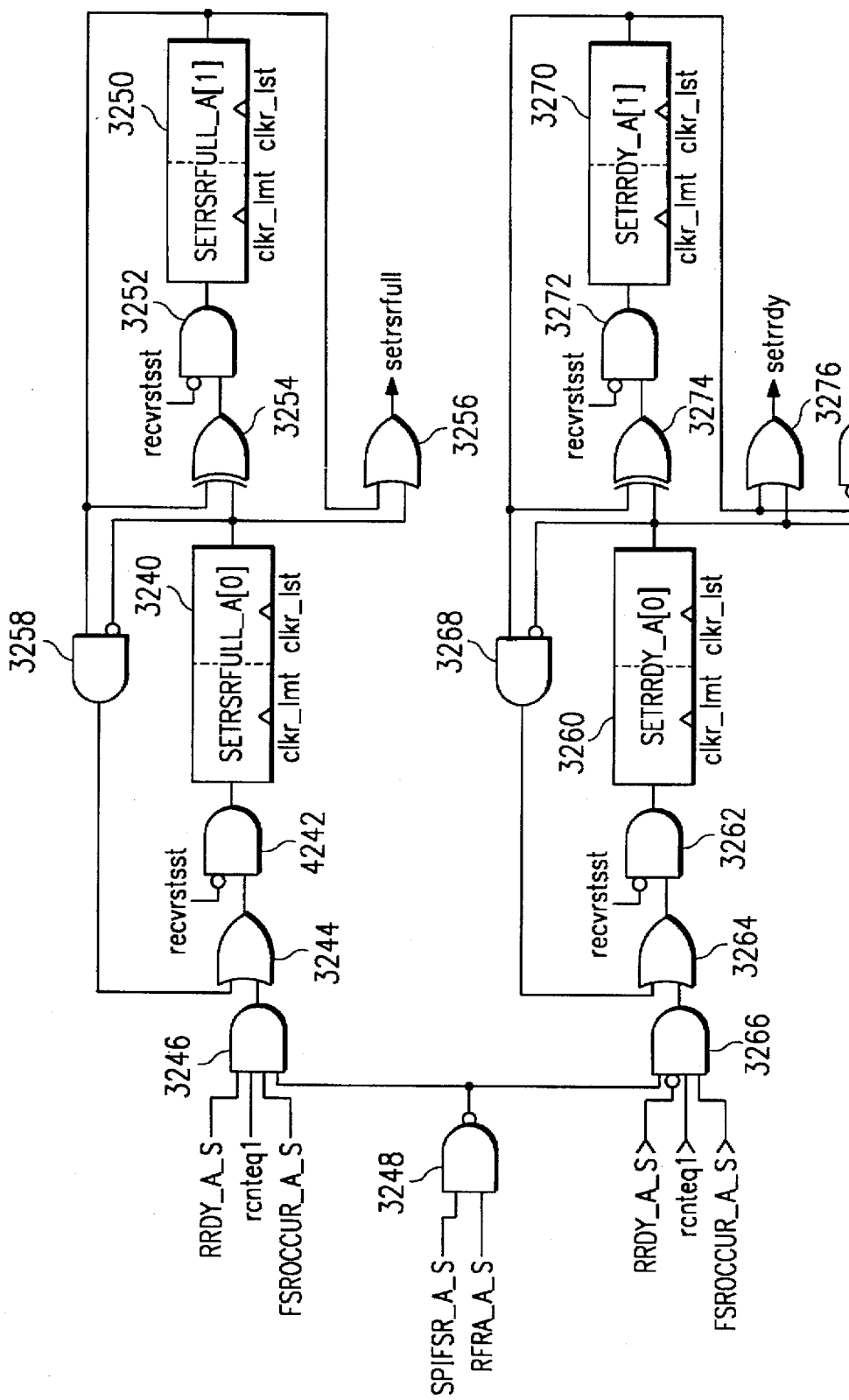

Referring now to FIG. 12E, there may be seen the SETRSRFULL_A[0] latch 3240 and the SETRSRFULL_A[1] 3250. These two latches serve as a counter and are clocked by the clkr_lmt and ckr_lst clock signals. The input for the 0 latch 3240 is the output of AND-gate 3242. The two inputs for AND-gate 3242 are recvrstsst inverted and the output of OR-gate 3244. The two inputs for OR-gate 3244 or the output of AND-gate 3246 and the output of AND-gate 3258. The inputs for AND-gate 3246 are RRDY_A_S, rcnteq1, FSROCCUR_A_S and the output of NAND-gate 3248. The two inputs for NAND-gate 3248 are SPIFSR_A_S and RFRA_A_S. The output of the 0 latch 3240 is supplied as one input to an OR-gate 3256 whose output signal is the SETRSRFULL signal. It is also provided as an input, after inversion to AND-gate 3258. It is also provided as an input to an exclusive OR-gate 3254. The output of exclusive OR-gate 3254 is one input to AND-gate 3252. The other input to AND-gate 3252 is recvrstsst, inverted. The output of AND-gate 3252 is the input to the first latch 3250. The output of the first latch 3250 is also provided as an input to OR-gate 3256 and exclusive OR-gate 3254 and AND-gate 3258.

Continuing to refer to FIG. 12E, it may be seen that there are also two other latches SETRRDY_A[0] latch 3260 and SETRRDY_A[1] latch 3270. Both these latches are also clocked by clkr_lmt and clkr_lst clock signals. The input for the 0 latch 3260 is the output of AND-gate 3262. The input to AND-gate 3262 is the recvrstsst signal inverted and the output of OR-gate 3264. The inputs to OR-gate 3264 are the output of an AND-gate 3266 and the output of AND-gate 3268. The inputs for AND-gate 3266 are the output of AND-gate 3248, RRDY_A_S inverted, rcnteq1 and FSROCCUR_A_S. The output of the 0 latch is provided as an input after inversion to AND-gate 3268 to OR-gate 3276 and to AND-gate 3278. It is also provided as an input to exclusive OR-gate 3274. The output of exclusive OR-gate 3274 is provided as an input to AND-gate 3272. The other input to AND-gate 3272 is the recvrstsst signal inverted. The output of AND-gate 3272 is the input for the first latch 3270. The output of this latch is provided as an input to AND-gate 3268, the exclusive OR-gate 3274, to OR-gate 3276 and AND-gate 3278. The output of OR-gate 3276 is the SETRRDY signal and the other input to AND-gate 3278 is the RRST_S signal and the output of this AND-gate is the RSETCLKONSST signal.

Figure 13:
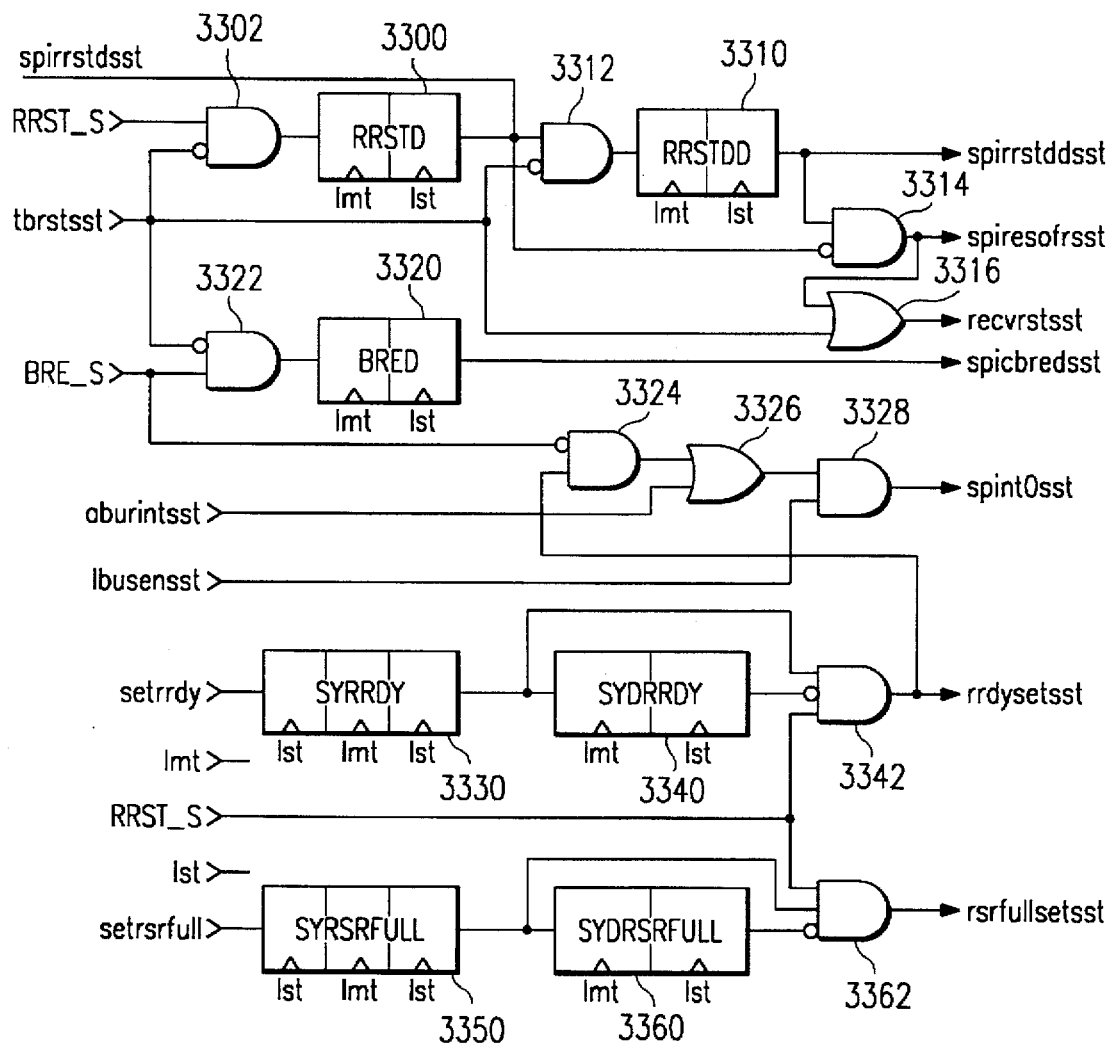
FIG. 13 depicts the detailed circuitry for the synchronous receive portion of the serial port interface portion of the present invention.

Referring now to FIG. 13, there may be seen the circuitry associated with the synchronous receive portion of the serial port interface of the present invention. In particular, there may be seen several latches. Referring now to the RRSTD latch 3300 and the RRSTDD latch 3310, it may be seen that both of these latches are clocked by the lmt and lst signals. The input for the RRSTD latch is the output of AND-gate 3302. The inputs for AND-gate 3302 are the RRST_S signal and the tbrstsst inverted. The output of the RRSTD latch 3300 is provided as a signal spirrstdsst and is also provided as an input to AND-gate 3312. The other input to AND-gate 3312 is the tbrstsst signal inverted. The output of AND-gate 3312 is provided as the input to the RRSTDD latch 3310. The output from the RRSTDD latch 3310 is provided as signal spirrstddsst and as the input to an AND-gate 3314. The other input for AND-gate 3314 is the inverted output of the RRSTD latch 3300. The output of AND-gate 3314 is the spiresofrsst signal and the input to an OR-gate 3316 whose output is the recvrstsst signal. The other input for OR-gate 3316 is the tbrstsst signal. The RRSTD and RRSTDD latches are used in combination to create a signal used to reset other latches and are generally used to detect the falling edge of a reset signal.

The BRED latch 3320 is used to detect the falling edge of the BRE signal to reset ABU latches, is also clocked by the lmt and lst signals and has as it output the spicbredsst signal. The input for this latch 3320 is the output of AND-gate 3322 whose inputs are the tbrstsst signal inverted and BRE_S. The BRE_S signal is also provided after inversion as an input to AND-gate 3324 whose output is provided as one input to OR-gate 3326 whose output is provided as one input to AND-gate 3328 whose output signal is the interrupt spint0sst. The other input for AND-gate 3328 is the lbusensst signal. The other input for OR-gate 3326 is the aburintsst signal. The other input for the AND-gate 3324 is the output of AND-gate 3342 and corresponds to signal rrdysetsst.

The SYRRDY synchronizer 3330 synchronizes the setrrdy signal to the processor clocks so the RRDY bit may be set and is composed of three latch portions, which are two slave portions and one master portion, which are clocked by the lst and lmt signals. This latch has as its input the SETRRDY signal and has an output that is provided as an input to the SYDRRDY latch 3340, which is also clocked by the lmt and lst clock signals. The output of the SYDRRDY latch 3340 is inverted and provided as one input to AND-gate 3342. The other inputs for the AND-gate 3342 are the output of the SYRRDY latch 3330 and the RRST_S signal.

The SYRSRFULL synchronizer 3350 synchronizes the setrsrfull signal to the processor clocks so the RSRFULL bit may be set and is also made up of two slave portions and one master portion clock by the lst and lmt clock signals. The input for this latch is the SETRSRFULL signal and the output of this latch is provided as the input to the SYDRSRFULL latch 3360, which is also clocked by the lmt and lst clock signals. The output of the SYDRSRFULL latch is provided to AND-gate 3362 after inversion. The other two inputs for AND-gate 3362 are the output of the SYDRSRFULL latch 3350 and the RRST_S signal. The output from AND-gate 3362 is the RSRFULLSETSST signal.

Figure 14A:
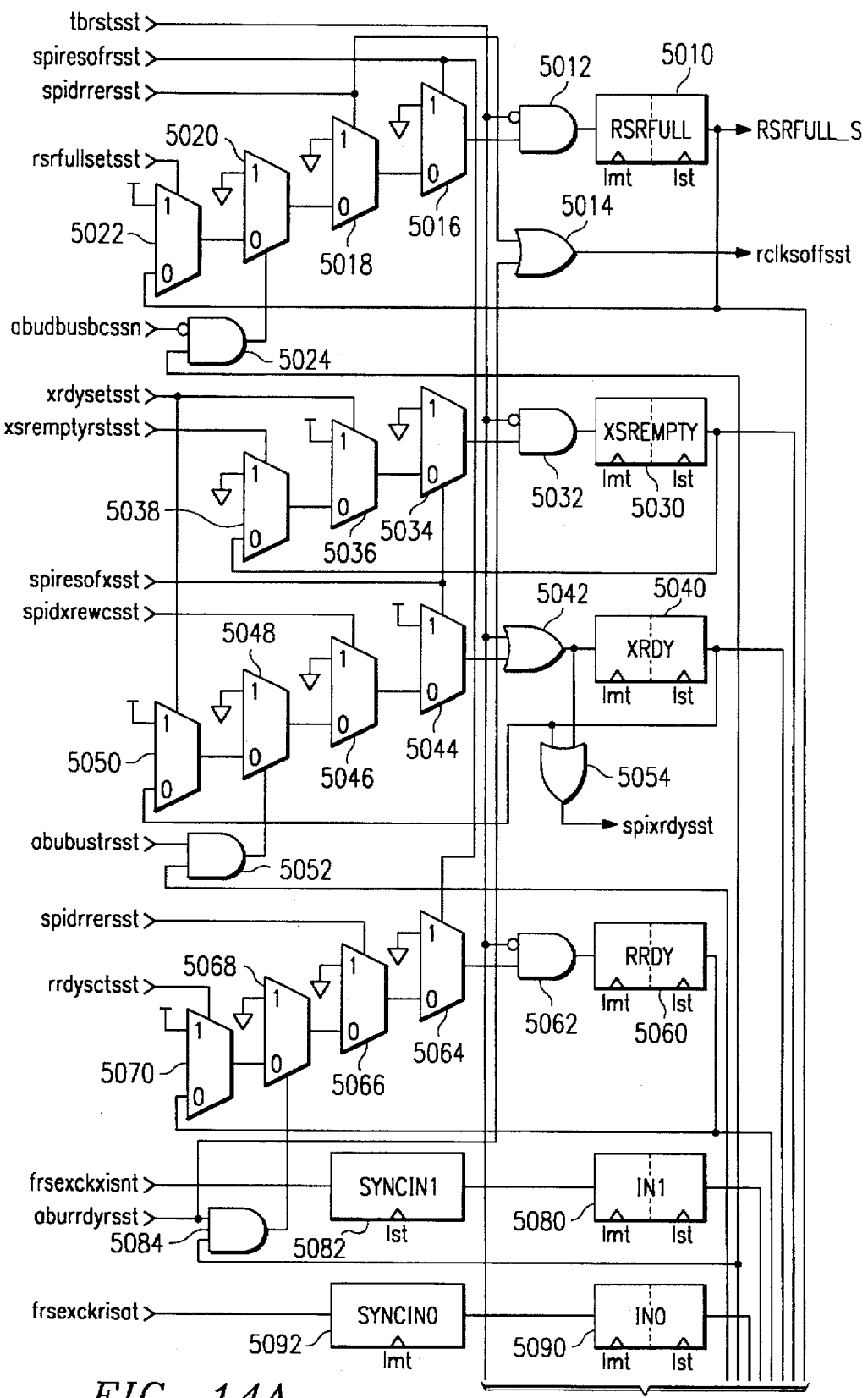
FIGS. 14A–14D depict the detailed circuitry for the control register portion of the serial port interface portion of the present invention.

Referring now to FIGS. 14A–14D, there may be seen the circuitry that represents the control register portion of the circuit of the present invention. Referring now to FIG. 14A, there may be seen the RSRFULL latch 5010. The output from this latch is the RSRFULL_S signal. This latch is also clocked by the lmt and lst clock signals. The input to the RSRFULL latch 5010 is the output of AND-gate 5012. The two inputs to AND-gate 5012 are the inverted version of tbrstsst and the output of a two input mux 5016. The two inputs for mux 5016 are ground and the output of a second mux 5018. The control signal for mux 5016 is the spiresofrsst signals. The two inputs for mux 5018 are ground and the output of another two input mux 5020. The control signal for mux 5018 is the spidrrersst signal. The two inputs for mux 5020 are ground and the output of a final two input mux 5022. The control signal for mux 5020 is the output of AND-gate 5024. The inputs for AND-gate 5024 are the abudbusbcssn signal inverted and the RRST_S signal from the RRST latch 5120 depicted on FIG. 14C. Continuing to refer to FIG. 14A, it may be seen that the inputs for mux 5022, which supplies one input to mux 5020, are ground and the output of the RSRFULL latch 5010. The control signal for mux 5022 is the rsrfullsetsst signal. OR-gate 5014 may be seen as supplying as an output the signal rclksoffsst. The two inputs for this OR-gate are the spidrrersst signal and the aburrdyrsst signal, which is also an input to AND-gate 5084 near the bottom of FIG. 14A.

Referring now to XSREMPTY latch 5030, it may be seen that it is also clocked by the lmt and lst clock signals. The output signal from this latch is XSREMPTY_S. The input for this latch is the output of AND-gate 5032. The two inputs for AND-gate 5032 are the tbrstsst signal inverted and the output of a two input mux 5034. The two inputs for mux 5034 are ground and the output of a mux 5036. The two inputs for mux 5036 are vdd and the output of a final mux 5038. The two inputs for mux 5038 are ground and the output of the XSREMPTY latch 5030. The control signal for mux 5038 is xsremptyrstsst. The control signal for mux 5036 is xrdysetsst. The control signal for mux 5034 is spiresofxsst.

Referring now to the XRDY latch 5040, it may be seen that its input is the output of an OR-gate 5042. The two inputs to OR-gate 5042 are the tbrstsst signal and the output of a two input mux 5044. The inputs for mux 5044 are vdd and the output of a second two input mux 5046. The inputs for mux 5046 are ground and the output of mux 5048. The inputs for mux 5048 are ground and the output of a final mux 5050. The two input signals for mux 5050 are vdd and the output of the XRDY latch 5040. The control signal for mux 5050 is xrdysetsst. The control signal for mux 5048 is the output of AND-gate 5052. The two inputs for AND-gate 5052 are the abubustrsst signal and the XRST_S from the XRST latch 5130, depicted in FIG. 14C. Continuing to refer to FIG. 14A, the control signal for mux 5046 is the spidxrewcsst signal. The control signal for mux 5044 is the spiresofxsst signal. In addition, the input to the XRDY latch 5040 is provided as one input to OR-gate 5054, whose output is the spixrdysst signal. The other input to OR-gate 5054 is the output of the XRDY latch 5040.

Referring now to the RRDY latch 5060, it may be seen that it is also clocked by the lmt and lst clock signals and has an input from AND-gate 5062. The two inputs for AND-gate 5062 are the tbrstsst signal inverted and the output of a two input mux 5064. The two inputs for mux 5064 are ground and the output of a second two input mux 5066. The two inputs for mux 5066 are ground and the output of a third two input mux 5068. The two inputs for mux 5068 are ground and the output of a final two input mux 5070. The two inputs for mux 5070 are vdd and the output of the RRDY latch 5060. The control signal for mux 5070 is rrdysctsst. The control signal for mux 5068 is the output of AND-gate 5084. The two input signals for AND-gate 5084 are aburrdyrsst and RRST_S. The control signal for mux 5066 is the signal spidrrersst. The control signal for mux 5064 is the signal spiresofrsst.

The IN1 synchronizer 5080 is also clocked by the lmt and 1st clock signals. The YN1 latch 5080 has as its input the output from a SYNCIN1 latch 5082. The input for the SYNCIN1 latch is the frsexckxisnt signal.

The IN0 synchronizer 5090 is also clocked by the lmt and 1st clock signals and has as its input the output from the SYNCIN0 latch 5092. The input for the SYNCIN0 latch 5092 is the frsexckrisat signal.

As may also be seen from FIG. 14A, the outputs of all the previous six latches are passed down to FIG. 14C, which will now be discussed. It may be seen that FIGS. 14A and 14C form the SPC Register and the outputs of all the various latches that make up this register are provided as an output in FIG. 14C, as denoted by the bracket with the SPC_S [15:0] label. In a similar manner, the latches depicted in FIGS. 14B and 14D make up the latches for the SPCE Register and accordingly, their outputs are collected and provided as the SPCE_S[15:0] signals.

Figure 14B:
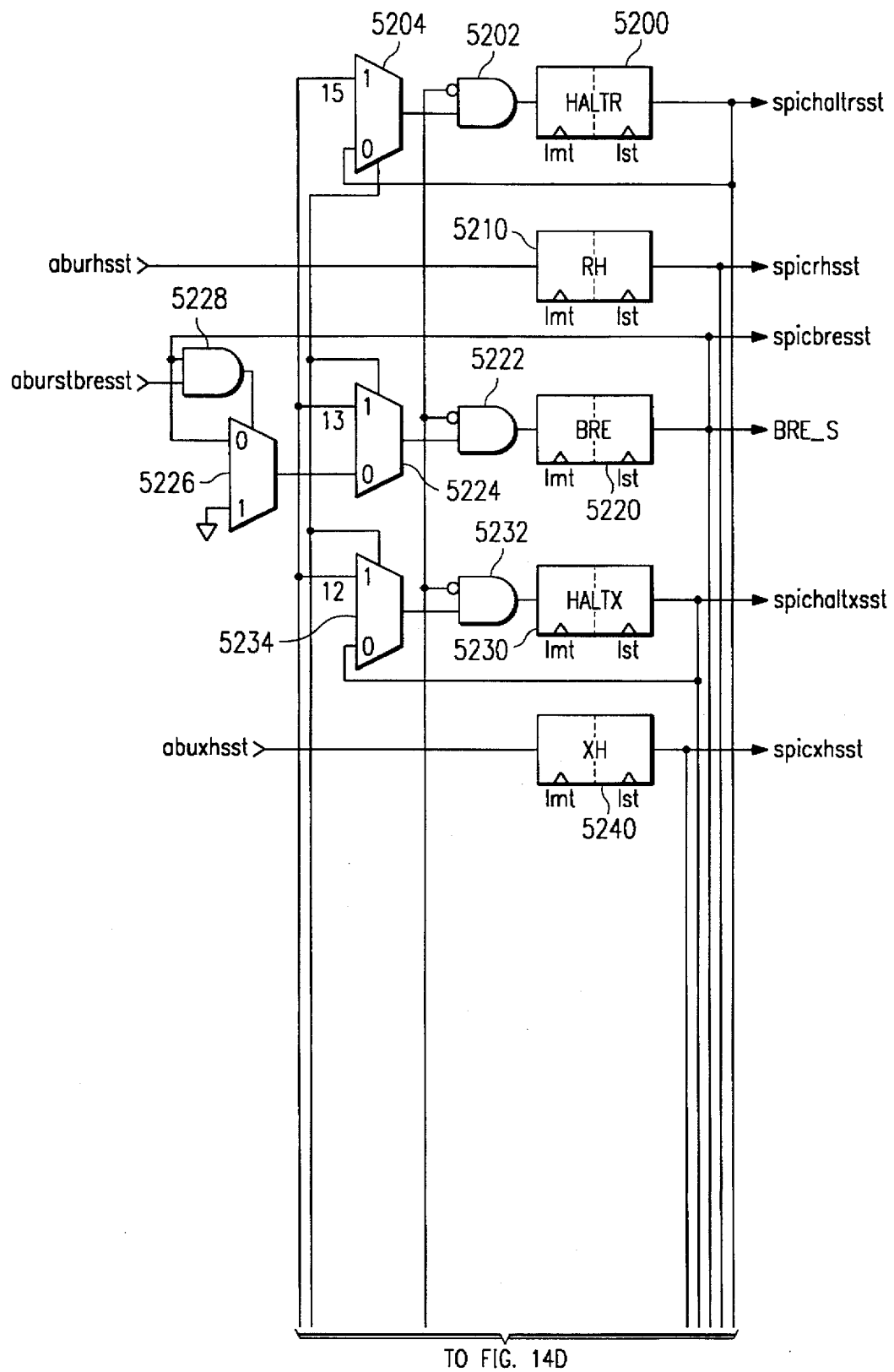
Figure 14C:
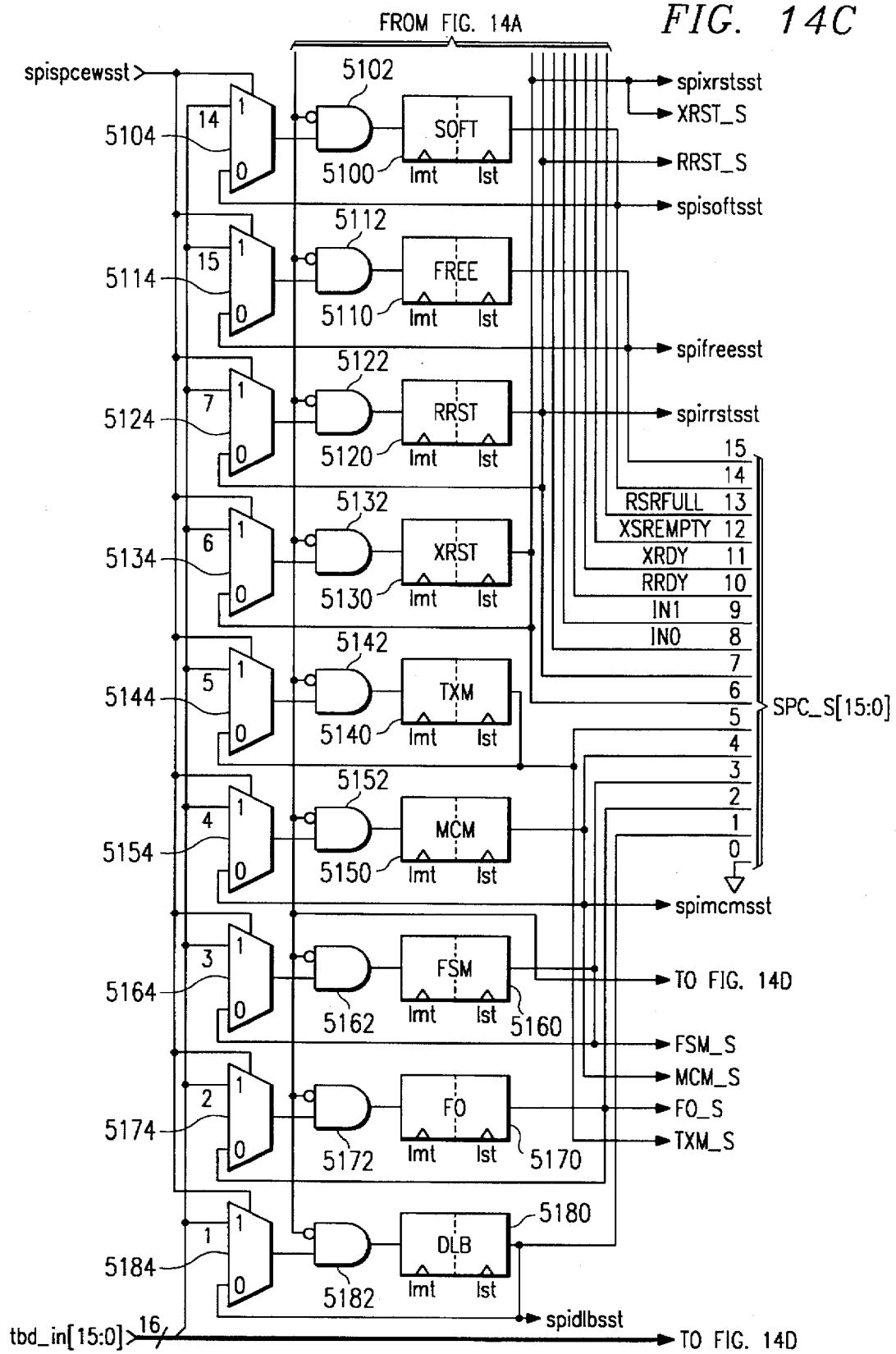

Referring now to FIG. 14C, it may be seen that there is an SOFT latch 5100. The input to this latch is the output of AND-gate 5102. The two inputs to AND-gate 5102 are the tbrstsst signal inverted and the output of a two input mux 5104. The two inputs for mux 5104 are the 14th bit position of the tbd_in bus or the output of the SOFT latch 5100. The output of the SOFT latch 5100 is also provided as the spisoftsst signal.

The FREE latch 5110 also has an input from an AND-gate 5112, whose two inputs are the tbrstsst signal inverted and the output of a two input mux 5114. The two inputs for the mux 5114 are the tbd_in 15th bit position line or the output of the FREE latch 5110. The output of the FREE latch 5110 is also provided as the spfreesst signal.

The RRST latch 5120 has as its input the output of an AND-gate 5122, whose two inputs are the tbrstsst signal inverted and the output of a two input mux 5124. The two inputs for mux 5124 are the 7th bit line of the tbd_in bus or the output of the RRST latch 5120. The output of the RRST latch 5120 is provided as the spirrstsst signal and as the RRST_S signal.

The XRST latch 5130 has its input supplied by the output of an AND-gate 5132, whose two inputs are the tbrstsst signal inverted and the output of a two input mux 5134. The two inputs for the mux 5134 are the 6-bit line of the tbd_in bus and the output of the XRST latch 5130. The output of the XRST latch 5130 is also provided as the spixrstsst signal and the XRST_S signal.

The TXM latch 5140 has as its input the output of AND-gate 5142, whose two inputs are the tbrstsst signal inverted and the output of a two input mux 5144. The two inputs for mux 5144 are bit line 5 of the tbd_in bus and the output of the TXM latch 5140. The output of the TXM latch 5140 is also provided as the TXM_S signal.

The MCM latch 5150 has as its input the output of AND-gate 5152, which has as its inputs the tbrstsst signal inverted and the output of a two input mux 5154. The two inputs for mux 5154 are bit line 4 of the tbd_in bus and the output of the MCM latch 5150. The output of the MCM latch 5150 is also provided as the spimcmsst signal and as the MCM_S signal.

The FSM latch 5160 has as its input the output of AND-gate 5162, which has as its inputs the tbrstsst signal inverted and the output of a two input mux 5164. The two inputs to mux 5164 are the 3rd bit line of the tbd_in bus and the output of the FSM latch 5160. The output of the FSM latch 5160 is also provided as the FSM_S signal.

The FO latch 5170 has as its input the output of AND-gate 5172, which has as its inputs the tbrstsst signal inverted and the output of a two input mux 5174. The two inputs to mux 5174 are the 2nd bit line of the tbd_in bus and the output of the FO latch 5170. The output of the FO latch 5170 is also provided as the FO_S signal.

The DLB latch 5180 has as its input the output of AND-gate 5182, which has as its inputs the tbrstsst signal inverted and the output of a two input mux 5184. The two inputs to mux 5184 are the 1st bit line of the tbd_in bus and the output of the DLB latch 5180. The output of the DLB latch 5180 is provided as the spidlbsst signal to other portions of the circuity. As my also be seen, the tbd_in bus also extends to FIG. 14D. The common control signal for all the two input muxes described with respect to FIG. 14C is the spispcewsst signal.

Referring now to FIG. 14B, there may be seen the upper portion of the SPCE Register. More particularly, the HALTR latch 5200 may be seen as having an input from the output of AND-gate 5202. The two inputs for AND-gate 5202 are the tbrstsst signal inverted and the output of a two input mux 5204. The two inputs to mux 5204 are the 15th bit line of the tbd_in bus and the output of the HALTR latch 5200. The output of the HALTR latch 5200 is provided as the spichaltrsst signal to other portions of the circuitry. In addition, the signal is provided as part of the SPCE_S signal. The control signal for mux 5204 is the spispceewsst.

The RH latch 5210 has as its input the aburhsst signal and as its output the spicrhsst signal.

The BRE latch 5220 has as its input the output of AND-gate 5222 and as its output the BRE_S signal. The two inputs for AND-gate 5222 are the inverted signal tbrstsst and the output of a two input mux 5224. The two inputs to mux 5224 are the 13th bit line of the tbd_in bus and the output of a second two input mux 5226. The two inputs for the second two input mux 5226 are ground or the output of the BRE latch 5220. The control signal for mux 5224 is the spispceewsst signal and the control signal for mux 5226 is the output of AND-gate 5228. The two signals that are input to AND-gate 5228 are the aburstbresst signal and the output of the BRE latch 5220. The output of the BRE latch 5220 is also provided as the spicbresst signal.

The HALTX latch 5230has as its output the spichaltxsst signal and as its input the output of AND-gate 5232. The two inputs for AND-gate 5232 are the tbrstsst signal inverted or the output of a two input mux 5234. The two inputs for mux 5234 are the 12th bit line of the tbd_in bus or the output of the HLTX latch 5230. The control signal for mux 5234 is, again, the spispceewsst signal.

The XH latch 5240 has as its output the spicxhsst signal and as its input the abuxhsst signal.

Figure 14D:
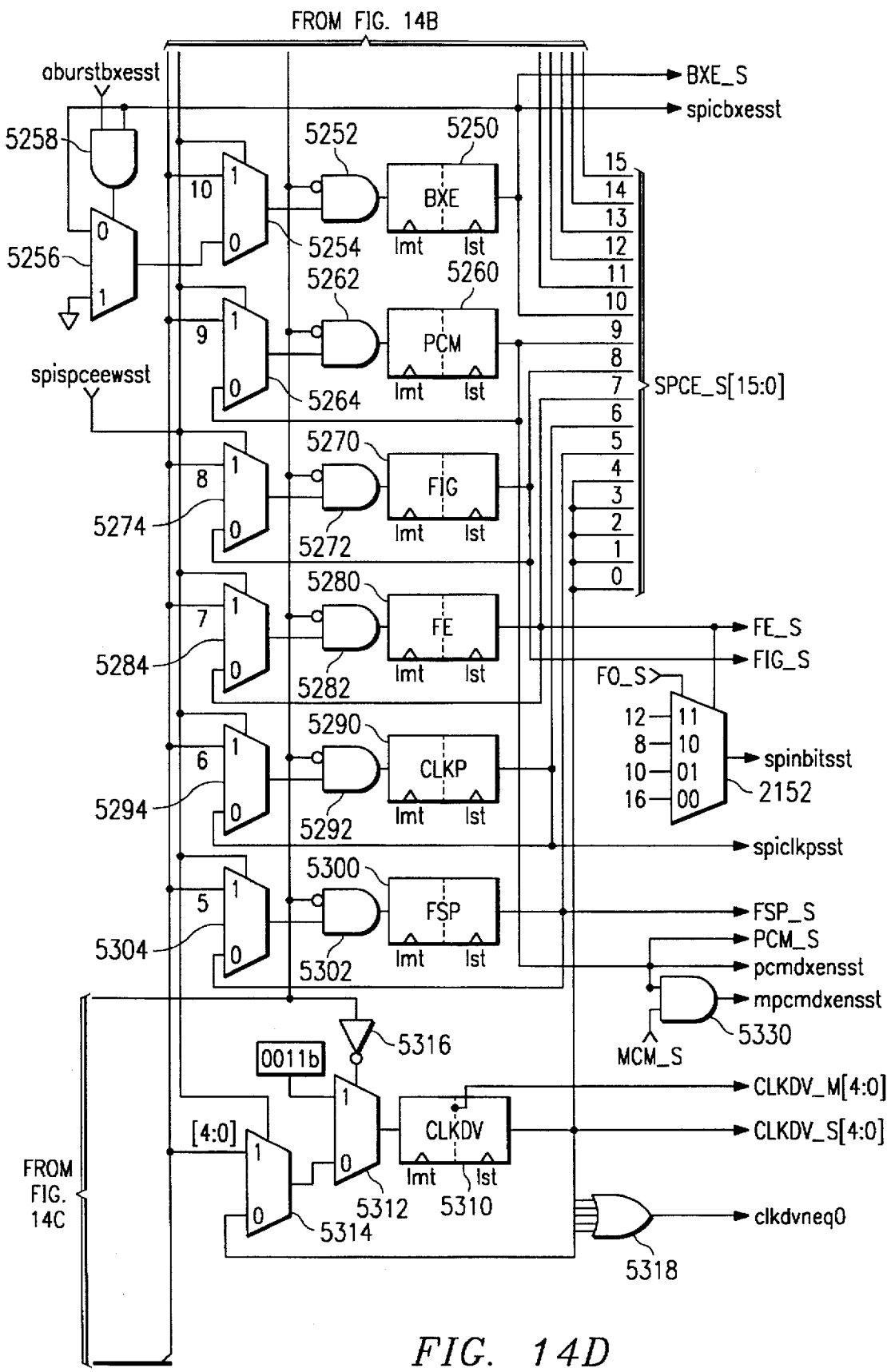

Referring now to FIG. 14D, there may be seen the remainder of the latches for the SPCE Register.

The BXE latch 5250 has as its output the BXE_S signal and the spicbxesst signal and has as its input the output of AND-gate 5252. The two inputs to AND-gate 5252 are the tbrstsst signal inverted and the output of a two input mux 5254. The two inputs to mux 5254 are the 10th bit line of the tbd_in bus and the output of a second two input mux 5256. The two inputs for mux 5256 are ground and the output of the BXE latch 5250. The control signal for mux 5256 is the output of AND-gate 5258, which has as its inputs the aburstbxesst signal and the output of the BXE latch 5250. The control signal for the mux 5254 is, again, the spispceewsst signal.

The PCM latch 5260 has as its output the PCM_S signal and the pcmdxensst signal and has also provided as an input to AND-gate 5330. The input for the PCM latch 5260 is the output of AND-gate 5262, whose inputs are the tbrstsst signal inverted and the output of a two input mux 5264. The two inputs for the mux 5264 are the 9th bit line of the tbd_in bus or the output of the PCM latch 5260. The control signal for mux 5264 is the spispceewsst signal. This same control signal is used to control most of the remaining muxes.

The FIG latch 5270 has as its output the FIG_S signal and as its input the output of AND-gate 5272. The two inputs to AND-gate 5272 are the tbrstsst signal inverted and the output of a two input mux 5274. The two inputs to the mux 5274 are the 8th bit line of the tbd_in bus or the output of the FIG latch 5270.

The FE latch 5280 has as its output the FE_S signal and as its input the output of AND-gate 5282. The two inputs to AND-gate 5282 are the tbrstsst signal inverted and the output of a two input mux 5284. The two inputs to the mux 5284 are the 7th bit line of the tbd_in bus and the output of the FE latch 5280.

The CLKP latch 5290 has as its output the spiclkpsst signal and as its input the output of AND-gate 5292. The two inputs to AND-gate 5292 are the tbrstsst signal inverted and the output of a two input mux 5294. The two inputs to the mux 5294 are the 6th bit line of the tbd_in bus and the output of the CLKP latch 5290.

The FSP latch 5300 has as its output the FSP_S signal and as its input the output of AND-gate 5302. The two inputs to AND-gate 5302 are the tbrstsst signal inverted and the output of a two input mux 5304. The two inputs to the mux 5304 are the 5th bit line of the tbd_in bus and the output of the FSP latch 5300. As noted earlier, the control signal for the two input muxes that supply one input to the input AND-gates for the latches on FIG. 14B are the spispceewsst signal.

The CLKDV latch 5310 may also be seen to provide two outputs. One from the master portion of the latch is the CLKDV_M output and the output of the slave portion is the CLKDV_S signal. Since there are 5 of these CLKDV latches, they are listed as [4:0]. The input for the CLKDV latch 5320 is the output of a two input mux 5312. The two inputs for mux 5312 are the 0011 binary number and the output of a second two input mux 5314. The two inputs for mux 5314 are the output from the slave portion of the CLKDV latch 5310 and bit lines 0 through 4 of the tbd_in bus. As may also be seen, the control signal for mux 5314 is the spispceewsst signal. The control signal for mux 5312 is the inverted by inverter 5316 tbrstsst signal. The outputs of the CLKDV latches 5310 are all combined in an OR-gate 5318, whose output signal is the clkdvneq0 signal. In addition, these 5 signals are the first 5 bit positions of the SPCE Register.

AND-gate 5330 has as its other input the MCM_S signal and provides as its output the mpcmdxensst signal. Further, a mux 2152 has as its input the FE_S signal and the FO_S signal. These two signals determine the number of bits associated with packets. As noted earlier herein, these packets may be 8-bits, 10-bits, 12-bits or 16-bits in length. The output of mux 2152 is the spinbitsst signal, which is used in other portions of the circuitry.

Figure 15:
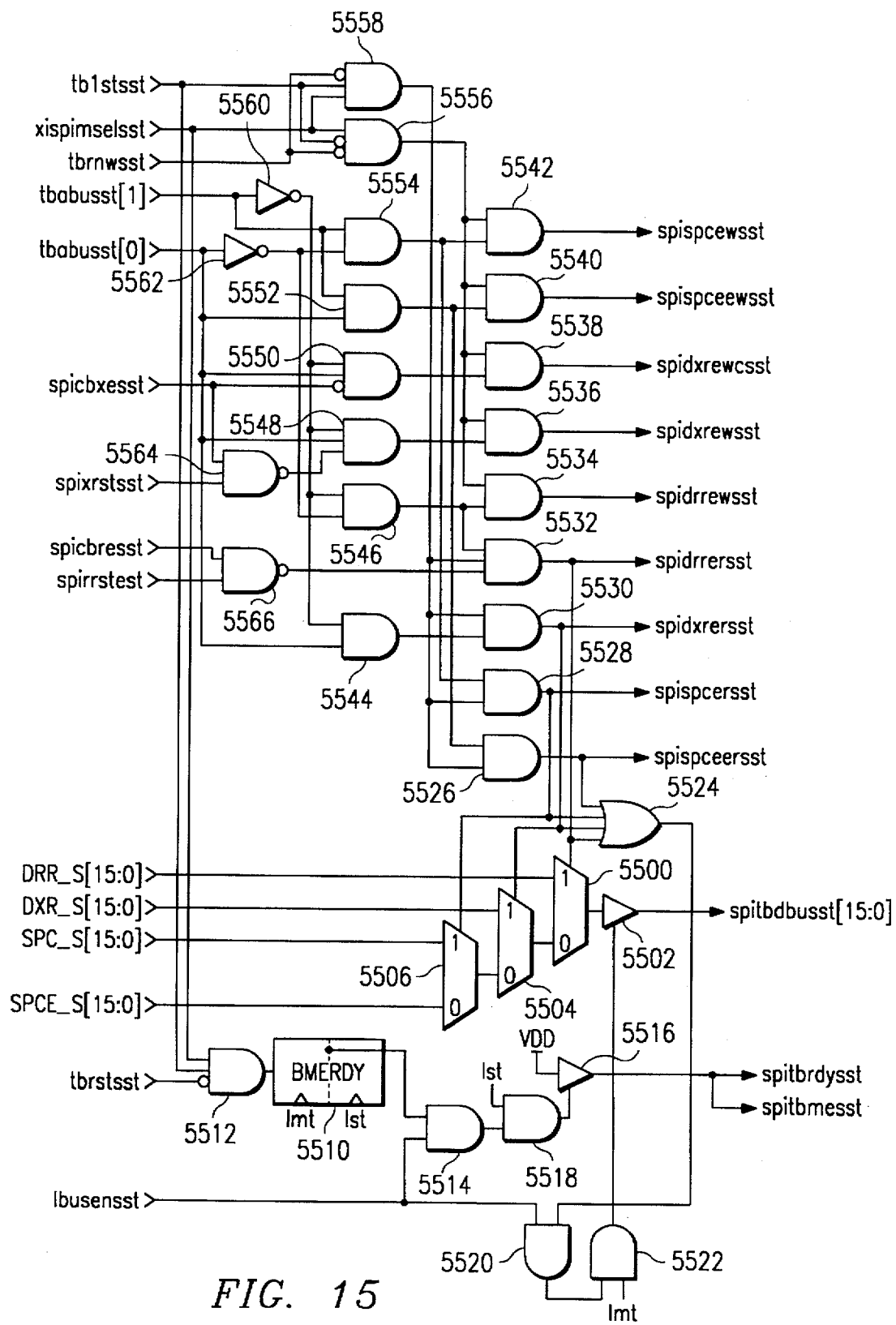
FIG. 15 depicts the detailed circuitry for the bus interface for the serial port interface portion of the present invention.

Referring now to FIG. 15, there may be seen the circuitry associated with the bus interface for the serial port interface portion of the present invention. More particularly, it may be seen that mux 5500 has one output which is provided to a tri-statable driver 5502. This output is 16-bits wide and is the spitbdbusst signal. The inputs for mux 5500 are the DRR_S signals and the output of a second two input mux 5504. The input for mux 5504 is the DXR_S signal and the output of a third two input mux 5506. The two inputs for mux 5506 are the SPC_S signals or the SPCE_S signals. The control signal for mux 5500 comes from the output of AND-gate 5532 and is also the control signal spidrrersst. The control for mux 5504 is the output of AND-gate 5530 and is also the control signal spidrrersst. The control signal for mux 5506 is the output of AND-gate 5528 and is also the control signal spispcersst. In addition, AND-gate 5526 provides an output spispceersst.

The output of AND-gates 5532, 5530, 5528 and 5526 are provided as inputs to OR-gate 5524. The output of OR-gate 5524 is provided as one input to AND-gate 5520. The other input for AND-gate 5520 is the lbusensst signal and the output of the AND-gate 5520 is provided as one input to AND-gate 5522. The other input to AND-gate 5522 is the lmt clock signal and the output of AND-gate 5522 is the signal that controls the driver 5502.

In addition, the BMERDY latch 5510 may be seen. The output of the master portion of this latch is provided as one input to AND-gate 5514, with the other signal to this AND-gate being the lbusensst signal. The output of AND-gate 5514 is provided as one input to AND-gate 5518 and the other signal is the 1st clock signal. The output of the AND-gate 5518 is provided to driver 5516, which is tied to vdd, or a logic one. The output of the driver 5516 is the spitbrdysst signal and the spitbmesst signal. The input to the BMERDY latch 5512 is the output of a three input AND-gate 5510. The inputs to the AND-gate 5512 are the tbrstsst signal inverted, the tblstsst signal and the xispimselsst signal. The latch 5510 is clocked by the lmt and 1st clock signals.

AND-gate 5542 provides as its output signal the signal spispcewsst. The two inputs for AND-gate 5542 are the output of AND-gate 5556 and the output of AND-gate 5554. The three inputs for AND-gate 5556 are the xispimselsst signal and the tb1stsst signal inverted and the tbrnsst signal inverted. The two inputs for the AND-gate 5554 are the tbabusst[1] signal and the tbabusst[0] signal inverted by inverter 5562.

AND-gate 5540 provides the output signal spispceewsst. The inputs for AND-gate 5540 are the output of AND-gate 5556, previously described, and the output of AND-gate 5552. The inputs for AND-gate 5552 are the tbabusst[1] signal and the tbabusst[0] signal.

AND-gate 5538 provides the spidxrewcsst signal. The inputs for AND-gate 5538 are, again, the output of AND-gate 5556 and the output of AND-gate 5550. The inputs for AND-gate 5550 are the inverted version of tbabusst[1] and tbabusst[0] in combination with the spicbxesst signal inverted.

AND-gate 5536 provides the spidxrewsst signal. The inputs for AND-gate 5536 are, again, the output of AND-gate 5556 and the output of AND-gate 5548. The inputs for AND-gate 5548 are the tbabusst[1] signal inverted and the tbabusst[0] signal in combination with the output of NAND-gate 5564. The two inputs for NAND-gate 5564 are spicbxesst and spixrstsst.

AND-gate 5534 provides as its output the spidrrewsst signal. The inputs to AND-gate 5534 are the output of AND-gate 5556 and the output of AND-gate 5546. The inputs for AND-gate 5546 are the tbabusst[1] signal inverted and the tbabusst[0] signal inverted.

Again, AND-gate 5532 provides as its output the spidrrersst signal. The inputs for AND-gate 5532 are the output of AND-gate 5546, the output of AND-gate 5566 and the output of AND-gate 5558. The inputs for AND-gate 5558 are the tb1stsst signal, the tbrnwsst signal inverted and the xispimselsst signal. The inputs for AND-gate 5566 are the spicbresst signal and the spirrstest signal.

The two inputs for AND-gate 5530 are the outputs of AND-gate 5558 and AND-gate 5544. The two inputs for AND-gate 5544 are the tbabusst[1] signal inverted and the tbabusst[0] signal. The two inputs for AND-gate 5528 are the output of AND-gate 5558 and the output of AND-gate 5554. The inputs for AND-gate 5526 are the output of AND-gate 5558 and the output of AND-gate 5552.

Figure 16:
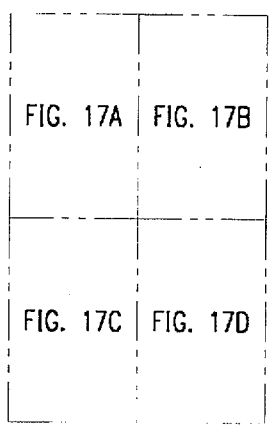
FIG. 16 depicts a block diagram illustrating how

Referring now to FIG. 16, there may be seen a block diagram of how FIGS. 17A through 17D may be oriented to provide the abu circuitry of the present invention.

Figure 17A:
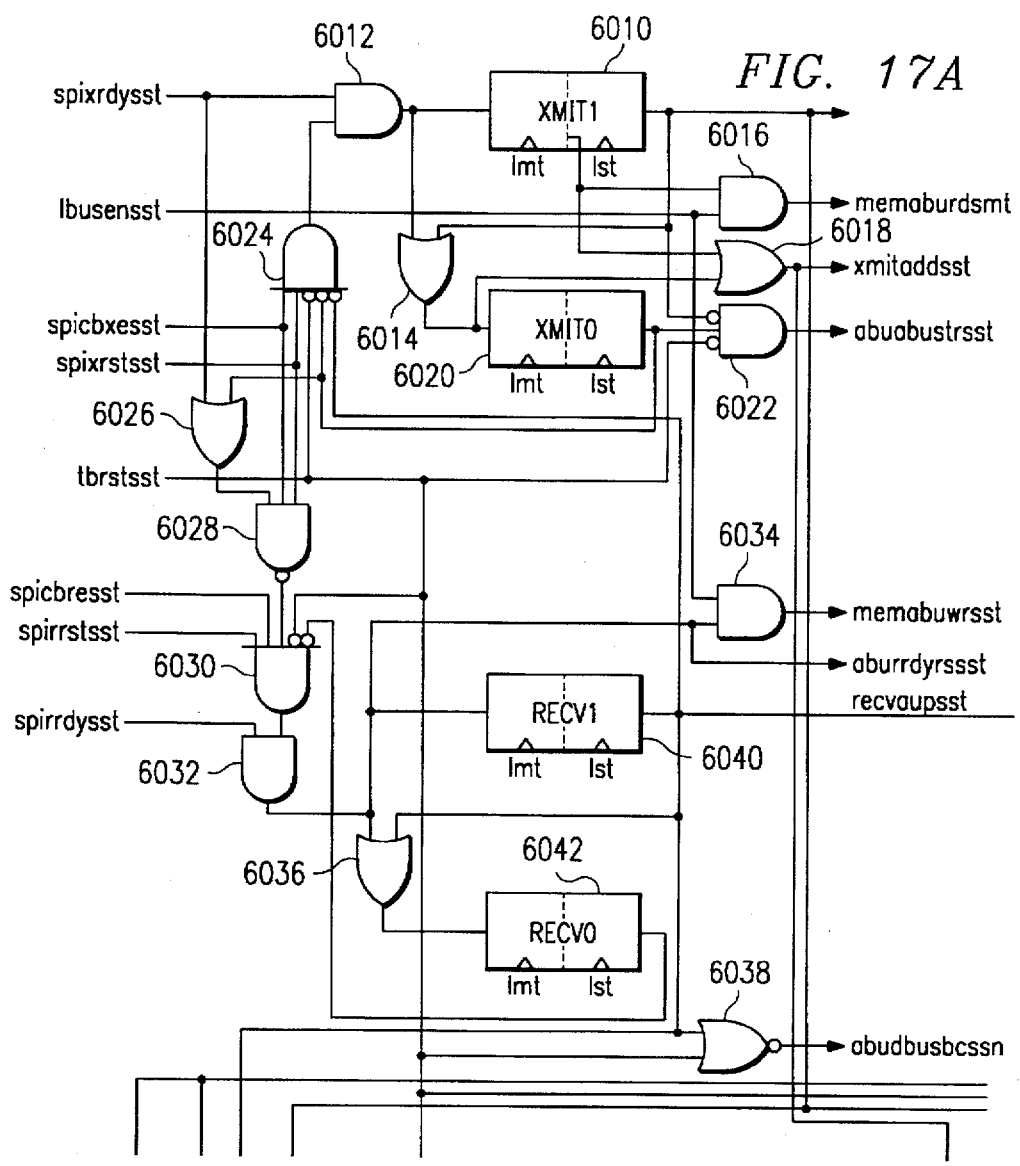

Referring now to FIG. 17A, there may be seen the XMIT1 latch 6010. This latch is clocked by the lmt and 1st clock signals. Immediately below this latch is the XMIT0 latch 6020. The input for the XMIT1 latch is the output of AND-gate 6012. The inputs for AND-gate 6012 are the spixrdysst signal and the output of AND-gate 6024. The output of AND-gate 6012 is also provided as one input to OR-gate 6014 whose input is provided as the input to the XMIT0 latch 6020. The output of the master portion of the XMIT1 latch 6010 is provided as an input to AND-gate 6016 and as an input to OR-gate 6018. AND-gate 6016 has as its other input the lbusensst signal and provides as its output the memaburdsmt signal. The OR-latch 6018 has as its other input the output of OR-gate 6014 and provides as an output the xmitaddsst signal. The output of the XMIT1 latch 6010 is provided as the other input to OR-gate 6014 and in an inverted version to AND-gate 6022. The other signals supplied to AND-gate 6022 are the output of the XMIT0 latch 6020 and the invention version of the tbrstsst signal. The XMIT0 and XMIT1 latches and associated logic are used to generate a read request signal to the memory interface circuit, e.g. a request to read data to be transmitted from memory into the DXR register. The RECV0 and RECV1 latches and associated logic are used to generate a read request signal to the memory interface circuit, e.g. a request to read received data from the DRR register into memory.

The output of the XMIT0 latch is also provided in an inverted form as one input to AND-gate 6024 and as an input to OR-gate 6026. The remaining inputs for AND-gate 6024 are the spicbxesst signal, the spixrstsst signal, the tbrstsst signal inverted and the output of the RECV1 latch 6040 inverted. The other input to OR-gate 6026 is the spixrdysst signal. The output of OR-gate 6026 is provided as one input to NAND-gate 6028. The other input signals for NAND-gate 6028 are the spicbxesst signal and the spixrstsst signal. The output of NAND-gate 6028 is provided as one input for AND-gate 6030. The other input signals for AND-gate 6030 are spirrstsst, spicbresst, tbrstsst inverted and the output of the RECV0 latch 6042 inverted. The output of AND-gate 6030 is provided as one input to AND-gate 6032 with the other input being the spirrdysst signal. The output of AND-gate 6032 is provided as one input to OR-gate 6036 and as the input to the RECV1 latch 6040 and as an input to AND-gate 6034 and is provided as a signal aburrdyrssst. The other input to OR-gate 6036 is the output of the RECV1 latch 6040. The output of RECV1 latch 6040 is also provided as a signal recvaupsst and as an input to NOR-gate 6038, whose output signal is the abudbusbcssn signal. The output of OR-gate 6036 is provided as the input to the RECV0 latch 6042. The output of the RECV0 latch 6042 is as noted before provided as one input to AND-gate 6030 after inversion. The other input for NOR-gate 6038 is the tbrstsst signal. This logic circuitry also resolves conflicts between receive and transmit requests to the memory.

Figure 17B:
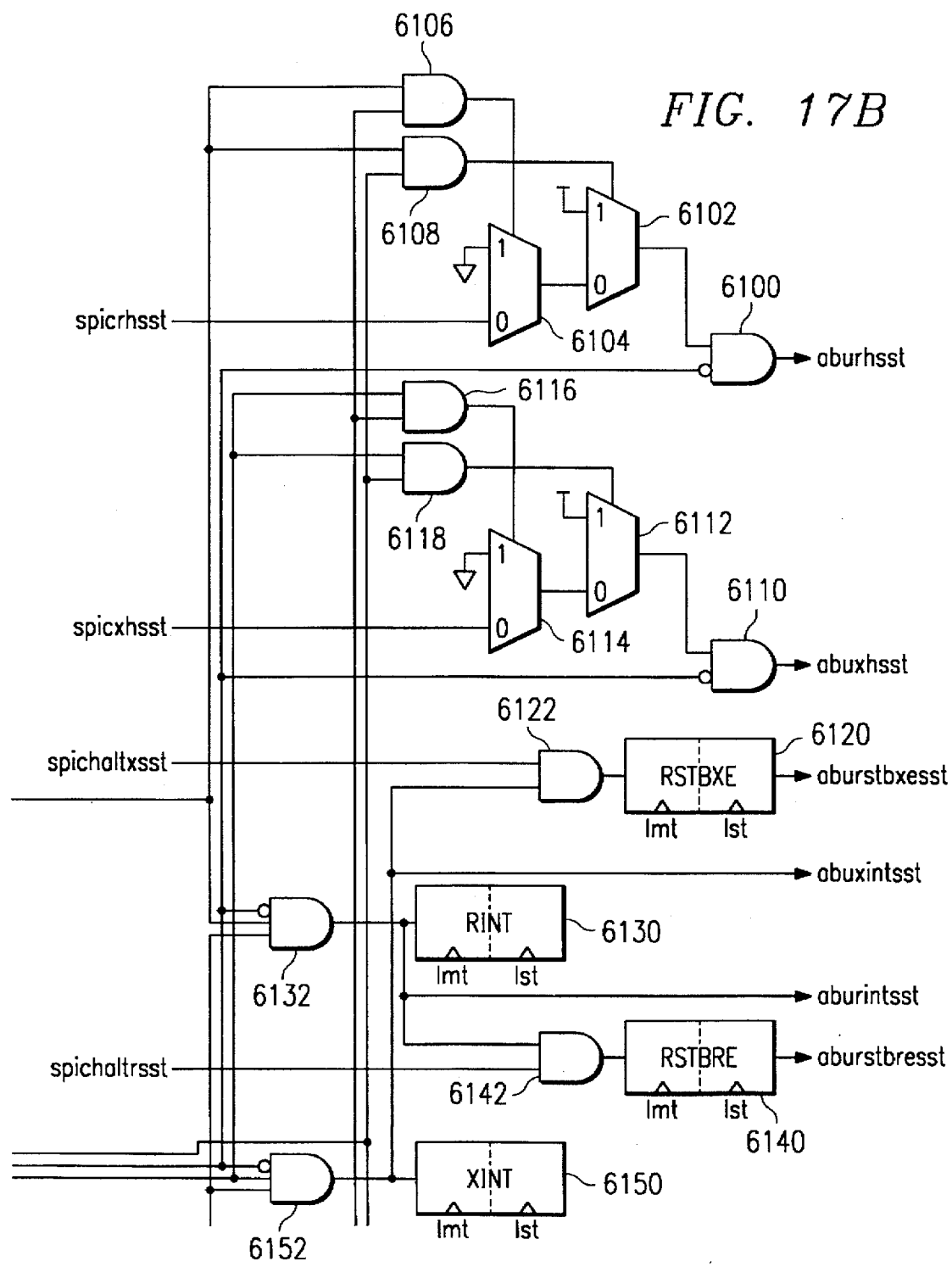
Figure 17C:
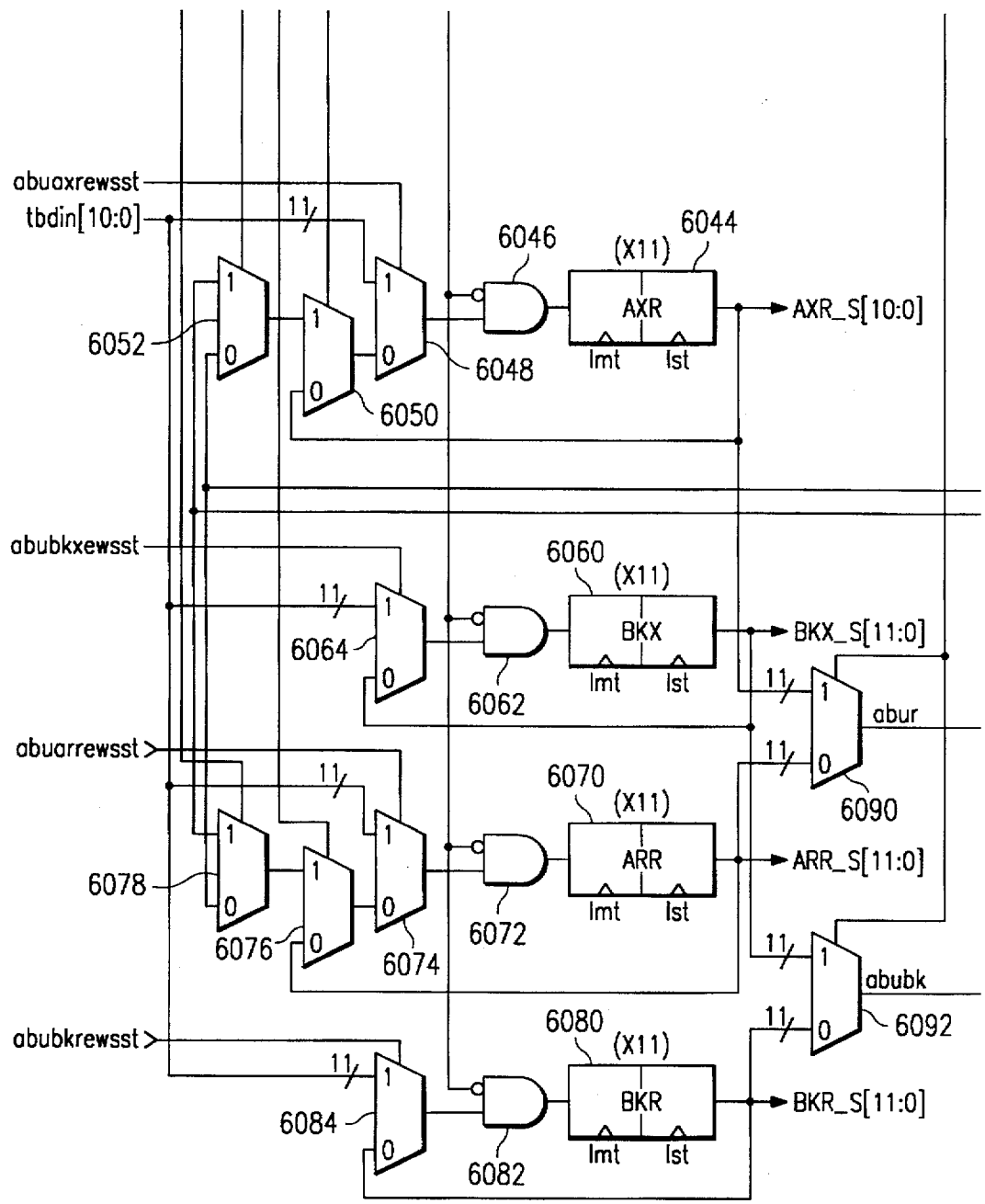

Referring now to FIG. 17C, there may be seen the AXR latches 6044. As noted by the (X11) above this latch, there are eleven of these latches. The output from the latches is the AXR_S signal[10:0]. The input for the AXR latch 6044 is the output of AND-gate 6046. One input for AND-gate 6046 is the tbrstsst signal inverted and the other input is the output of a two input mux 6048. The control signal for this mux is the abuaxrewsst signal and the inputs are the tbd_in bus or the output of a second two input mux 6050. The inputs for mux 6050 are the output of the AXR latches 6044 or the output of a second two input mux 6052. The two inputs for mux 6052 are the output of incrementer 6158 and the output of AND-gate 6162, which are both depicted are FIG. 17D.

The control signal for mux 6048 is the abuaxwrewsst signal. The control signal for mux 6050 is the output of the XMIT1 latch 6010, depicted in FIG. 17A. Continuing to refer to FIG. 17C, the control signal for mux 6052 is provided by the output of comparator 6156, depicted in FIG. 17D.

Continuing to refer to FIG. 17C, the BKX latches 6060 are also depicted and provide as an output the BKX_S[11:0] signal. The input to the BKX latches 6060 are the outputs of AND-gate 6062. The two inputs for AND-gate 6062 are the tbrstsst signal inverted and the output of a two input mux 6064. The two inputs for mux 6064 are the tbd_in bus or the output of the BKX latches 6060. The control signal for mux 6064 is the abubkxewsst signal.

The ARR latches 6070 are also depicted and provide an output signal ARR_S[11:0]. The input for these latches is the output of AND-gate 6072. The inputs for AND-gate 6072 are the tbrstsst signal inverted and the output of mux 6074. The inputs for mux 6074 are the tbd_in bus lines for the output of mux 6076. The inputs for mux 6076 are the output of a final mux 6078 or the output of the ARR latches 6070. The inputs for the mux 6078 are the outputs of the incrementer 6158 and AND-gate 6162, again depicted in FIG. 17D. Referring again to FIG. 17C, the control signal for mux 6078 is the output of comparator 6156, again depicted in FIG. 17D. The control signal for mux 6076 is the output of the RECV1 latch 6040, depicted in FIG. 17A. Continuing to refer to FIG. 17C, the control signal for mux 6074 is the abuarrewsst signal.

The BKR latches 6080 have as an output the BKR_S [11:0] and as an input the output of AND-gate 6082. Again, there are eleven of these latches. The inputs for AND-gate 6082 are the tbrstsst signal inverted and the output of a two input mux 6084. The two inputs for mux 6084 are the tbd_in bus lines or the output of the BKR latches 6040. The control signal for mux 6084 is the abubkxewsst signal.

In addition, it may be seen that the output signals from the AXR, BKX, ARR and BKR signals are also provided to two muxes 6090 and 6092. More particularly, the output signals of the AXR latches 6044 and the ARR latches 6070 are provided as inputs for mux 6090. Similarly, the outputs of latches BKX 6060 and BKR 6080 are provided as inputs to mux 6092. The control signal for muxes 6090 and 6092 is the output of OR-gate 6018, depicted on FIG. 17A. The outputs of these two muxes are labeled as "abur" for mux 6090 and "abubk" for mux 6092. These signals then continue onto FIG. 17D, where they are used in other portions of the circuitry, as will be noted later herein.

Referring now to FIG. 17B, there may be seen the AND-gate 6100, whose output signal is the aburhsst signal. The inputs for AND-gate 6100 are the tbrstsst signal inverted and the output of two input mux 6102. The two inputs for mux 6102 are vdd and the output of a second two input mux 6104. The two inputs for mux 6104 are the spicrhsst signal or ground. The control signal for mux 6102 is provided by AND-gate 6108. The control signal for mux 6104 is provided by AND-gate 6106. The input for AND-gate 6106 is the recvaupsst signal from the RECV1 latch 6040 in FIG. 17A. This same signal is also provided as an input to AND-gate 6108. The other input for AND-gate 6106 is the output of comparator 6164, depicted in FIG. 17D. The other input for AND-gate 6108 is the output of comparator 6156 on FIG. 17D.

Continuing to refer to FIG. 17B, AND-gate 6110 is seen to provide the abuxhsst signal. The two inputs for this AND-gate are the tbrstsst signal inverted and the output of two input mux 6112. The input signals for mux 6112 are vdd and the output of mux 6114. The two inputs for mux 6114 are ground and the spicxhsst signal. The control signal for mux 6114 as provided by AND-gate 6116 and the control signal for mux 6112 is provided by AND-gate 6118. The inputs for AND-gate 6116 are the output of the XMIT1 latch 6010, depicted in FIG. 17A, and the output of comparator 6164 depicted in FIG. 17B. The inputs for AND-gate 6118 are the output of comparator 6156 depicted in FIG. 17D and the output of the XMIT1 latch 6010, depicted in FIG. 17A.

Continuing to refer to FIG. 17B, there may be seen the latch RSTBXE 6120 whose output signal is the aburstbxesst signal. The input for this latch is the output of AND-gate 6122. The two inputs for this AND-gate 6122 are the spichaltxsst signal and the output of AND-gate 6152. The inputs for AND-gate 6152 are the output of the XMIT1 latch 6010, the tbrstsst signal inverted and the output of OR-gate 6154 depicted in FIG. 17D. The output of AND-gate 6152 is also provided as a separate signal abuxintsst and as an input to the XMIT latch 6150. The RINT latch 6130 has as its input the output of AND-gate 6132. The output of AND-gate 6132 is also provided as a separate signal aburintsst and as an input to AND-gate 6142. The inputs for AND-gate 1632 are the tbrstsst signal inverted, the recvaupsst signal from the RECV1 latch 6040 (depicted in FIG. 17A) and the output of OR-gate 6154 (depicted in FIG. 17D). The other input for AND-gate 6142 is the spichaltrsst signal and the output of AND-gate 6142 is provided as the input to the RSTBRE latch 6140, whose output is the aburstbresst signal.

Figure 17D:
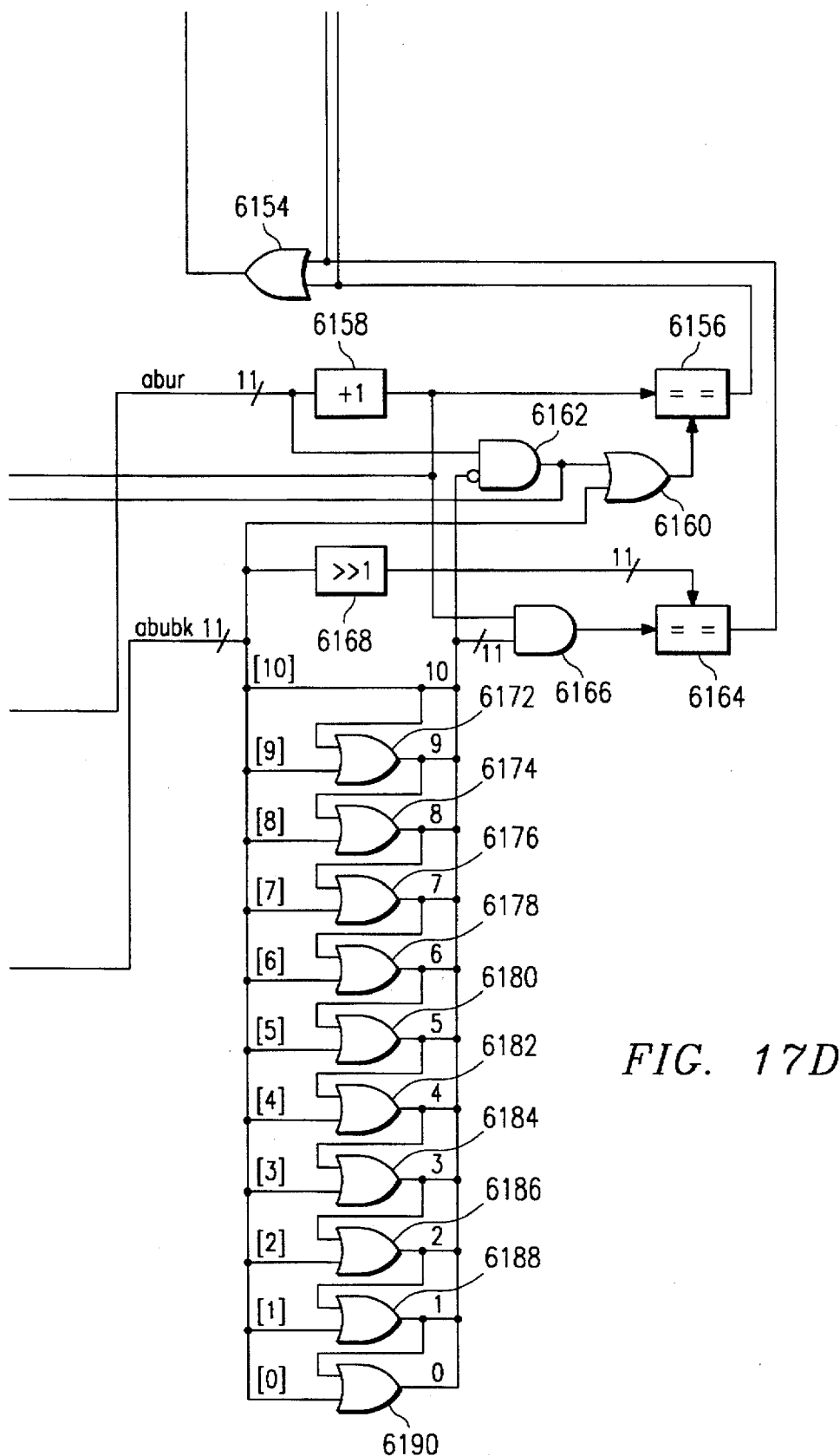

Referring now to FIG. 17D, it may be seen that the abur signal and the abubk signal from FIG. 17C are provided as inputs to this portion of the circuitry. More particularly, the abur signal is provided as an input to an incrementer 6158, whose output is supplied as one input to a comparator 6156. The abur signal is also provided as one input to AND-gate 6162 whose output is provided as an input to OR-gate 6160, whose output is provided as the other input for comparator 6156. As previously noted, the output of AND-gate 6162 is also supplied to some of the muxes in FIG. 17C as a control signal. The output of incrementer 6158 is also provided as an input to AND-gate 6166 whose output is provided as one input to comparator 6164. The abubk signal is provided as the other input to AND-gate 6166. In addition, the abubk signals are provided to a shift by one position to the right shifter 6168, which provides the other signal to comparator 6164. The outputs of comparator 6156 and 6164 are the two inputs for OR-gate 6154. The abubk signal is also provided as one input to OR-gate 6160. In addition, the abubk lines are broken into the zeroth through tenth bit positions and provided as inputs to OR-gates 6170 through 6190. The other input for each one of the OR-latches in this sequence of OR-latches is the output from the preceding OR-latch in the series. The outputs from the OR-latches are again collected by corresponding bit lines and passed as an inverted signal to AND-gate 6162 and uninverted to AND-gate 6166. The OR-latches are used to generate a mask that establishes the address buffer boundaries (and half boundaries) and the current position within the buffer based upon the values in the BKX and BKR registers.

Figure 18:
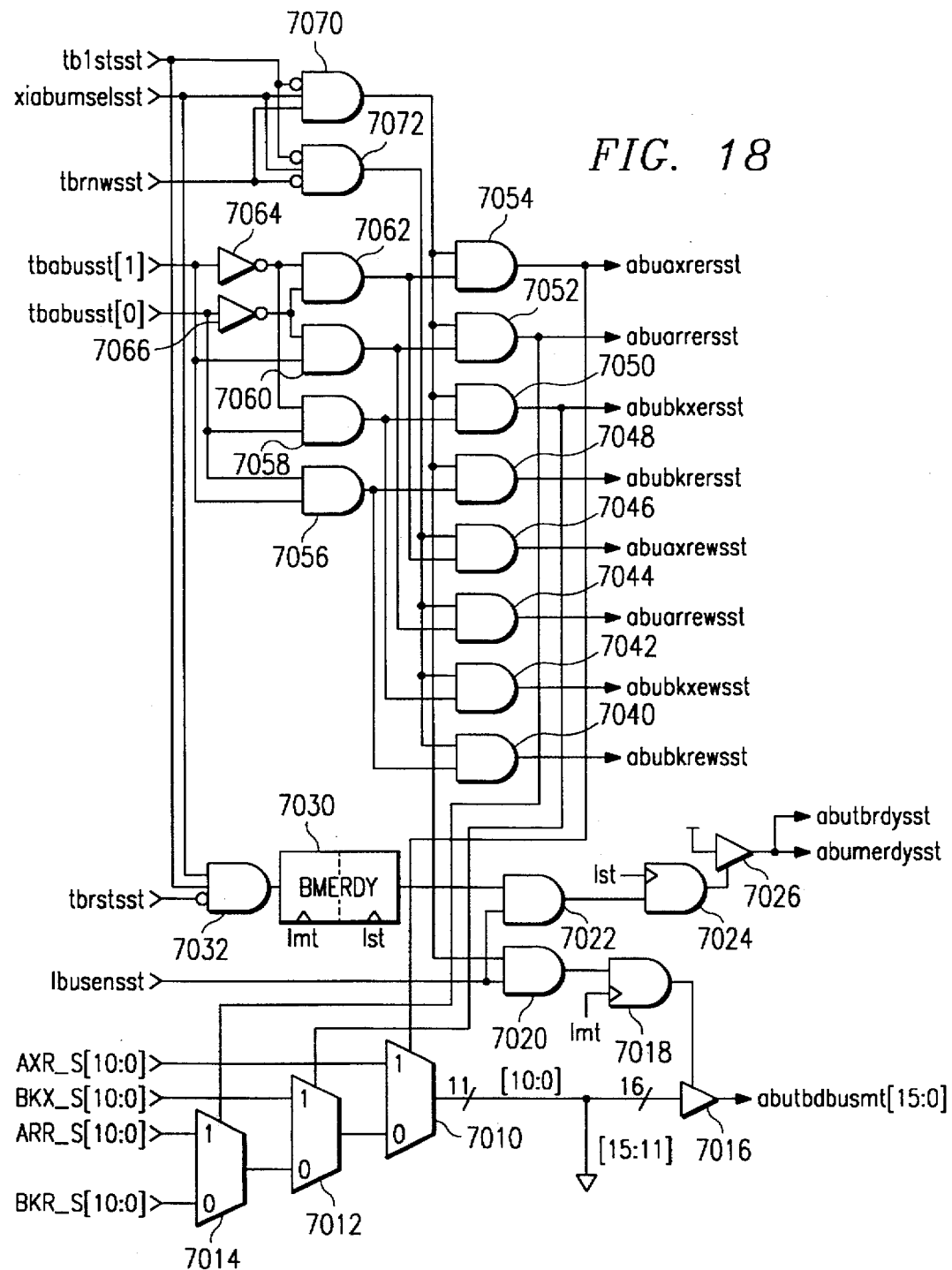
FIG. 18 depicts the detailed circuitry for the bus interface for the automatic buffering unit portion of the present invention.

Referring now to FIG. 18, there may be seen the bus interface portion of the circuitry for the abu portion of the circuit of the present invention. More particularly, it may be seen that there is a two input mux 7010 whose output is supplied to a driver 7016 and the output of the driver is abutbdbusmt[15:0]. As may be seen, since there are 11 bits coming from mux 7010, the remaining bit positions 15 through 11 are grounded. The inputs for mux 7010 are the AXR_S signal or the output of two input mux 7012. The inputs for mux 7012 are the BKX_S signals or the output of two input mux 7014. The inputs for mux 7014 are the ARR_S signals or the BKR_S signals. The control signal for mux 7014 is the output of AND-gate 7050. The control signal for mux 7012 is the output of AND-gate 7048. The control signal for mux 7010 is the output of AND-gate 7054. The control signal for driver 7016 is provided by AND-gate 7018. AND-gate 7018 has as its two input signals the output of AND-gate 7020 and the lmt signal. The two inputs for AND-gate 7020 are the lbusensst signal and the output of AND-gate 7070. The inputs for AND-gate 7070 are the tb1stsst signal inverted, the xiabumselsst signal and the tbrnwsst signal.

The inputs to AND-gate 7072 are the tb1stsst signal inverted, the xiabumselsst signal and the tbrnwsst signal inverted. The output of AND-gate 7072 is provided as one input to AND-gate 7054, 7052, 7050, 7048 and AND-gate 7020. The other input for AND-gate 7054 is the output of AND-gate 7062. The inputs for AND-gate 7062 are the tbabusst[1] signal, inverted by inverter 7064, and the tbabusst[0], inverted by inverter 7066. The output of AND-gate 7054 is the abuaxrersst signal.

The output of AND-gate 7052 is the abuarrersst signal. The two inputs for the AND-gate 7052 are again the output of AND-gate 7070 and the output of AND-gate 7060. The two inputs for AND-gate 7060 are the tbabusst[1] signal and the tbabusst[0] signal, inverted.

The output of the AND-gate 7050 is the abubkxersst signal and its inputs are again the output of AND-gate 7070 and the output of AND-gate 7058. The inputs for AND-gate 7058 are the tbabusst[1] signal, inverted, and the tbabusst[0] signal.

AND-gate 7048 provides the abubkrersst signal and has as its input the output of the AND-gate 7070 and the output of AND-gate 7056. The inputs to AND-gate 7056 are the tbabusst[1] signal and the tbabusst[0] signal.

AND-gate 7046 has as its output signal the abuaxrewsst signal and has as its inputs the output of AND-gate 7072 and the output of AND-gate 7062.

AND-gate 7044 has as its output signal abuarrewsst and has as its inputs the output of AND-gate 7072 and the output of AND-gate 7060.

AND-gate 7042 has as its output signal abubkxewsst and as its input the output of AND-gate 7072 and AND-gate 7058.

AND-gate 7040 has as its output the abubkrewsst signal and as its inputs the output of AND-gate 7072 and AND-gate 7056.

The BMERDY latch 7030 has as its input the output of 7032. The inputs for AND-gate 7032 are the tbrstsst signal inverted and the tb1stsst signal and the xiabumselsst signal. The output from the BMERDY latch 7030 is provided as one input to AND-gate 7022. The other input to AND-gate 7022 is the lbusensst signal. The output of AND-gate 7022 is provided as one input to get AND-gate 7024. The other input for AND-gate 7024 is the 1st clock signal. The output of AND-gate 7024 is the signal that controls driver 7026. The driver 7026 provides a logic one signal as an output signal abutbrdysst and abumerdysst when driven.

The circuit 100 also includes a test logic circuit 230 for providing an internal clock signal to all the circuitry to be tested. The shifting of test data into the blocks via the scan paths is controlled by the test logic 230. All of the circuitry of BSP 100 is fully scannable.

Referring now to FIG. 19, there may be seen a summary portion of the test circuitry 230 depicted more fully in FIG. 10A. This circuitry includes two multiplexers 510, 520 that are used to select between clocks for test functions and clocks for normal functions. The first multiplexer 510 selects between the normal internal functional clock and a test clock for that portion of the circuitry of circuit 100 that uses internal or synchronous clock signals. The second multiplexer 520 selects between the external clock and the output of the first mux 510, which during testing is the "test" clock for that portion of the circuitry that uses external or asynchronous clock signals, or the normal functional clock signal for other types of testing. In this manner, when the circuit 100 is in the test mode the internal clock signal or test clock may be supplied to all the circuitry of circuit 100 whether normally clocked by synchronous or asynchronous clocked signals.

A preliminary specification for the presently preferred embodiment of the present invention is attached hereto as an Appendix.

The present invention is capable of being implemented in software, hardware, or combinations of hardware and software. Although the present invention and its advantages have been described in detail, it should be understood that various changes, substitutions and alterations may be made herein without departing from the spirit and scope of the invention, as defined in the appended claims.

What is claimed is:

1. An electronic device for transferring data between a serial port and a memory of a processor, comprising:
   at least one data register for transferring data between said serial port and said memory in response to a first set of control signals,
   a data bus connected to said registers and said memory for passing data to and from said memory in response to a portion of said first set of control signals,
   first control circuitry for generating said first set of control signals and for generating at least one interrupt to said processor,
   at least one control register connected to said first control circuitry for providing mode control information to said first control circuitry,
   at least one address register for storing data address,
   at least one address generator connected to said address registers for automatically generating addresses in response to a second set of control signals,
   an address bus connected to said address registers and said memory, and
   second control circuitry connected to said address generator, a portion of said control register and said first control circuitry for generating said second set of control signals.

2. The electronic device of claim 1, further comprising:
   interrupt circuitry connected to said first and second control circuitry and processor for generating interrupts as a function of said mode of operation of said device.

3. An electronic device for transferring data between a serial port and a memory of a processor, comprising:
   a first input register for receiving data from said serial port at a first preselected clock rate,
   a first output register for transmitting data to said serial port at a second preselected clock rate independently of said receiving of data,
   a second input register connected to said first input register for receiving data from said first input register in response to a first control signal,
   a second output register connected to said first output register for providing data to said first output register in response to a second control signal,
   a data bus connected to said second registers for passing data to and from said memory in response to a third and fourth control signal, respectively,
   first control circuitry for independently shifting the preselected clock rates for said input registers and said output registers between an internal clock or one or more external clocks, for generating said control signals, and for generating an interrupt to said processor when in a first mode and said second input register is full and/or said second output register is empty, and
   at least one control register connected to said first control circuitry for providing mode control information to said first control circuitry.

4. The electronic device of claim 3, further comprising:
   an input address register for storing an input data address.

5. The electronic device of claim 4, further comprising:
   an output address register for storing an output data address.

6. The electronic device of claim 5, further comprising:
   an address generator connected to said address registers for automatically generating addresses in response to a first set of control signals.

7. The electronic device of claim 6, further comprising:
   an address bus connected to said address registers.

8. The electronic device of claim 7, further comprising:
   second control circuitry connected to said address generator and to said first control circuitry for generating said first set of control signals.

* * * * *